United States Patent [19]

Ishida et al.

[11] Patent Number: 5,917,947
[45] Date of Patent: Jun. 29, 1999

[54] IMAGE PROCESSING METHOD AND APPARATUS PERMITTING USE OF PDL IN COMPRESSION MEMORY

[75] Inventors: Yoshihiro Ishida; Naoto Kawamura, both of Kawasaki; Hideo Honma, Tokyo, all of Japan

[73] Assignee: Canon Kabushiki Kaisha, Tokyo, Japan

[21] Appl. No.: 08/272,653

[22] Filed: Jul. 11, 1994

Related U.S. Application Data

[63] Continuation of application No. 07/738,616, Jul. 31, 1991, abandoned.

[30] Foreign Application Priority Data

| Jul. 31, 1990 | [JP] | Japan | 2-204792 |
| Jul. 31, 1990 | [JP] | Japan | 2-204794 |
| Jul. 31, 1990 | [JP] | Japan | 2-204795 |
| Jul. 31, 1990 | [JP] | Japan | 2-204796 |

[51] Int. Cl.$^6$ .................................................. G06K 9/36
[52] U.S. Cl. ........................................................ 382/232
[58] Field of Search .................................. 382/41, 43, 56, 382/57, 61; 358/261.3, 432; 395/145, 146, 147, 148, 150; G06K 9/36, 9/46, 9/03, 9/20; H04N 1/415, 1/40

[56] References Cited

U.S. PATENT DOCUMENTS

| 3,976,982 | 8/1976 | Eiselen | 340/172.5 |
| 4,439,783 | 3/1984 | Nishikawa | 358/22 |
| 4,631,751 | 12/1986 | Anderson et al. | 382/47 |
| 4,638,368 | 1/1987 | Shimizu | 358/256 |
| 4,641,197 | 2/1987 | Miyagi | 358/280 |
| 4,672,459 | 6/1987 | Kudo | 358/280 |
| 4,675,725 | 6/1987 | Parkyn | 358/183 |
| 4,750,212 | 6/1988 | Yokomizo | 382/48 |
| 4,757,549 | 7/1988 | Machart et al. | 382/187 |
| 4,791,680 | 12/1988 | Yokoe et al. | 382/56 |
| 4,797,945 | 1/1989 | Suzuki et al. | 382/56 |
| 4,918,541 | 4/1990 | Ishida et al. | 358/433 |
| 4,949,188 | 8/1990 | Sato | 358/453 |
| 5,018,078 | 5/1991 | Urabe et al. | 395/150 |
| 5,027,421 | 6/1991 | Kanno | 382/61 |
| 5,060,280 | 10/1991 | Mita et al. | 382/33 |
| 5,091,966 | 2/1992 | Bloomberg et al. | 382/201 |
| 5,095,512 | 3/1992 | Roberts et al. | 382/245 |
| 5,109,434 | 4/1992 | Shimizu et al. | 382/56 |
| 5,121,216 | 6/1992 | Chen et al. | 382/56 |
| 5,129,011 | 7/1992 | Nishikawa et al. | 382/56 |
| 5,295,198 | 3/1994 | Maney | 382/225 |
| 5,485,557 | 1/1996 | Sato et al. | 395/129 |
| 5,502,804 | 3/1996 | Butterfield et al. | 395/147 |
| 5,509,115 | 4/1996 | Butterfield et al. | 395/147 |

FOREIGN PATENT DOCUMENTS

| 29327 | 5/1981 | European Pat. Off. | H04N 1/00 |
| 235456 | 9/1987 | European Pat. Off. | G06F 15/62 |
| 62-140175 | 6/1987 | Japan . | |

OTHER PUBLICATIONS

Pelli, "Programming in PostScript", In *Byte*, May. 1987, pp. 185–202.

*Primary Examiner*—Jose L. Couso
*Attorney, Agent, or Firm*—Fitzpatrick, Cella, Harper & Scinto

[57] ABSTRACT

In an image processing apparatus, a memory stores encoded image data, and command data is interpreted and converted into image data. The encoded image data stored in the memory is decoded and synthesized with the converted image data. The resulting synthesized image data is then encoded.

12 Claims, 52 Drawing Sheets

FIG. 21

8×8 DCT QUANTIZATION MATRIX

G-COMPOSITION QUANTIZATION STEP MATRIX

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 58 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

R, B-COMPOSITION QUANTIZATION STEP MATRIX

| 17 | 18 | 24 | 47 | 99 | 99 | 99 | 99 |
|----|----|----|----|----|----|----|----|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

ZIGZAG SCAN

PREDICTIVE METHOD BETWEEN
BLOCKS OF DC COEFFICIENT

FIG. 24

ENCODE OF DC COEFFICIENT

| DC COEFFICIENT | SSSS |
|---|---|
| 0 | 0 |
| -1, 1 | 1 |
| -3, -2, 2, 3 | 2 |
| -7..-4, 4..7 | 3 |
| -15..-8, 8..15 | 4 |
| -31..-16, 16..31 | 5 |
| -63..-32, 32..63 | 6 |
| -127..-64, 64..127 | 7 |
| -255..-128, 128..255 | 8 |
| -511..-256, 256..511 | 9 |
| -1023..-512, 512..1023 | 10 |
| -2047..-1024, 1024..2047 | 11 |
| -4095..-2048, 2048..4095 | 12 |
| -8191..-4096, 4096..8191 | 13 |
| -16383..-8192, 8192..16383 | 14 |
| -32767..-16384, 16384..32767 | 15 |

FIG. 26

G-DIRECT CURRENT (DC) COMPOSITION
PREDICTIVE ERROR HUFFMAN CODE TABLE

| SSSS | CODE LENGTH | HUFFMAN CODE |
|------|-------------|--------------|
| 0    | 2           | 00           |
| 1    | 3           | 010          |
| 2    | 3           | 011          |
| 3    | 3           | 100          |
| 4    | 3           | 101          |
| 5    | 3           | 110          |
| 6    | 4           | 1110         |
| 7    | 5           | 11110        |
| 8    | 6           | 111110       |
| 9    | 7           | 1111110      |
| 10   | 8           | 11111110     |
| 11   | 9           | 111111110    |

FIG. 27

R, B-DIRECT CURRENT (DC) COMPOSITION
PREDICTIVE ERROR HUFFMAN CODE TABLE

| SSSS | CODE LENGTH | HUFFMAN CODE |
|------|-------------|--------------|
| 0    | 2           | 00           |
| 1    | 2           | 01           |
| 2    | 2           | 10           |
| 3    | 3           | 110          |
| 4    | 4           | 1110         |
| 5    | 5           | 11110        |
| 6    | 6           | 111110       |
| 7    | 7           | 1111110      |
| 8    | 8           | 11111110     |
| 9    | 9           | 111111110    |
| 10   | 10          | 1111111110   |
| 11   | 11          | 11111111110  |

FIG. 28

| FIG. 28A |
|---|
| FIG. 28B |
| FIG. 28C |
| FIG. 28D |
| FIG. 28E |

FIG. 28A

G-ALTERNATIVE CURRENT(AC) COMPOSITION HUFFMAN CODE TABLE

| NNNN/SSSS | CODE LENGTH | HUFFMAN CODE |
|---|---|---|
| 0/0 (EOB) | 4 | 1010 |
| 0/1 | 2 | 00 |
| 0/2 | 2 | 01 |
| 0/3 | 3 | 100 |
| 0/4 | 4 | 1011 |
| 0/5 | 5 | 11010 |
| 0/6 | 7 | 1111000 |
| 0/7 | 8 | 11111000 |
| 0/8 | 10 | 1111110110 |
| 0/9 | 16 | 1111111110000010 |
| 0/A | 16 | 1111111110000011 |
| 1/1 | 4 | 1100 |
| 1/2 | 5 | 11011 |
| 1/3 | 7 | 1111001 |
| 1/4 | 9 | 111110110 |
| 1/5 | 11 | 11111110110 |
| 1/6 | 16 | 1111111110000100 |
| 1/7 | 16 | 1111111110000101 |
| 1/8 | 16 | 1111111110000110 |
| 1/9 | 16 | 1111111110000111 |
| 1/A | 16 | 1111111110001000 |
| 2/1 | 5 | 11100 |
| 2/2 | 8 | 11111001 |
| 2/3 | 10 | 1111110111 |
| 2/4 | 12 | 111111110100 |
| 2/5 | 16 | 1111111110001001 |
| 2/6 | 16 | 1111111110001010 |
| 2/7 | 16 | 1111111110001011 |
| 2/8 | 16 | 1111111110001100 |
| 2/9 | 16 | 1111111110001101 |
| 2/A | 16 | 1111111110001110 |

FIG. 28B

| NNNN/SSSS | CODE LENGTH | HUFFMAN CODE |
|---|---|---|
| 3/1 | 6 | 111010 |
| 3/2 | 9 | 111110111 |
| 3/3 | 12 | 111111110101 |
| 3/4 | 16 | 1111111110001111 |
| 3/5 | 16 | 1111111110010000 |
| 3/6 | 16 | 1111111110010001 |
| 3/7 | 16 | 1111111110010010 |
| 3/8 | 16 | 1111111110010011 |
| 3/9 | 16 | 1111111110010100 |
| 3/A | 16 | 1111111110010101 |
| 4/1 | 6 | 111011 |
| 4/2 | 10 | 1111111000 |
| 4/3 | 16 | 1111111110010110 |
| 4/4 | 16 | 1111111110010111 |
| 4/5 | 16 | 1111111110011000 |
| 4/6 | 16 | 1111111110011001 |
| 4/7 | 16 | 1111111110011010 |
| 4/8 | 16 | 1111111110011011 |
| 4/9 | 16 | 1111111110011100 |
| 4/A | 16 | 1111111110011101 |
| 5/1 | 7 | 1111010 |
| 5/2 | 11 | 11111110111 |
| 5/3 | 16 | 1111111110011110 |
| 5/4 | 16 | 1111111110011111 |
| 5/5 | 16 | 1111111110100000 |
| 5/6 | 16 | 1111111110100001 |
| 5/7 | 16 | 1111111110100010 |
| 5/8 | 16 | 1111111110100011 |
| 5/9 | 16 | 1111111110100100 |
| 5/A | 16 | 1111111110100101 |
| 6/1 | 7 | 1111011 |
| 6/2 | 12 | 111111110110 |
| 6/3 | 16 | 1111111110100110 |
| 6/4 | 16 | 1111111110100111 |
| 6/5 | 16 | 1111111110101000 |
| 6/6 | 16 | 1111111110101001 |
| 6/7 | 16 | 1111111110101010 |
| 6/8 | 16 | 1111111110101011 |
| 6/9 | 16 | 1111111110101100 |
| 6/A | 16 | 1111111110101101 |

FIG. 28C

| NNNN/SSSS | CODE LENGTH | HUFFMAN CODE |
|---|---|---|
| 7/1 | 8 | 11111010 |
| 7/2 | 12 | 111111110111 |
| 7/3 | 16 | 1111111110101110 |
| 7/4 | 16 | 1111111110101111 |
| 7/5 | 16 | 1111111110110000 |
| 7/6 | 16 | 1111111110110001 |
| 7/7 | 16 | 1111111110110010 |
| 7/8 | 16 | 1111111110110011 |
| 7/9 | 16 | 1111111110110100 |
| 7/A | 16 | 1111111110110101 |
| 8/1 | 9 | 111111000 |
| 8/2 | 15 | 111111111000000 |
| 8/3 | 16 | 1111111110110110 |
| 8/4 | 16 | 1111111110110111 |
| 8/5 | 16 | 1111111110111000 |
| 8/6 | 16 | 1111111110111001 |
| 8/7 | 16 | 1111111110111010 |
| 8/8 | 16 | 1111111110111011 |
| 8/9 | 16 | 1111111110111100 |
| 8/A | 16 | 1111111110111101 |
| 9/1 | 9 | 111111001 |
| 9/2 | 16 | 1111111110111110 |
| 9/3 | 16 | 1111111110111111 |
| 9/4 | 16 | 1111111111000000 |
| 9/5 | 16 | 1111111111000001 |
| 9/6 | 16 | 1111111111000010 |
| 9/7 | 16 | 1111111111000011 |
| 9/8 | 16 | 1111111111000100 |
| 9/9 | 16 | 1111111111000101 |
| 9/A | 16 | 1111111111000110 |
| A/1 | 9 | 111111010 |
| A/2 | 16 | 1111111111000111 |
| A/3 | 16 | 1111111111001000 |
| A/4 | 16 | 1111111111001001 |
| A/5 | 16 | 1111111111001010 |
| A/6 | 16 | 1111111111001011 |
| A/7 | 16 | 1111111111001100 |
| A/8 | 16 | 1111111111001101 |
| A/9 | 16 | 1111111111001110 |
| A/A | 16 | 1111111111001111 |

FIG. 28D

| NNNN/SSSS | CODE LENGTH | HUFFMAN CODE |
|---|---|---|
| B/1 | 10 | 1111111001 |
| B/2 | 16 | 1111111111010000 |
| B/3 | 16 | 1111111111010001 |
| B/4 | 16 | 1111111111010010 |
| B/5 | 16 | 1111111111010011 |
| B/6 | 16 | 1111111111010100 |
| B/7 | 16 | 1111111111010101 |
| B/8 | 16 | 1111111111010110 |
| B/9 | 16 | 1111111111010111 |
| B/A | 16 | 1111111111011000 |
| C/1 | 10 | 1111111010 |
| C/2 | 16 | 1111111111011001 |
| C/3 | 16 | 1111111111011010 |
| C/4 | 16 | 1111111111011011 |
| C/5 | 16 | 1111111111011100 |
| C/6 | 16 | 1111111111011101 |
| C/7 | 16 | 1111111111011110 |
| C/8 | 16 | 1111111111011111 |
| C/9 | 16 | 1111111111100000 |
| C/A | 16 | 1111111111100001 |
| D/1 | 11 | 11111111000 |
| D/2 | 16 | 1111111111100010 |
| D/3 | 16 | 1111111111100011 |
| D/4 | 16 | 1111111111100100 |
| D/5 | 16 | 1111111111100101 |
| D/6 | 16 | 1111111111100110 |
| D/7 | 16 | 1111111111100111 |
| D/8 | 16 | 1111111111101000 |
| D/9 | 16 | 1111111111101001 |
| D/A | 16 | 1111111111101010 |
| E/1 | 16 | 1111111111101011 |
| E/2 | 16 | 1111111111101100 |
| E/3 | 16 | 1111111111101101 |
| E/4 | 16 | 1111111111101110 |
| E/5 | 16 | 1111111111101111 |
| E/6 | 16 | 1111111111110000 |
| E/7 | 16 | 1111111111110001 |
| E/8 | 16 | 1111111111110010 |
| E/9 | 16 | 1111111111110011 |
| E/A | 16 | 1111111111110100 |

FIG. 28E

| NNNN/SSSS | CODE LENGTH | HUFFMAN CODE |
|---|---|---|
| F/0  (ZRL) | 11 | 11111111001 |
| F/1 | 16 | 1111111111110101 |
| F/2 | 16 | 1111111111110110 |
| F/3 | 16 | 1111111111110111 |
| F/4 | 16 | 1111111111111000 |
| F/5 | 16 | 1111111111111001 |
| F/6 | 16 | 1111111111111010 |
| F/7 | 16 | 1111111111111011 |
| F/8 | 16 | 1111111111111100 |
| F/9 | 16 | 1111111111111101 |
| F/A | 16 | 1111111111111110 |

FIG. 29

| FIG. 29A |
|---|
| FIG. 29B |
| FIG. 29C |
| FIG. 29D |
| FIG. 29E |

FIG. 29A

R<B-ALTERNATIVE CURRENT (AC) COMPOSITION HUFFMAN CODE TABLE

| NNNN/SSSS | CODE LENGTH | HUFFMAN CODE |
|---|---|---|
| 0/0  (EOB) | 2 | 00 |
| 0/1 | 2 | 01 |
| 0/2 | 3 | 100 |
| 0/3 | 4 | 1010 |
| 0/4 | 5 | 11000 |
| 0/5 | 5 | 11001 |
| 0/6 | 6 | 111000 |
| 0/7 | 7 | 1111000 |
| 0/8 | 9 | 111110100 |
| 0/9 | 10 | 1111110110 |
| 0/A | 12 | 111111110100 |
| 1/1 | 4 | 1011 |
| 1/2 | 6 | 111001 |
| 1/3 | 8 | 11110110 |
| 1/4 | 9 | 111110101 |
| 1/5 | 11 | 11111110110 |
| 1/6 | 12 | 111111110101 |
| 1/7 | 16 | 1111111110001000 |
| 1/8 | 16 | 1111111110001001 |
| 1/9 | 16 | 1111111110001010 |
| 1/A | 16 | 1111111110001011 |
| 2/1 | 5 | 11010 |
| 2/2 | 8 | 11110111 |
| 2/3 | 10 | 1111110111 |
| 2/4 | 12 | 111111110110 |
| 2/5 | 15 | 111111111000010 |
| 2/6 | 16 | 1111111110001100 |
| 2/7 | 16 | 1111111110001101 |
| 2/8 | 16 | 1111111110001110 |
| 2/9 | 16 | 1111111110001111 |
| 2/A | 16 | 1111111110010000 |

FIG. 29B

| NNNN/SSSS | CODE LENGTH | HUFFMAN CODE |
|---|---|---|
| 3/1 | 5 | 11011 |
| 3/2 | 8 | 11111000 |
| 3/3 | 10 | 1111111000 |
| 3/4 | 12 | 111111110111 |
| 3/5 | 16 | 1111111110010001 |
| 3/6 | 16 | 1111111110010010 |
| 3/7 | 16 | 1111111110010011 |
| 3/8 | 16 | 1111111110010100 |
| 3/9 | 16 | 1111111110010101 |
| 3/A | 16 | 1111111110010110 |
| 4/1 | 6 | 111010 |
| 4/2 | 9 | 111110110 |
| 4/3 | 16 | 1111111110010111 |
| 4/4 | 16 | 1111111110011000 |
| 4/5 | 16 | 1111111110011001 |
| 4/6 | 16 | 1111111110011010 |
| 4/7 | 16 | 1111111110011011 |
| 4/8 | 16 | 1111111110011100 |
| 4/9 | 16 | 1111111110011101 |
| 4/A | 16 | 1111111110011110 |
| 5/1 | 6 | 111011 |
| 5/2 | 10 | 1111111001 |
| 5/3 | 16 | 1111111110011111 |
| 5/4 | 16 | 1111111110100000 |
| 5/5 | 16 | 1111111110100001 |
| 5/6 | 16 | 1111111110100010 |
| 5/7 | 16 | 1111111110100011 |
| 5/8 | 16 | 1111111110100100 |
| 5/9 | 16 | 1111111110100101 |
| 5/A | 16 | 1111111110100110 |
| 6/1 | 7 | 1111001 |
| 6/2 | 11 | 11111110111 |
| 6/3 | 16 | 1111111110100111 |
| 6/4 | 16 | 1111111110101000 |
| 6/5 | 16 | 1111111110101001 |
| 6/6 | 16 | 1111111110101010 |
| 6/7 | 16 | 1111111110101011 |
| 6/8 | 16 | 1111111110101100 |
| 6/9 | 16 | 1111111110101101 |
| 6/A | 16 | 1111111110101110 |

FIG. 29C

| NNNN/SSSS | CODE LENGTH | HUFFMAN CODE |
|---|---|---|
| 7/1 | 7 | 1111010 |
| 7/2 | 11 | 11111111000 |
| 7/3 | 16 | 1111111110101111 |
| 7/4 | 16 | 1111111110110000 |
| 7/5 | 16 | 1111111110110001 |
| 7/6 | 16 | 1111111110110010 |
| 7/7 | 16 | 1111111110110011 |
| 7/8 | 16 | 1111111110110100 |
| 7/9 | 16 | 1111111110110101 |
| 7/A | 16 | 1111111110110110 |
| 8/1 | 8 | 11111001 |
| 8/2 | 16 | 1111111110110111 |
| 8/3 | 16 | 1111111110111000 |
| 8/4 | 16 | 1111111110111001 |
| 8/5 | 16 | 1111111110111010 |
| 8/6 | 16 | 1111111110111011 |
| 8/7 | 16 | 1111111110111100 |
| 8/8 | 16 | 1111111110111101 |
| 8/9 | 16 | 1111111110111110 |
| 8/A | 16 | 1111111110111111 |
| 9/1 | 9 | 111110111 |
| 9/2 | 16 | 1111111111000000 |
| 9/3 | 16 | 1111111111000001 |
| 9/4 | 16 | 1111111111000010 |
| 9/5 | 16 | 1111111111000011 |
| 9/6 | 16 | 1111111111000100 |
| 9/7 | 16 | 1111111111000101 |
| 9/8 | 16 | 1111111111000110 |
| 9/9 | 16 | 1111111111000111 |
| 9/A | 16 | 1111111111001000 |
| A/1 | 9 | 111111000 |
| A/2 | 16 | 1111111111001001 |
| A/3 | 16 | 1111111111001010 |
| A/4 | 16 | 1111111111001011 |
| A/5 | 16 | 1111111111001100 |
| A/6 | 16 | 1111111111001101 |
| A/7 | 16 | 1111111111001110 |
| A/8 | 16 | 1111111111001111 |
| A/9 | 16 | 1111111111010000 |
| A/A | 16 | 1111111111010001 |

FIG. 29D

| NNNN/SSSS | CODE LENGTH | HUFFMAN CODE |
|---|---|---|
| B/1 | 9 | 111111001 |
| B/2 | 16 | 1111111111010010 |
| B/3 | 16 | 1111111111010011 |
| B/4 | 16 | 1111111111010100 |
| B/5 | 16 | 1111111111010101 |
| B/6 | 16 | 1111111111010110 |
| B/7 | 16 | 1111111111010111 |
| B/8 | 16 | 1111111111011000 |
| B/9 | 16 | 1111111111011001 |
| B/A | 16 | 1111111111011010 |
| C/1 | 9 | 111111010 |
| C/2 | 16 | 1111111111011011 |
| C/3 | 16 | 1111111111011100 |
| C/4 | 16 | 1111111111011101 |
| C/5 | 16 | 1111111111011110 |
| C/6 | 16 | 1111111111011111 |
| C/7 | 16 | 1111111111100000 |
| C/8 | 16 | 1111111111100001 |
| C/9 | 16 | 1111111111100010 |
| C/A | 16 | 1111111111100011 |
| D/1 | 11 | 11111111001 |
| D/2 | 16 | 1111111111100100 |
| D/3 | 16 | 1111111111100101 |
| D/4 | 16 | 1111111111100110 |
| D/5 | 16 | 1111111111100111 |
| D/6 | 16 | 1111111111101000 |
| D/7 | 16 | 1111111111101001 |
| D/8 | 16 | 1111111111101010 |
| D/9 | 16 | 1111111111101011 |
| D/A | 16 | 1111111111101100 |
| E/1 | 14 | 11111111100000 |
| E/2 | 16 | 1111111111101101 |
| E/3 | 16 | 1111111111101110 |
| E/4 | 16 | 1111111111101111 |
| E/5 | 16 | 1111111111110000 |
| E/6 | 16 | 1111111111110001 |
| E/7 | 16 | 1111111111110010 |
| E/8 | 16 | 1111111111110011 |
| E/9 | 16 | 1111111111110100 |
| E/A | 16 | 1111111111110101 |

FIG. 29E

| NNNN/SSSS | CODE LENGTH | HUFFMAN CODE |
|---|---|---|
| F/0 (ZRL) | 10 | 1111111010 |
| F/1 | 15 | 111111111000011 |
| F/2 | 16 | 1111111111110110 |
| F/3 | 16 | 1111111111110111 |
| F/4 | 16 | 1111111111111000 |
| F/5 | 16 | 1111111111111001 |
| F/6 | 16 | 1111111111111010 |
| F/7 | 16 | 1111111111111011 |
| F/8 | 16 | 1111111111111100 |
| F/9 | 16 | 1111111111111101 |
| F/A | 16 | 1111111111111110 |

FIG. 34

TABLE 1

| PDL CODE LIST | y TABLE | REGION 1202-a<br>$(y_{max}\ 1202\text{-}a > y_{max})$ AND<br>$(y_{min}\ 1202\text{-}a > y_{min})$ |
|---|---|---|
| ----- | ----- | ----- |
| CODE 1203<br>CODE 1205<br>CODE 1204 | $y_{max}$ 1203   $y_{min}$ 1203<br>$y_{max}$ 1205   $y_{min}$ 1205<br>$y_{max}$ 1204   $y_{min}$ 1204 | YES<br>YES<br>NO |
| --- | --- | ----- |

FIG. 44

```
/pel { 72 400 div } def              ──── W1
/square                          ⎫
 { newpath                       ⎪
   0 0 moveto                    ⎪
   0 1 lineto                    ⎬ ──── W2
   1 1 lineto                    ⎪
   1 0 lineto                    ⎪
   closepath                     ⎪
 } def                           ⎭
pel pel scale                        ──── W3
gsave                                ──── W4
512 832 translate                    ──── W5
2048 768 scale                       ──── W6
square                               ──── W7
1 0 0 setrgbcolor                    ──── W8 (RED)
fill                                 ──── W9
grestore                             ──── W10
1024 3136 translate                  ──── W11
2048 2048 scale                      ──── W12
square                               ──── W13
0 1 0 setrgbcolor                    ──── W14 (GREEN)
fill                                 ──── W15
copypage                             ──── W16
```

FIG. 45

```
/pel { 72 400 div } def                  ——— W17
/triangle
{ newpath
    0 0 moveto
    2 0 lineto                           }——— W18
    1 2 lineto
    closepath
} def
/diamond
{ newpath
    0 0 moveto
    3 -2 lineto                          }——— W19
    6 0 lineto
    3 2 lineto
    closepath
} def
initgraphics                             ——— W20
pel pel scale                            ——— W21
gsave                                    ——— W22
1024 1088 translate                      ——— W23
512 512 scale                            ——— W24
diamond                                  ——— W25
0 0 1 setrgbcolor                        ——— W26 (BLUE)
fill                                     ——— W27
grestore                                 ——— W28
2048 4160 translate                      ——— W29
1024 1024 scale                          ——— W30
triangle                                 ——— W31
1 1 0 setrgbcolor                        ——— W32 (YELLOW)
fill                                     ——— W33
showpage                                 ——— W34
```

| COLUMN 1 | COLUMN 2 | COLUMN 3 | | | | |
|---|---|---|---|---|---|---|
| COMMAND CODE | Y TABLE | REGION 0 | REGION 1 | . . . . | REGION 6 | REGION 7 |
| ⋮ | ⋮ | | | | | |
| CODE W9 ⋮ | Ymin   Ymax ⋮ | OFF | OFF | | OFF | |
| CODE W15 ⋮ | Ymin   Ymax ⋮ | OFF | ON | | OFF | |
| CODE W27 ⋮ | Ymin   Ymax ⋮ | OFF | OFF | | ON | |
| CODE W33 ⋮ | Ymin   Ymax ⋮ | ON | ON | | OFF | |

IMAGE PROCESSING METHOD AND APPARATUS PERMITTING USE OF PDL IN COMPRESSION MEMORY

This application is a continuation of application Ser. No. 07/738,616 filed Jul. 31, 1991 now abandoned.

BACKGROUND OF THE INVENTION

1. Field of the Invention

The present invention relates to an image processing method and apparatus for compressing image data.

2. Related Background Art

Hitherto, an image recording apparatus, for example, a thermal printer, an ink jet printer or a laser beam printer, has been used as a terminal in recording systems, that is, white/black printer having a bit map memory. However, the image recording apparatus has been widely used as an apparatus for precisely recording a full color image with recent trends of enlargement of the capacity of the semiconductor memory, development of excellent function LSI and advancement of the computer technology.

On the other hand, there arises a desire of fetching color natural image data into the computer so as to subject it to a variety of processes and perform picture communication. As an encoding method therefor, there has been a variable length encoding method called the "ADCT" (Adaptive Discrete Cosine Transform) method as disclosed in pages 398 to 407, Vol. 18, of the organ of the Picture Electronics Society.

In a case where an image memory arranged to act in accordance with the ADCT method is employed in the image recording apparatus, the memory capacity required to hold a full color natural image can be reduced to $1/10$ to $1/20$ of the capacity required to hold it as ordinary source data (non-compressed data). Therefore, a satisfactory effect can be obtained because the overall cost of the recording apparatus can be significantly reduced.

On the other hand, in a case where the same is used as a recording apparatus connected to an ordinary computer, it is usually used in such a manner that a standardized PDL (Page Description Language) is employed and data compatibility is established between different recording apparatuses. The reason for the above-described arrangement lies in the use of a common language to establish compatibility in the printers and the computers the specifications of which are different depending upon the manufacturers. As a description language of this type, for example, Post Script® can be used.

In a case where the above-described PDL is used in a memory, the following problems arises because the PDL has been developed on the basis of a concept of overwriting (that is, arranged to overwrite novel data on the base data written previously):

(1) A block among the 8×8 blocks of the ADCT in which an image is synthesized must be updated to novel code data.
(2) Since the variable length encoding method is employed to compress data, address coincidence cannot be made in a case where another image data item is superposed on a portion in which the base image is present.
(3) The overall code length of synthesized novel image data can be changed by the image quality.

Therefore, it has been considered that the PDL cannot be used in the compression memory.

On the other hand, the page printer has a frame buffer for one page and a page description language interpreter (hereinafter called an "interpreter") develops, on the frame buffer, a code described in a page description language processed by an application program loaded in the host computer.

However, the fact that the frame buffer for one page is provided in the apparatus will cause the problem that the hardware is enlarged excessively (15 Mbit in a case of 400 dpi in an A4 sheet with 1 bit/pixel). This is a critical problem when color data is processed. For example, when a full color (24 bits/pixel) image, in which each of red, green and blue is imaged by 8 bits/pixel, is formed, an excessively large memory capacity of 24 times the above-described capacity is required.

SUMMARY OF THE INVENTION

An object of the present invention is to overcome the above-described problems.

To this end, an object of the present invention is to provide an image processing apparatus capable of variably publishing an image.

In order to achieve the above-described object, according to one aspect of the present invention, there is provided an image processing apparatus comprising: memory means for storing encoded image data; converting means for interpreting command data so as to convert it into image data; decoding means for decoding the encoded image data stored in the memory means; synthesizing means for synthesizing the image data converted by the converting means and the image data decoded by the decoding means; and encoding means for encoding the image data synthesized by the synthesizing means.

Another object of the present invention is to provide an image processing apparatus capable of easily data-accessing the memory.

In order to achieve the above-described object, according to one aspect of the present invention, there is provided an image processing apparatus comprising: memory means which can be used by dividing into a plurality of areas each of which has a predetermined size; encoding means for encoding input image data to encoded data of a variable length in each predetermined area, wherein the memory means stores the encoded data for each area encoded by the encoded means to correspond to each area of the memory means.

Another object of the present invention is to provide an image processing apparatus capable of efficiently storing variable-length encoded data.

In order to achieve the above-described object, according to another aspect of the present invention, there is provided an image processing apparatus comprising: converting means for interpreting command data so as to convert it into image data; encoding means for encoding the image data converted by the converting means in each predetermined area; counting means for counting the amount of the encoded data encoded by the encoding means; memory means for storing the encoded data encoded by the encoding means; and controlling means for controlling a storing method performed by the memory means in accordance with the amount counted by the counting means.

Another object of the present invention is to efficiently store image data obtainable by interpreting command data.

In order to achieve the above-described object, according to another aspect of the present invention, there is provided an image processing method comprising the steps of: interpreting command data so as to convert it into multi-value image data; encoding the multi-value image data converted in each predetermined area; and storing the encoded data in a memory. Furthermore, there is provided an image processing method comprising the steps of: interpreting command data so as to convert it into image data; encoding the converted image data by using a perpendicular transformation; and storing the encoded data in a memory.

Another object of the present invention is to efficiently convert command data. In order to achieve the above-described object, according to another aspect of the present invention, there is provided an image processing apparatus comprising: receiving means for receiving command data described in page description language; determining means for interpreting the command data so as to determine whether or not it is, as the image data, developed in a predetermined area of a frame; output means for outputting command data which has been determined by the determining means that it is developed in the predetermined area of a frame; converting means for interpreting the command data output from the output means so as to convert it into image data; and encoding means for encoding the image data converted by the converting means.

Another object of the present invention is to provide a printer interface the memory capacity of which is reduced.

Another object of the present invention is to provide a method of efficiently compressing image data.

Another object of the present invention is to maintain the quality of image processed.

Another object of the present invention is to provide an interpreter of preferably processing command described in PDL, in particular, a language such as Post Script®.

Other and further objects, features and advantages of the invention will be appear more fully from the following detailed description of the preferred embodiments.

BRIEF DESCRIPTION OF THE DRAWINGS

FIG. 21 illustrates a quantization matrix according to the present invention;

FIGS. 24 to 29 illustrate Huffman code;

FIG. 34 illustrates a table;

FIG. 44 illustrates the page-described contents according to the present invention;

FIG. 45 illustrates the page-described contents according to the present invention;

DETAILED DESCRIPTION OF THE PREFERRED EMBODIMENTS

According to an embodiment of the present invention to be described later, the inner space of the compression memory is sectioned into fixed-length blocks, the length of each of which is longer than the average code length for the block raster. Then, each of the block raster is subjected to the reproduction, the changing and the re-coding processes so that the PDL can easily be used in the compression memory.

Figure 1A:
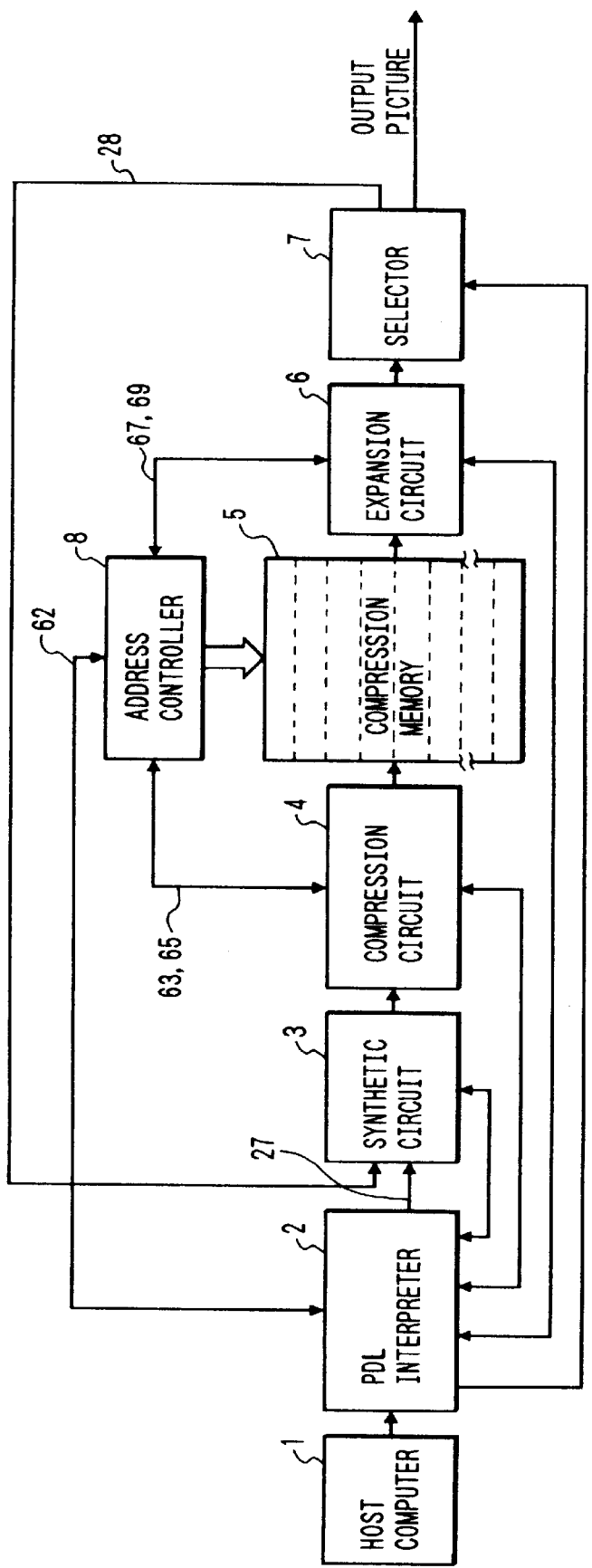
FIGS. 1A and 1B respectively are block diagrams which illustrate a first embodiment of the present invention.

FIG. 1A typically illustrates the characteristics of the present invention, where reference numeral 1 represents a host computer for outputting a command column described in the PDL. Reference numeral 2 represents an interpreter (hereinafter called a "PDL interpreter") for receiving the command column output from the host computer 1 so as to interpret and execute it. Reference numeral 3 represents a synthesizer for synthesizing the base data and image data novelly generated by the PDL interpreter 2. Reference numeral 4 represents a compressor for compressing data in accordance with the ADCT method. Reference numeral 5 represents a compression data memory which is sectioned into blocks, each of which has a sufficient memory quantity, at the time of usage. Reference numeral 6 represents a decoder and 7 represents a multiplexer for switching over the output from the decoder 6 to the synthesizer 3 or an image formation portion of a recording apparatus (omitted from illustration). Reference numeral 8 represents an address controller for a compression memory for controlling read/write of the compressed data.

When the PDL interpreter 2 receives the postscript PDL command from the host computer 1, it discriminates the image portion to be changed in accordance with the above-described command so as to control the address controller 8 and the decoder 6 to sequentially read out block raster data including the above-described portion from the compression memory 5 so as to decode and output it. Simultaneously, the PDL interpreter 2 controls the multiplexer 7 so as to cause data decoded by the decoder 6 to be transmitted to the synthesizer 3. Furthermore, the PDL interpreter 2 controls the synthesizer 3 in such a manner that the synthesizer 3 receives decoded data transmitted from the decoder 6 to store it in the buffer. The PDL interpreter 2 overwrites novel data, which has been generated in accordance with the above-described command, in the region which corresponds to the position of the pixel in the block raster which has fetched the decoded data. After data corresponding to the block raster region has been written, the PDL interpreter 2 controls the synthesizer 3, the compressor 4 and the address controller 8 so that the block raster region is again compressed by the compressor 4 and it is re-stored in the subject position in the compression memory 5. The above-described sequence is repeated for all of the black rasters.

Figure 1B:
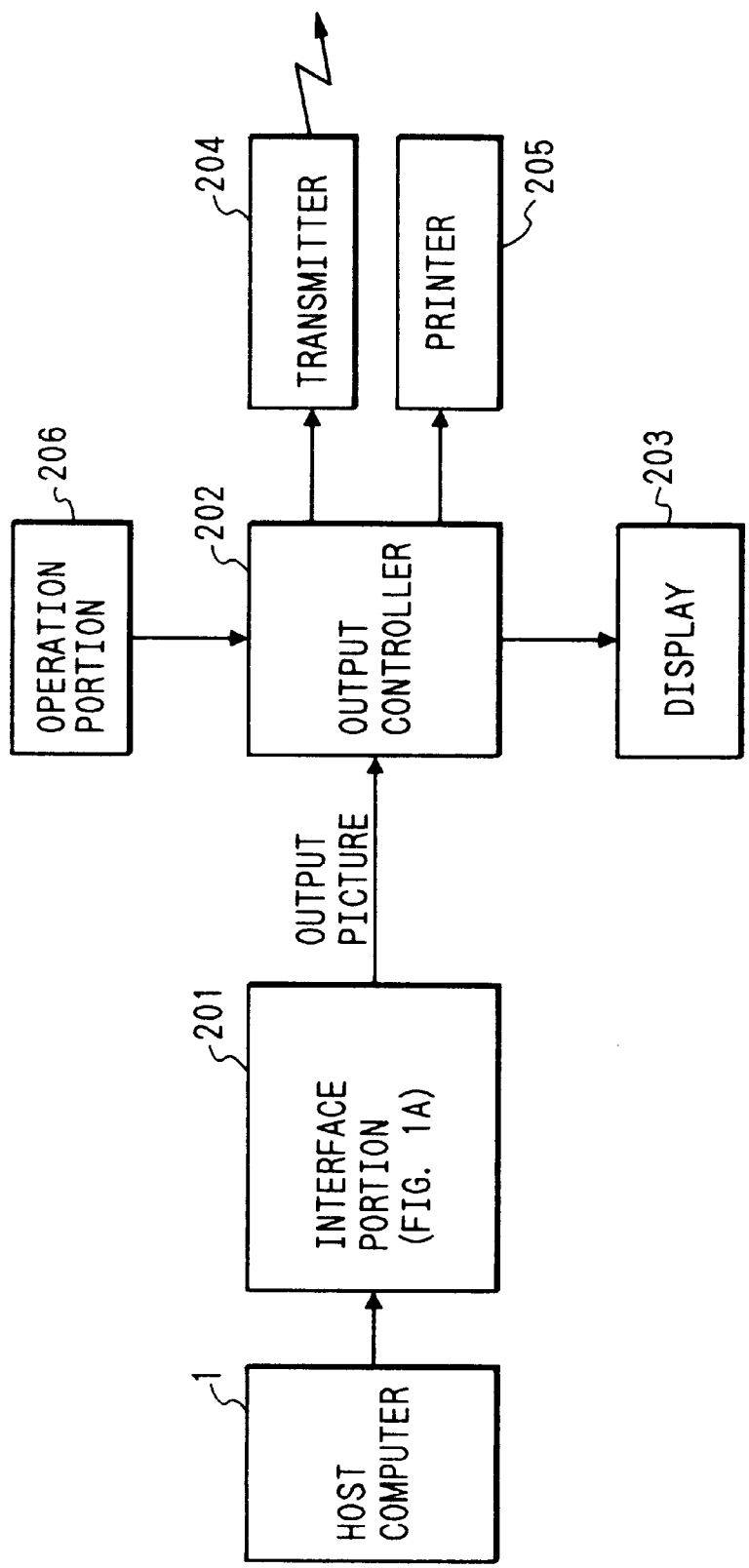

FIG. 1B illustrates the structure of the overall system including the interface portion shown in FIG. 1A. Referring to FIG. 1B, reference numeral 1 represents a host computer, 201 represents an interface portion shown in FIG. 1A and 202 represents an output controller for controlling the output signal. Reference numeral 203 represents a display for displaying the output image and 204 represents a transmitter for transmitting the output image through, for example, a public line or a local area network. Reference numeral 205 represents a laser beam printer for forming a latent image by applying laser beams to the surface of a photosensitive member so as to form a visible image from the latent image. Reference numeral 206 represents an operation unit for setting the area to which the output so that an image desired by an operator is transmitted.

Figure 2:
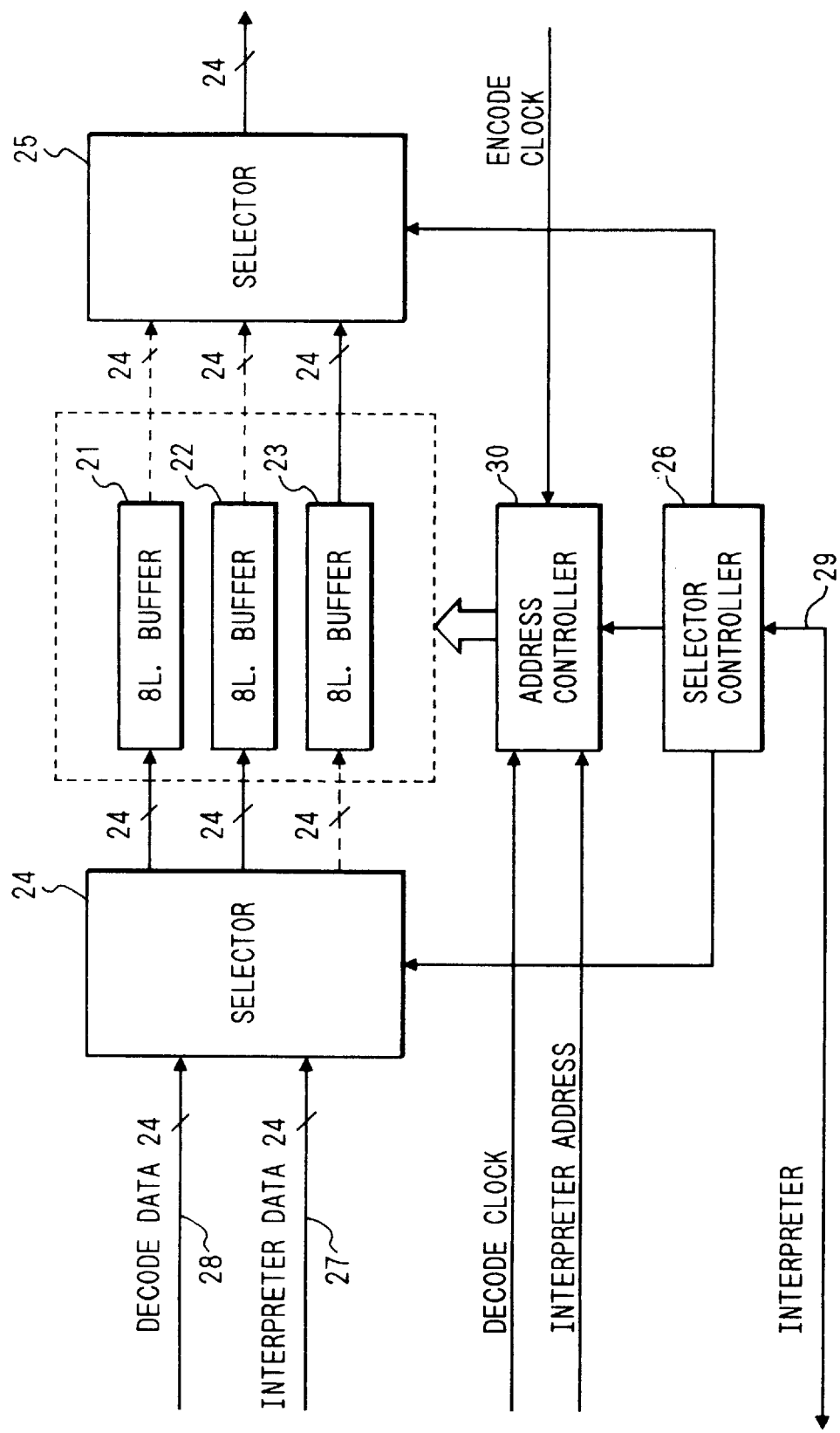
FIG. 2 is a structural view which illustrates a synthesizer.

FIG. 2 illustrates an example of the structure of the synthesizer shown in FIG. 1A. Reference numerals 21, 22 and 23 respectively represent buffers each of which is composed of 8 raster buffers, the raster buffer having a capacity capable of holding decoded data of a quantity for one block raster. Reference numeral 24 represents a selector for individually connecting output data 27 transmitted from the PDL interpreter 2 and signal data 28 decoded by the decoder 6 and supplied via the selector 7 to any one of the 8-line buffers 21, 22 and 23 in response to a signal 29 transmitted by a selector controller 26 controlled by the PDL interpreter 2. Reference numeral 25 represents another selector for selectively transmitting an output from any one of the above-described 8-line buffers 21, 22 and 23. The selector controller 26 transmits/receives the timing, at which the buffers 21 to 23 are switched over, to and from the PDL interpreter 2. That is, when the PDL interpreter 2 issues a command signal to write data in a novel buffer, the selector controller 26 switches over the 8-line buffers 21, 22 and 23 in a sequential order as 21→22→23→21→ . . . so as to connect them to a signal line group 27. Simultaneously, it switches over the 8-line buffers in the sequential order as 22→23→21→22→ . . . so as to connect them to a signal line group 28. As a result, data serving as the base of the block raster which is overwritten by the PDL interpreter 2 is synthesized so as to be stored. Simultaneously, the selector controller 26 controls the selector 25 to switch over the 8-line buffers in the sequential order 23→21→22→3→ . . . o as to transmit data, in which overwriting from the PDL interpreter 2 on the base data has been completed, to an encoder 4. Reference numeral 30 represents an address controller which receives a scanning line synchronous signal (HSYNC) and a pixel synchronous signal (PXCLK) transmitted from the decoder, a data output address transmitted from the PDL interpreter, a scanning line synchronous signal and a pixel synchronous signal transmitted from the encoder. The address controller 30 generates the address in the 8-line buffer from which pixel data is output, the address in the 8-line buffer from which pixel data on which data transmitted from the PDL interpreter is overwritten is output and the address in the 8-line buffer from which pixel data transmitted so as to be encoded to the encoder is output, each of the addresses being decoded by the decoder. The generated addresses are then transmitted to any one of the three 8-line buffers in response to a select signal supplied from the selector controller 26.

Figure 3:
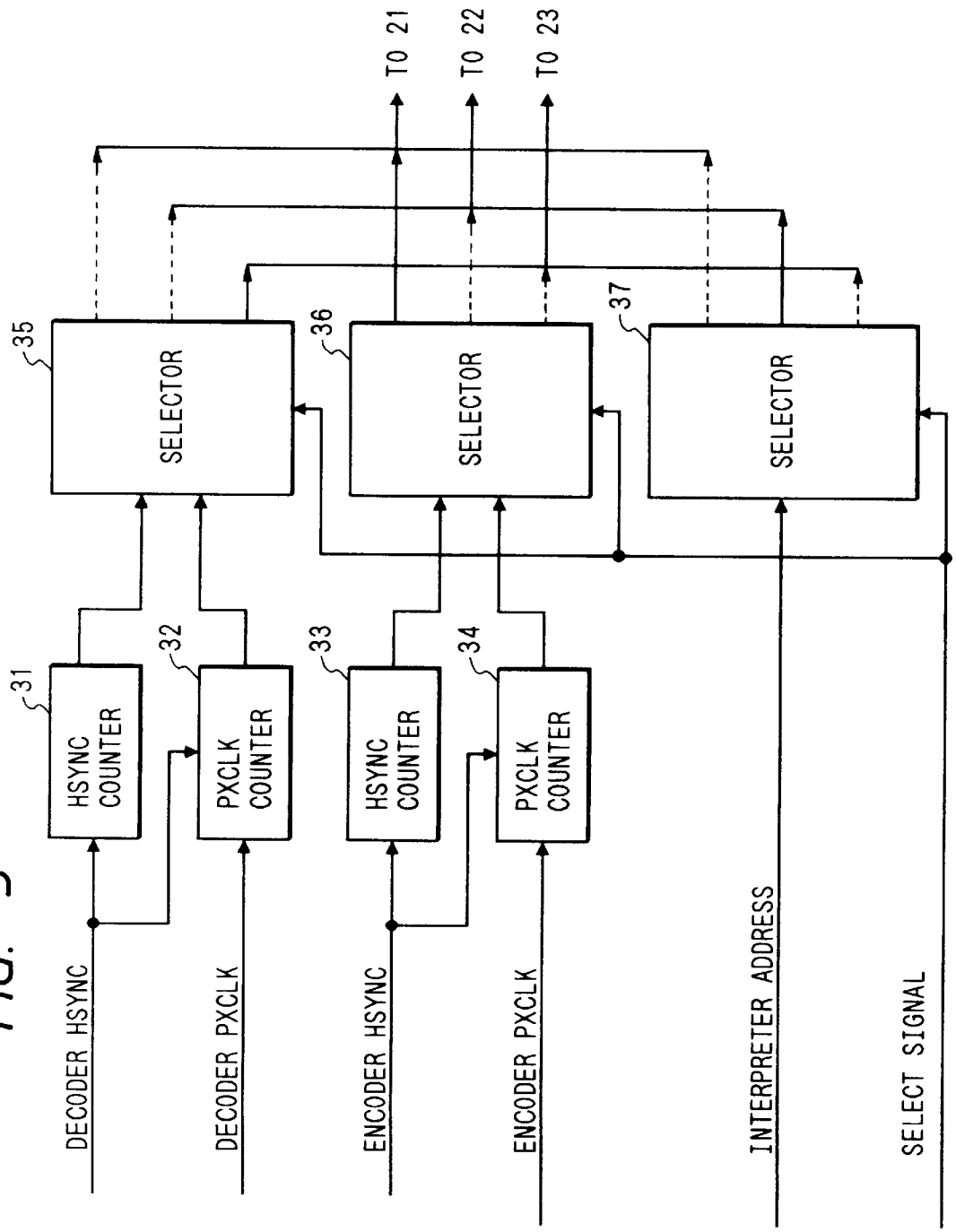
FIG. 3 is a structural view which illustrates an address controller disposed in the synthesizer.

FIG. 3 illustrates an example of the structure of the address controller 30. Reference numeral 31 represents a counter for counting the scanning synchronous signals (HSYNC) supplied from the decoder. Reference numeral 32 represents a counter for counting the pixel synchronous signals (PXCLK) supplied from the decoder. The counter 32 outputs, as its count, the address which corresponds to the position in the main scanning direction in one scanning line. The counter 32 outputs, as its count, the upper bit of the address of the leading pixel in each scanning line in one raster block. The output from the counter 31 is made to be the upper it, while the output from the counter 32 is used as an address signal of the ensuing lower bit. As a result, a storage address on the 8-line buffer for the output data from the decoder is generated. The counter 32 is set in response to the scanning synchronous signal (HSYNC). Similarly, counters 33 and 34 receive the synchronous signals transmitted from the encoders. The counter 33 counts the scanning synchronous signal (HSYNC) transmitted from the encoder, while the counter 34 counts the pixel synchronous signal (PXCLK) transmitted from the encoder. As a result, similarly to the counters 31 and 32, the storage address on the 8-line buffer for data to be transmitted to the encoder is generated. The selector 35 is a selector for transmitting the addresses generated by the counters 31 and 32 to any one of the line buffers 21, 22 and 23 selected in response to the select signal supplied from the selector controller 26 so that data decoded by the decoder is stored. The selector 36 is a selector for transmitting the addresses generated by the counters 33 and 34 to any one of the 8-line buffers 21, 22 and 23 selected in response to a select signal supplied from the selector controller 26 so that held data is transmitted to the encoder. The selector 36 is also arranged to transmit the address signal supplied from the PDL interpreter to any one of the 8-line buffers 21, 22 and 23 in response to the select signal supplied from the selector controller 26 in order to hold the base data to be overwritten. Thus, data overwritten on the base data is again transferred to the encoder 4 so as to be compressed. Compressed data is transmitted from the encoder 4 to the compression memory 5 so as to be stored.

Then, the encoding method according to this embodiment will now be described.

Figure 20:
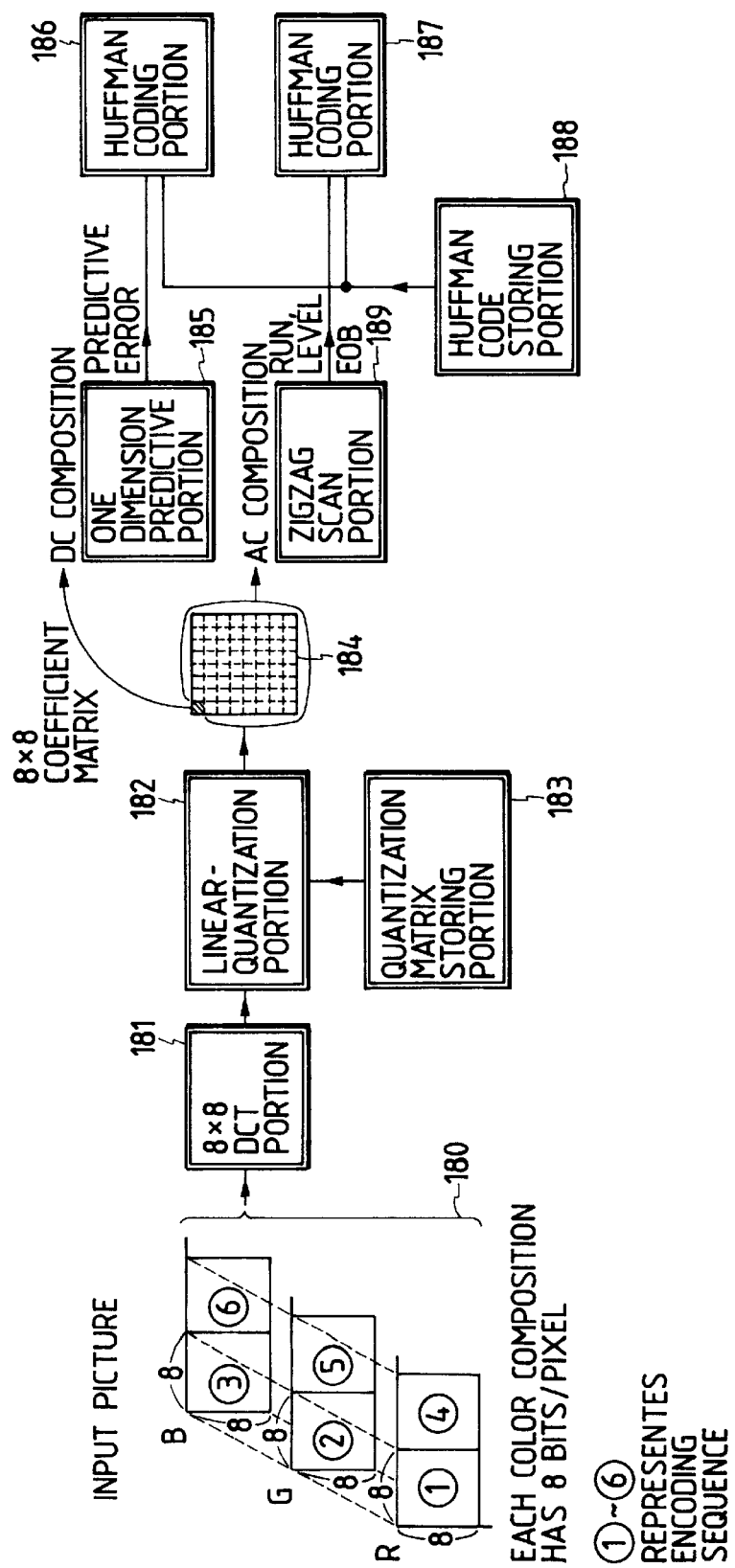
FIG. 20 illustrates an encoding method according to the present invention.

FIG. 20 illustrates the overall flow of the processes to be performed in the encoding method according to the present invention.

First, the original image is sectioned into block regions each of which is composed of 8×8 pixels. As designated by reference numeral 180, data for each of color components R, G and B of the original image is received so that a 64-pixel data block for only red of a certain original square image composed of 8×8 pixels, a 64-pixel data block for only green of the same, and a 64-pixel data block for only blue of the same are processed. Then, the 8×8 pixel block adjacent to the above-described 8×8 pixel square block of the original image is subjected to a process performed in such a manner that red data, green data and blue data are sequentially processed. When the subject block raster has been thus processed, the process of the ensuing block rasters are sequentially performed in units of 8×8 pixel block in a direction form left to right. In a process 181, each of the color components of 8×8 is processed in accordance with DCT (Discrete Cosine Transform) by a size of 8×8. Then, each value of the results (which can be expressed by a matrix the size of which is 8×8) of the above-described process is quantized by a quantization portion 182 in each term of 8×8 by a quantization step value 183 (64 fixed-value group which corresponds to the matrix 8×8) which has been previously stored in a memory comprising a ROM or a RAM. Although it is preferable that a quantization matrix be the most suitable value with which the encoding efficiency can be obtained for the subject color components, it can be arbitrarily established, basically. FIG. 21 illustrates an example of the quantization step value according to this embodiment.

Figure 22:
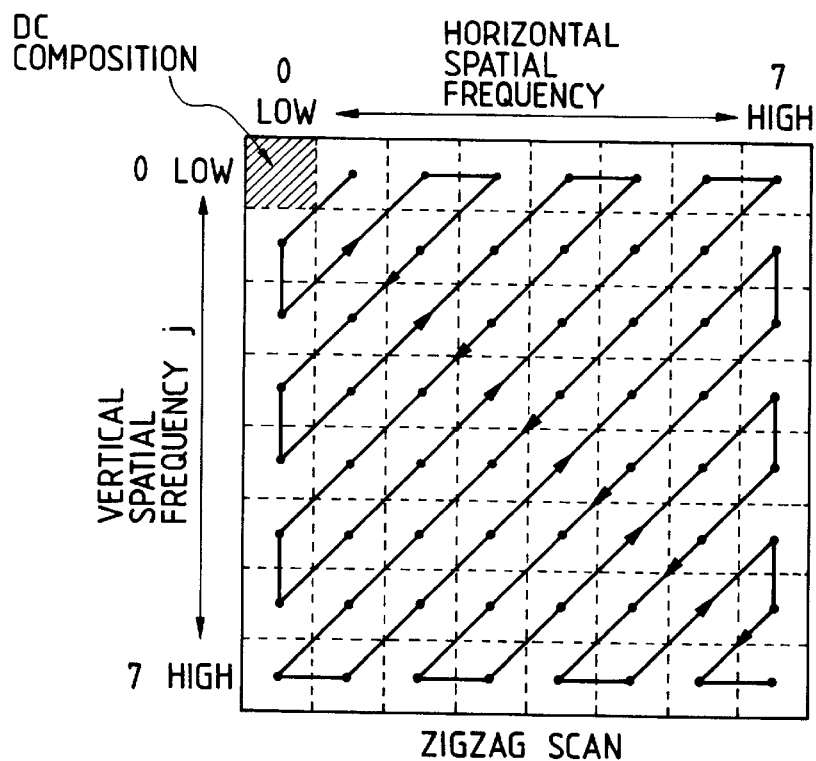
FIG. 22 illustrates a method of zigzag scanning.

As shown in FIG. 22, a DCT coefficient 184 obtained after the thus-performed linear quantization is displayed on the coordinate in which horizontal directional position i is rightward arranged from 0 to 7 and vertical directional position j is downward arranged from 0 to 7 so as to display the position of each term on coordinate (i, j). In this case, position (0, 0) denotes the DC component in such a manner that i is in proportion to the horizontal directional spatial frequency and j is in proportion to the vertical directional spatial frequency.

Each of the term of the DCT coefficient which has been 8×8 quantized is encoded in such a manner that the DC component positioned at (0, 0) and the AC component position at the other position are divided from each other.

Figure 23:
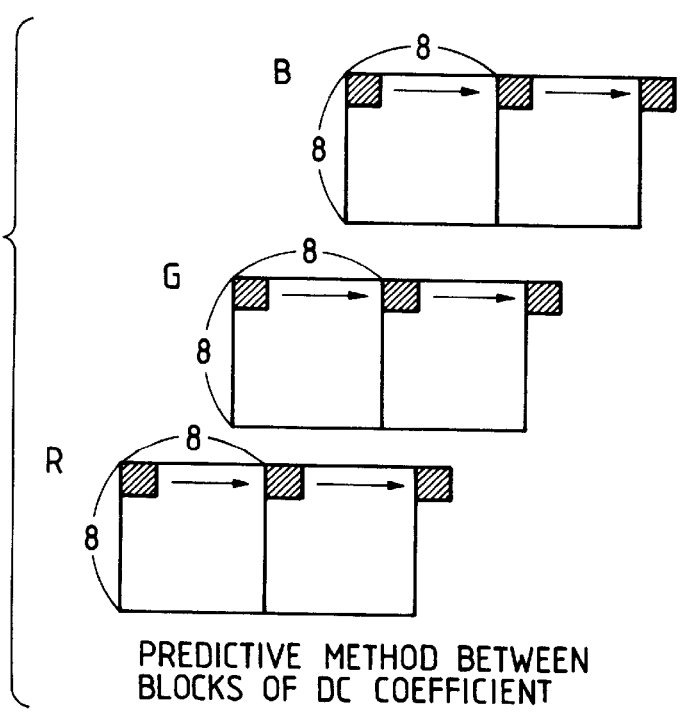
FIG. 23 illustrates a predictive method between blocks of DC coefficient.

In a one-dimensional predictive portion 185 performs a one-dimensional prediction between the adjacent blocks of the DC component so that a predictive error is generated. That is, value Deltak which is the result of subtraction of DC component DC (0, 0)k−1 of the forward adjacent block from the DC component DC (0, 0)k of the subject block is made to be the predictive error of the subject block (Deltak=DC(0, 0)k−DC(0, 0)k−1). The prediction between the blocks is performed as shown in FIG. 23 in such a manner that each of the color components is subjected to it between the subject block and the forward adjacent block.

In a Huffman encoding portion 186, the above-described predictive error is encoded in accordance with the correspondence shown in FIG. 24, the value of code SSSS thus-obtained is Huffman-encoded. The value of SSSS denotes the number of bits required to specify the value in the subject group as well as denoting the above-described group of the predictive error. For example, there is a necessity of two bits to identify the member of a group SSSS=2 which contains four members −3, −2, 2 and 3. After the value of SSSS has been Huffman-encoded, the additional SSSS bits are subsequently added. The Huffman code must be previously set in 188 so as to make the length of the code, which is frequently generated, to be short enough.

Figure 25:
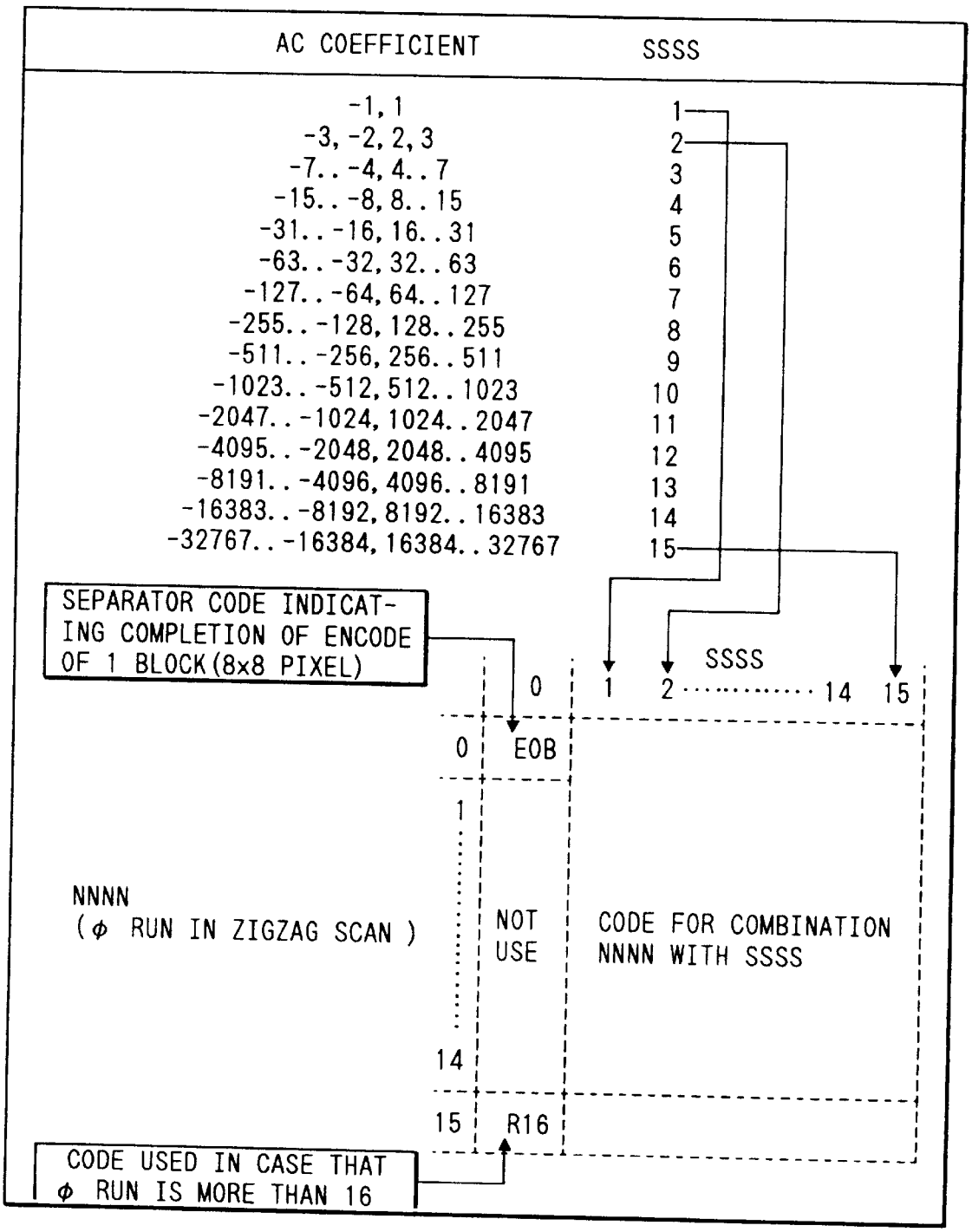
Figure 30:
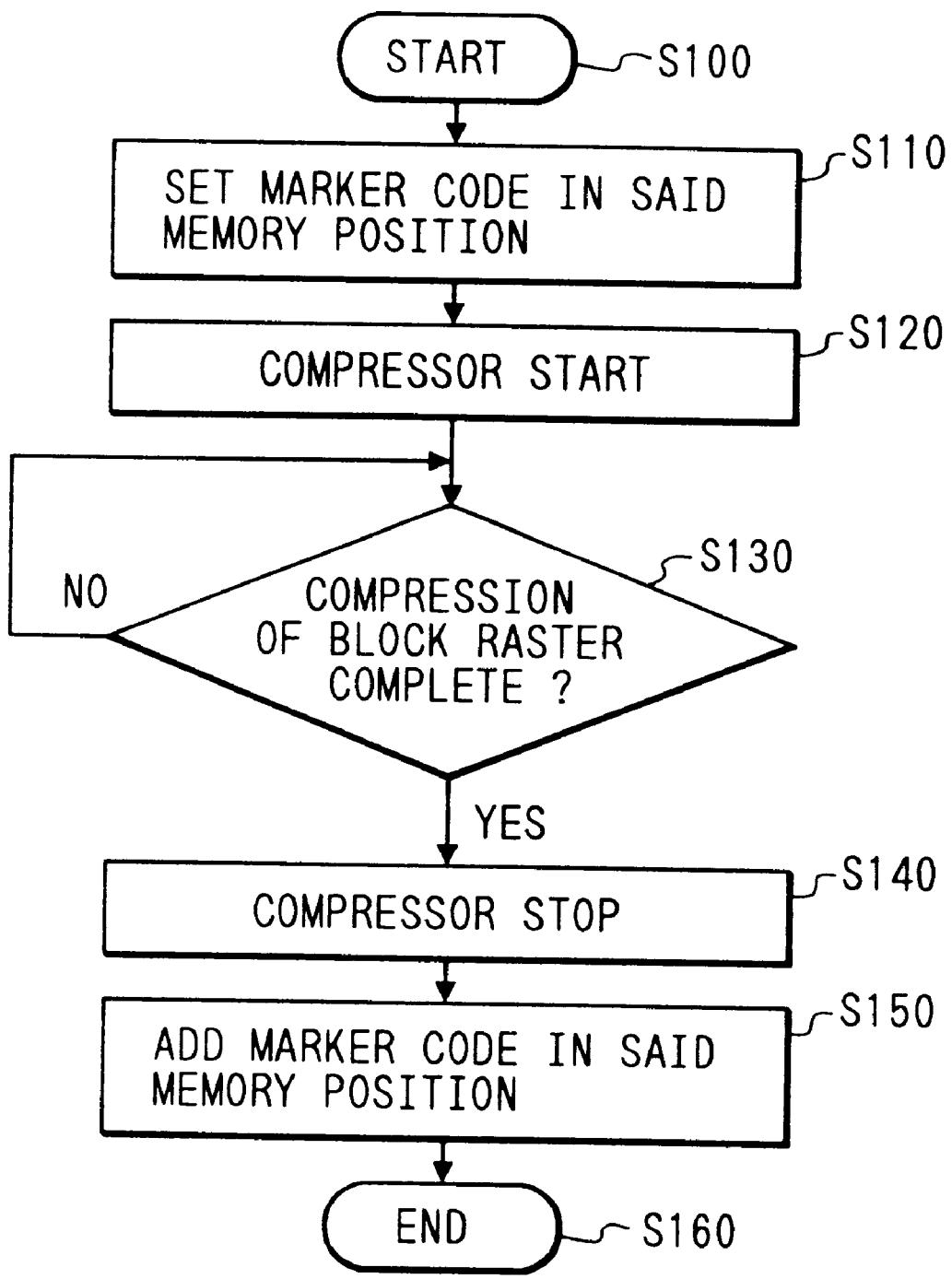
FIG. 30 is a flow chart which illustrates a process of adding a marker code.

The AC component is, as shown in FIG. 22, zigzag-scanned from its low frequency component to the high frequency component in the 8×8 coefficient matrix. As shown in FIG. 25, coefficients except for 0 are classified into any one of 15 groups depending upon their value. This identification code is made to be SSSS (an integer selected from 1 to 15). On the other hand, the number of 0 interposed by the coefficient which is other than 0 is made to be NNNN. Since the coefficient matrix is composed of 8×8 pixels and thereby includes 63 AC coefficients, code R16 shown in Table 6 is repeatedly generated until the residual number is reduced to 15 or less. As a result, NNNN is arranged to be 15 or less. The codes SSSS and NNNN are, as an alternative to a structure in which they are processed individually, Huffman encoded as shown in FIG. 25 as a pair. The Huffman code thus-obtained must be previously set in 188 so as to make the length of the code of the pair of SSSS and NNNN, which is frequently generated, to be short enough. Code EOB (End of Block) is added to the end portion of the code of the block of each of the color components. FIGS. 26 to 29 illustrate an example of a Huffman code table according to this embodiment. Since the signals denoting red, green and blue each have a length of 8 bits according to this embodiment, the DCT coefficient does not exceed 10 bits. As a result, it is sufficient for SSSS to correspond to 0 to 10 and therefore SSSS's of 12 or more (for DC component) and 11 or more (for AC component) are omitted from the table.

Then, the control of the compressor 4 and the compression memory 5 performed by the PDL interpreter 2 will now be described with reference to a flow chart shown in FIG. 22. As a result of the following sequential control, the histeresis information to the forward adjacent position of the image data can be reset.

FIG. 22 illustrates the operation of the PDL interpreter 2 for processing image data for a certain small region.

The PDL interpreter 2 commences its control operation in step S100 to start the compression of image data of the certain small region. In S110, a restart (RST) marker code is written to a memory position at which compressed data given by the address controller 8 must be stored. The address controller 8 is again set in order to prevent the deviation of the memory address by a degree corresponding to the above-described marker code. In S120, the compressor 4 is then started so as to compress/encode data on the synthesizer 3. In S130, the status of the compressor 4 is supervised through its control register so that the completion of the operation of the compressor 4 is confirmed before the process proceeds to S140. In S140, the operation of the compressor 4 is stopped. In S150, the EOI (End Of Image) marker code is added to the code written on the above-described memory. In S160, the operation of compressing the subject small region is completed. The previous value buffer of the compressor 4 is reset whenever the above-described operation for the small region is completed.

On the other hand, the decoder 6 has a function capable of detecting the above-described marker code and is arranged in such a manner that, when it detects the above-described restart (RST) marker code, its register holding the hysteresis before the previous value is reset. As a result, the hysteresis before the previous value of each of the small regions can be reset. The decoder 6 has a function of stopping its operation when it detects the EOI (End Of Image) marker code and to transmit a signal for communicating this fact outside. As a result of the signal transmission, the decoder 6 is capable of communicating the fact that decoding of encoding data for small regions by generating the interruption signal in the PD interpreter.

Each of the block rasters is subjected to the above-described process until the compression process has been completed.

Figure 4:
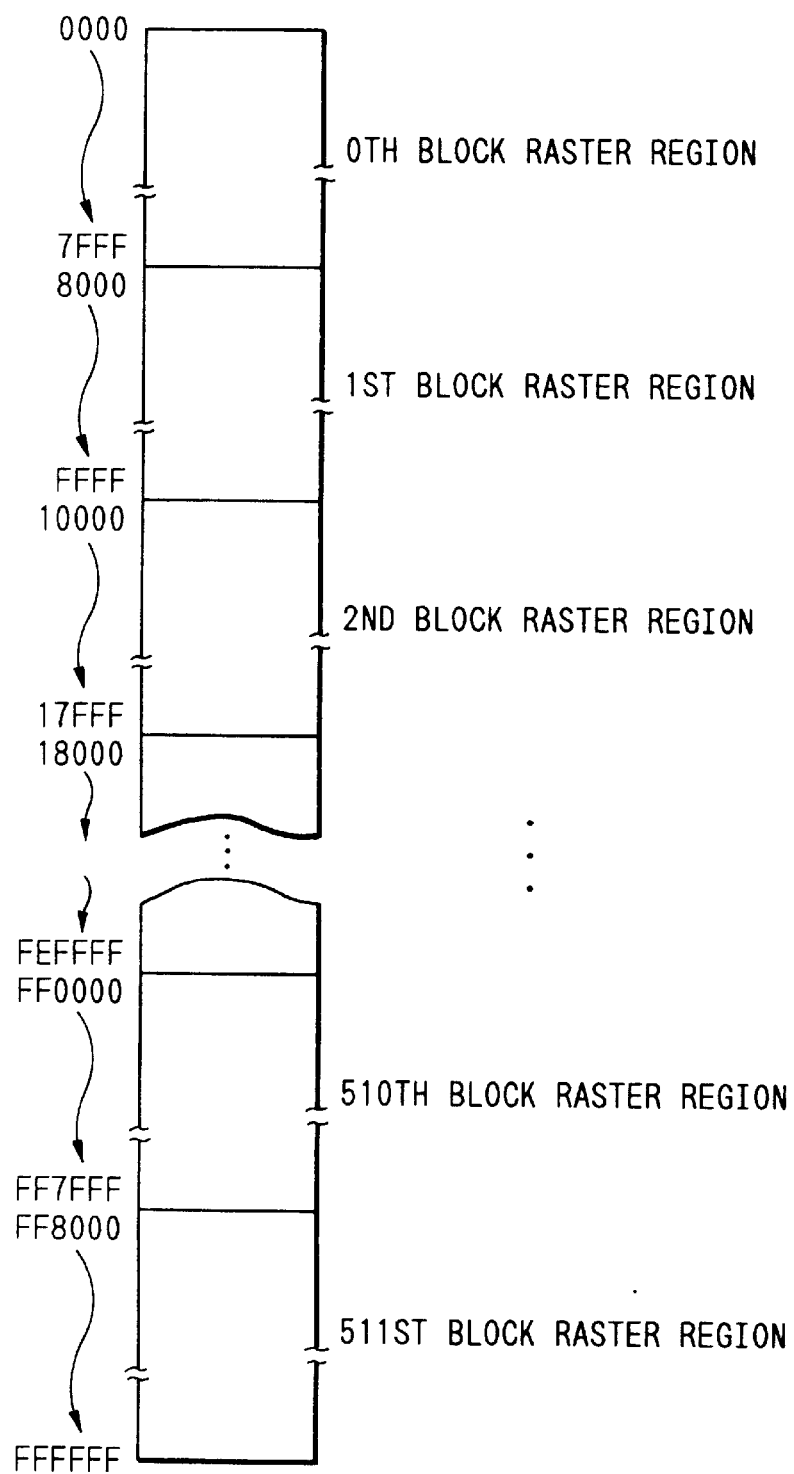
FIG. 4 illustrates a data region which illustrates each block raster on a compression memory.

FIG. 4 illustrates the position at which compressed data corresponding to each of the block rasters is stored in the compression memory. For example, an assumption is made that an image the number of pixels of which is less than 4096×4096 and one pixel of three colors R, G and B requires 3 bytes (1 byte/color) is processed. The maximum image has a capacity of 48 MBytes. Another assumption is made that the compression ratio which is realized by the encoder 4 is set to $\frac{1}{12}$. Each of the blocks of the block raster is constituted in units of 8×8 pixels so as to be compressed. As a result, the image of the maximum size is constituted by 512×512 blocks. The image of the maximum size is compressed to a capacity of about 4 MBytes, causing the average code length per block raster to be 8 KBytes. According to this embodiment, a memory capacity of 4 times the average code length is assumed as a sufficiently large capacity per block raster. As shown in FIG. 4, the compression memory has a compression memory region for each block raster at every 32 KBytes. That is, the compression memory is sectioned into blocks each of which has a sufficient capacity with respect to the average code length of each of the block rasters.

Figure 5:
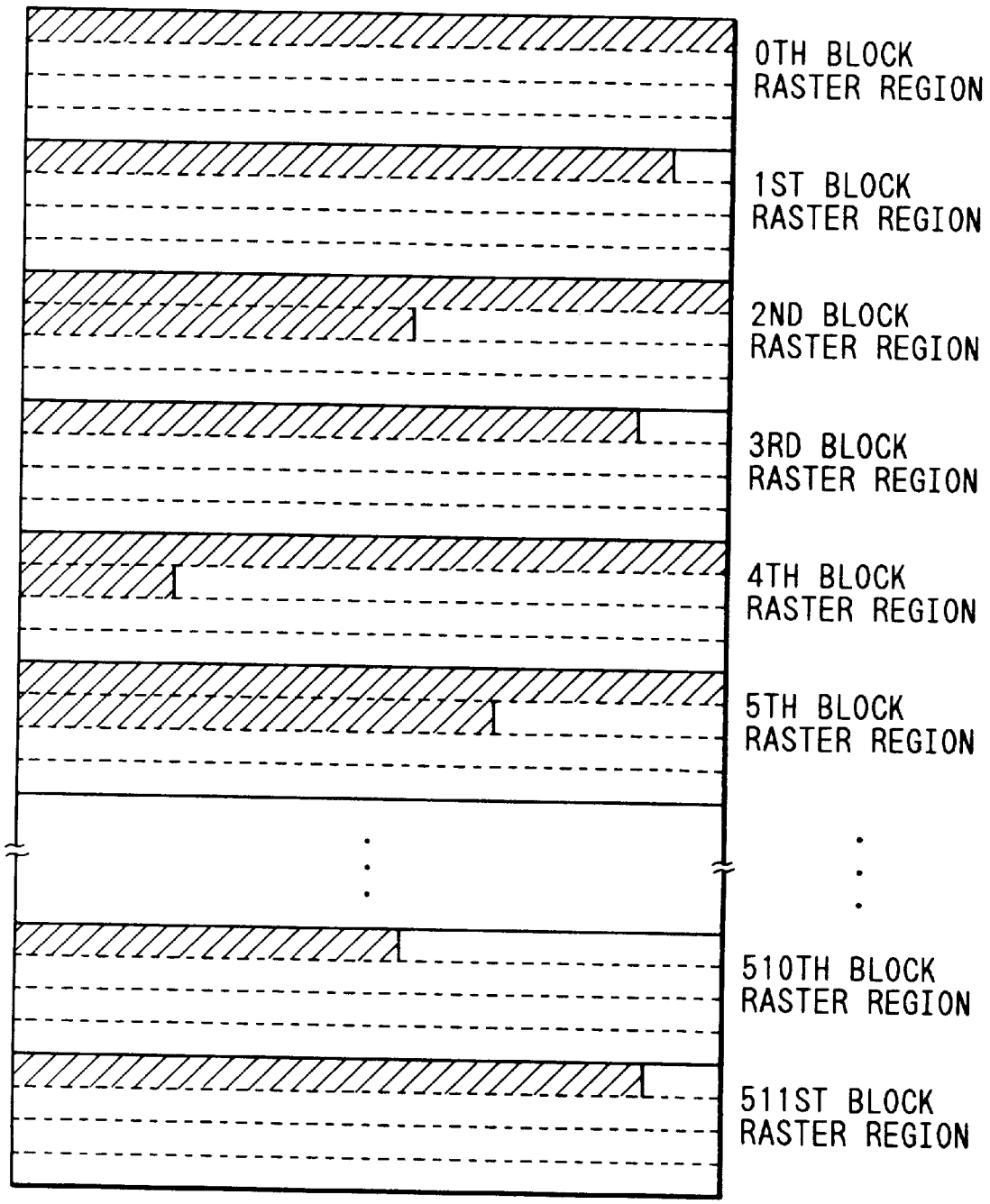
FIG. 5 illustrates data held on the compression memory.

FIG. 5 illustrates a status of data actually held by the compression memory shown in FIG. 4. The blocks shown in FIG. 5 are the same as the data regions of the block rasters shown in FIG. 4. Furthermore, the compression memory regions for the block rasters are formed at every 4 times the average code length. The diagonal line portions are the regions which store the code for each of the block rasters.

Figure 6:
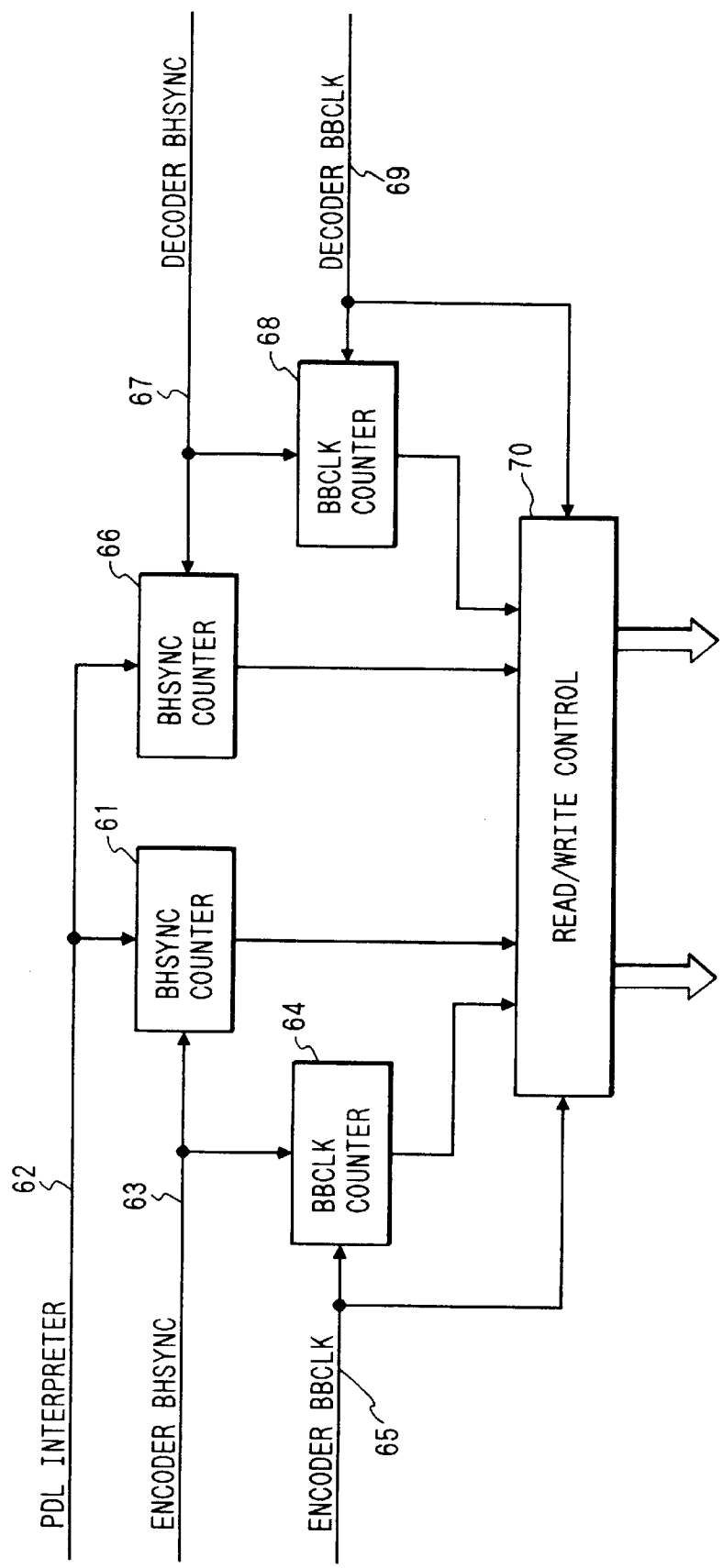
FIG. 6 is a structural view which illustrates the address controller for a compression memory.

FIG. 6 illustrates the structure of the address controller 8 shown in FIG. 1, where reference numeral 61 represents a counter for counting the synchronous signals of the block raster so that the block raster to be selected from the compression memory so as to be compressed is designated by the count value. A value corresponding to the block address to be written by the PDL interpreter 62 is set as the initial value of the counter 61 through a signal line 62. Furthermore, a block raster synchronous signal supplied from the encoder 9 is counted. Reference numeral 64 represents a counter for counting the data transference clock for each byte transmitted from the encoder 9 so as to designate the position in the block raster data at which it is stored by its count value. The counter 64 is reset in response to the raster synchronous signal. Reference numeral 66 represents a counter for counting the block raster synchronous signal similarly to the counter 61. The number of the block raster including the pixel position to be overwritten by the PDL interpreter 62 is set as the initial count. Subsequently, the block raster synchronous signal 67 supplied from the decoder is counter so as to indicate, with the count value, the region of the block raster in the compression memory to be accessed. Reference numeral 68 represents a counter for counting the data transferring clock similarly to the counter 64 in such a manner that the position in the block raster data to be read is indicated with the count value. The counter 68 is reset in response to the raster synchronous signal transmitted from the decoder. The counters 61 and 64 are used in such a manner that the count value of the counter 61 is used as the upper address signal and the count value of the counter 64 is used as the lower address signal before they are combined to each other so as to be used as the write data address of the compression memory. Similarly, the counters 66 and 68 are used in such a manner that the count value of the counter 66 is used as the upper address signal and the count value of the counter 68 is used as the lower address signal before they are combined to each other so as to be used as the read data address from the compression memory. Reference numeral 70 represents a read/write control circuit for receiving the above-described write data address, the read data address, a data transfer clock 65 transmitted from the encoder and a data transfer clock 69 transmitted from the decoder so as to control the reading/writing address and timing to and from the above-described compression memory.

The encoder and the decoder can easily be constituted by using, for example, an LSI such as CL550 manufactured by C-Cube, U.S.A., in such a manner that a circuit for adjusting the synchronous signal or the like is added if necessary.

The sectioning of the above-described block raster is controlled by using the marker code. By using the marker code, the block rasters are individually encoded/decoded. As for the marker code, there has been disclosed in detail in the above-described organ (published from the Image Electronic Society).

Embodiment 2

Figure 7:
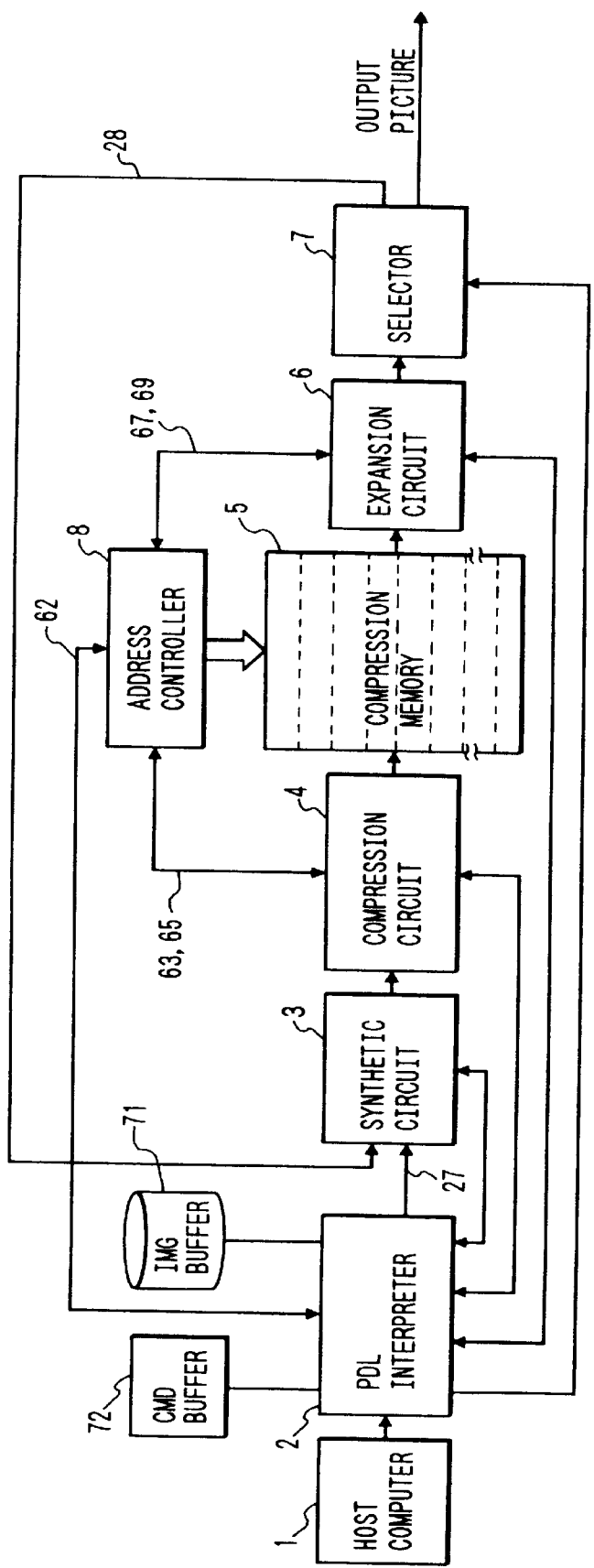
FIG. 7 is a block diagram which illustrates a second embodiment of the present invention.

The PDL interpreter 2 according to the above-described embodiment is arranged in such a manner that it discriminates the image position to be changed in response to a PDL command supplied from the host computer 1. Furthermore, it performs decoding, rewriting and re-encoding. However, the present invention is not limited to this. For example, another structure may be employed which is arranged in such a manner that an image buffer 71 and a command buffer 72 are, as shown in FIG. 7, used to temporarily hold the PDL command and data supplied from the host computer by a quantity for a plurality of commands. Then, the position to be changed due to each command is discriminated for every set of commands of a certain number so that rewriting of the same block raster is performed collectively. That is, the rewriting which relates to the decoding→the subject block raster may be performed in the sequential order as execution→re-coding.

As described above, by subjecting a certain number of commands to the process after they are temporarily held in the buffer, the required number of decoding and encoding processes can be reduced. Therefore, the degree of deterioration in the image quality due to the above-described processes can be prevented. Furthermore, another effect of shortening the required waiting time due to the execution of the commands made with respect to the host computer can be obtained.

As described above, according to the above-described embodiment, the image data is published and processed by using the compression memory. As a result, the overall cost can be significantly reduced in a case where a memory having a data capacity which is sufficiently large to hold actual data is used.

Furthermore, this embodiment is arranged in such a manner that compressed data is processed for each block raster and the compression memory is sectioned into blocks each of which has a sufficient capacity with respect to the average code length of the block raster. Therefore, an effect can be obtained in that an image can easily be published and processed by using the compression method of the variable-length-coding type.

Although the PS (Post Script) is employed as the PDL according to the above-described embodiment, the other PDL can, of course, be employed.

The method of the compression is not limited to ADCT. The other perpendicular transformation encoding method, predictive encoding method, a run length encoding method and the like may be employed.

The publishing method is not limited to the overwriting method. As an alternative to this, a calculation by using the previous data and posterior data (for example, a multiplication is performed or the AND or the OR is calculated). That is, a process such as overlaying or modulation may be performed.

The output signal decoded can be formed into a hard copy by a laser beam printer, an ink jet printer, a thermal printer or the like as well as displaying it by a display means.

As described above, according to the present invention, the image can be variously processed by using compressed data.

Embodiment 3

Figure 8:
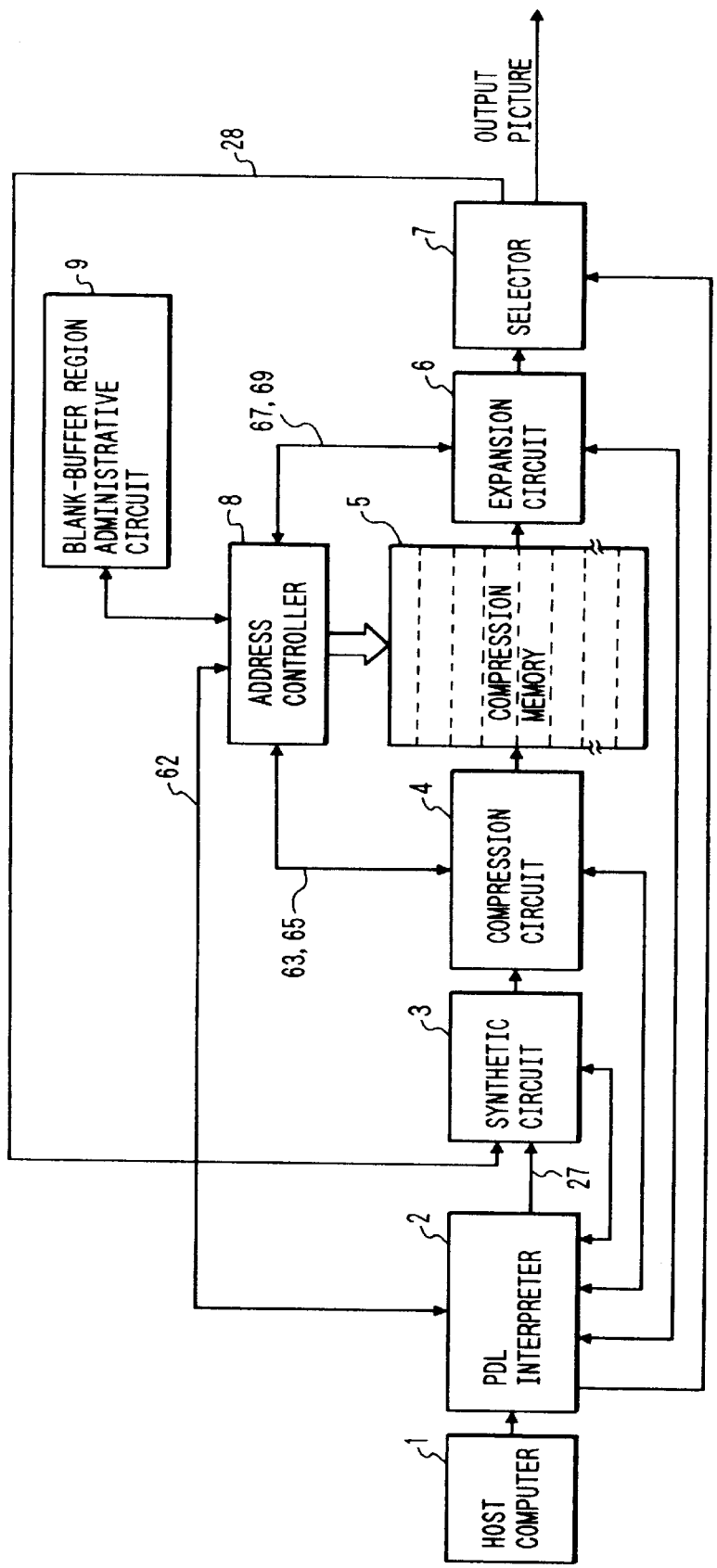
FIG. 8 is a block diagram which illustrates a third embodiment of the present invention.

FIG. 8 typically illustrates the characteristics of the present invention, where reference numeral 1 represents a host computer for outputting a command column described in the PDL. Reference numeral 2 represents an interpreter (hereinafter called a "PDL interpreter") for receiving the command column output from the host computer 1 so as to interpret and execute it. Reference numeral 3 represents a synthesizer for synthesizing the base data and image data novely generated by the PDL interpreter 2. Reference numeral 4 represents a compressor for compressing data in accordance with the ADCT method. Reference numeral 5 represents a compression data memory which is sectioned into blocks, each of which has a sufficient memory quantity, at the time of usage. Reference numeral 6 represents a decoder and 7 represents a multiplexer for switching over the output from the decoder 6 to the synthesizer 3 or an image formation portion of a recording apparatus (omitted from illustration). Reference numeral 8 represents an address controller for a compression memory for controlling read/write of the compressed data. Reference numeral 9 represents a blank buffer region administrative circuit which is used by the address controller for the purpose of controlling the blank area in the compressed memory 5.

When the PDL interpreter 2 receives the postscript PDL command from the host computer 1, it discriminates the image portion to be changed in accordance with the above-described command so as to control the address controller 8 and the decoder 6 to sequentially read out data of the block raster including the subject position from the compression memory 5 so as to decode and output it. Simultaneously, the PDL interpreter 2 controls the multiplexer 7 so as to cause data decoded by the decoder 6 to be transmitted to the synthesizer 3. Furthermore, the PDL interpreter 2 controls the synthesizer 3 in such a manner that the synthesizer 3 receives decoded data transmitted from the decoder 6 to store it in the buffer. The PDL interpreter 2 overwrites novel data, which has been generated in accordance with the above-described command, in the region which corresponds to the position of the pixel in the block raster which has fetched the decoded data. After data corresponding to the block raster region has been written, the PDL interpreter 2 controls the synthesizer 3, the compressor 4 and the address controller 8 so that the block raster region is again compressed by the compressor 4 and it is re-stored in the subject position in the compression memory 5. The above-described sequence is repeated for all of the black rasters.

FIG. 8 which illustrates the structure of the overall system including the interface portion is the same as FIG. 1B.

The structure of the synthesizer 3 and that of the address controller 30 shown in FIG. 8 are the same as those shown in FIGS. 2 and 3.

Figure 9:
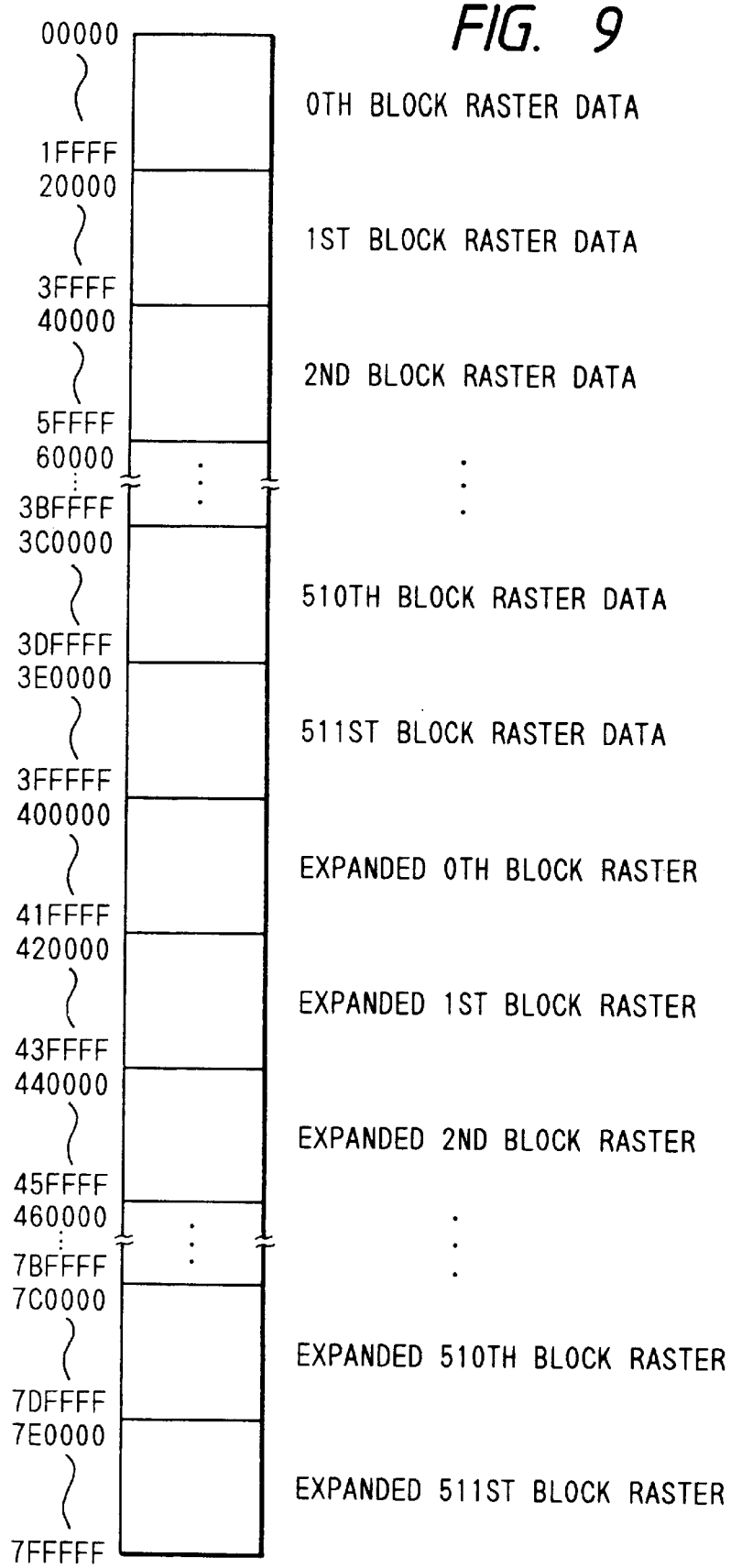
FIG. 9 illustrates a data region which illustrates each block raster on a compression memory.

FIG. 9 illustrates the position at which compressed data corresponding to each of the block rasters is stored in the compression memory. For example, an assumption is made that an image the number of pixels of which is less than 4096×4096 and one pixel requires 3 bytes (1 byte/color) is processed. The maximum image has a capacity of 48 MBytes. Another assumption is made that the compression ratio which is realized by the encoder 4 is set to $\frac{1}{12}$. Each of the blocks of the block raster is constituted in units of 8×8 pixels so as to be compressed. As a result, the image of the maximum size is constituted by 512×512 blocks. The image of the maximum size is compressed to a capacity of about 4 MByte, causing the average code length per block raster to be 8 KByte. According to this embodiment, a memory capacity for each block raster is assumed to be a quantity of data of the average code length. Furthermore, as shown in FIG. 9, the compression memory has a compression memory region for each of the block rasters at every 8 KByte.

Figure 10:
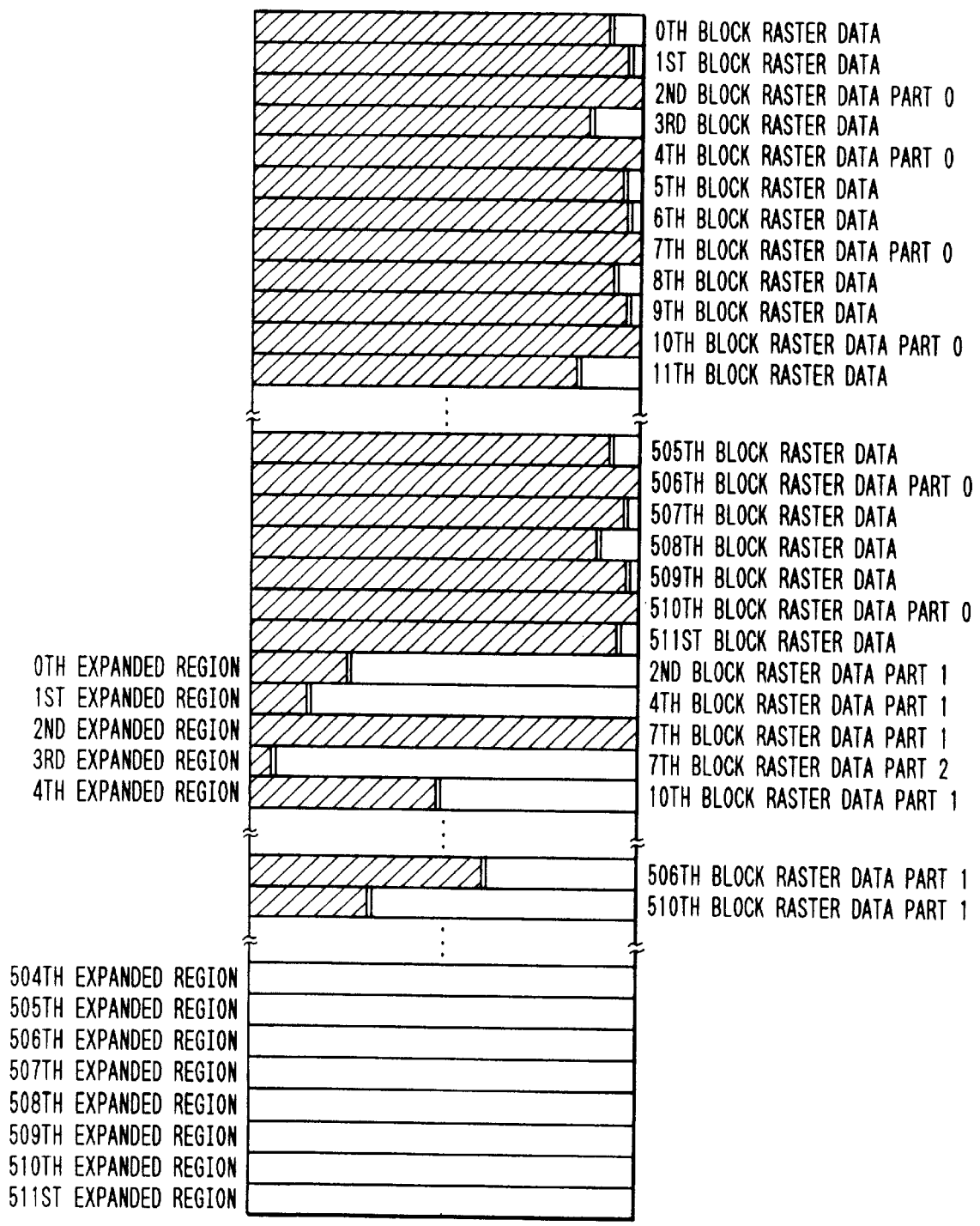
FIG. 10 illustrates data held on the compression memory.

FIG. 10 illustrates a status of data actually held by the compression memory shown in FIG. 9. The blocks shown in FIG. 10 are the same as the data regions of the block rasters shown in FIG. 9. Furthermore, the compression memory regions for the block rasters are formed at every average code length. The diagonal line portions are the regions which store the code for each of the block rasters. Referring to FIG. 10, the second block raster of the original image, the fourth block raster of the same, the seventh block raster, the tenth block raster, . . . , the 506-th block raster and the 510-th block raster are arranged to have a code quantity which is longer than the average code length. It cannot be stored in a single block raster compression memory region set for each data quantity of the average code length. Therefore, data is stored by using a plurality of regions. In particular, since the seventh block raster cannot be stored in the second region, the third region is used to store it.

Figure 11:
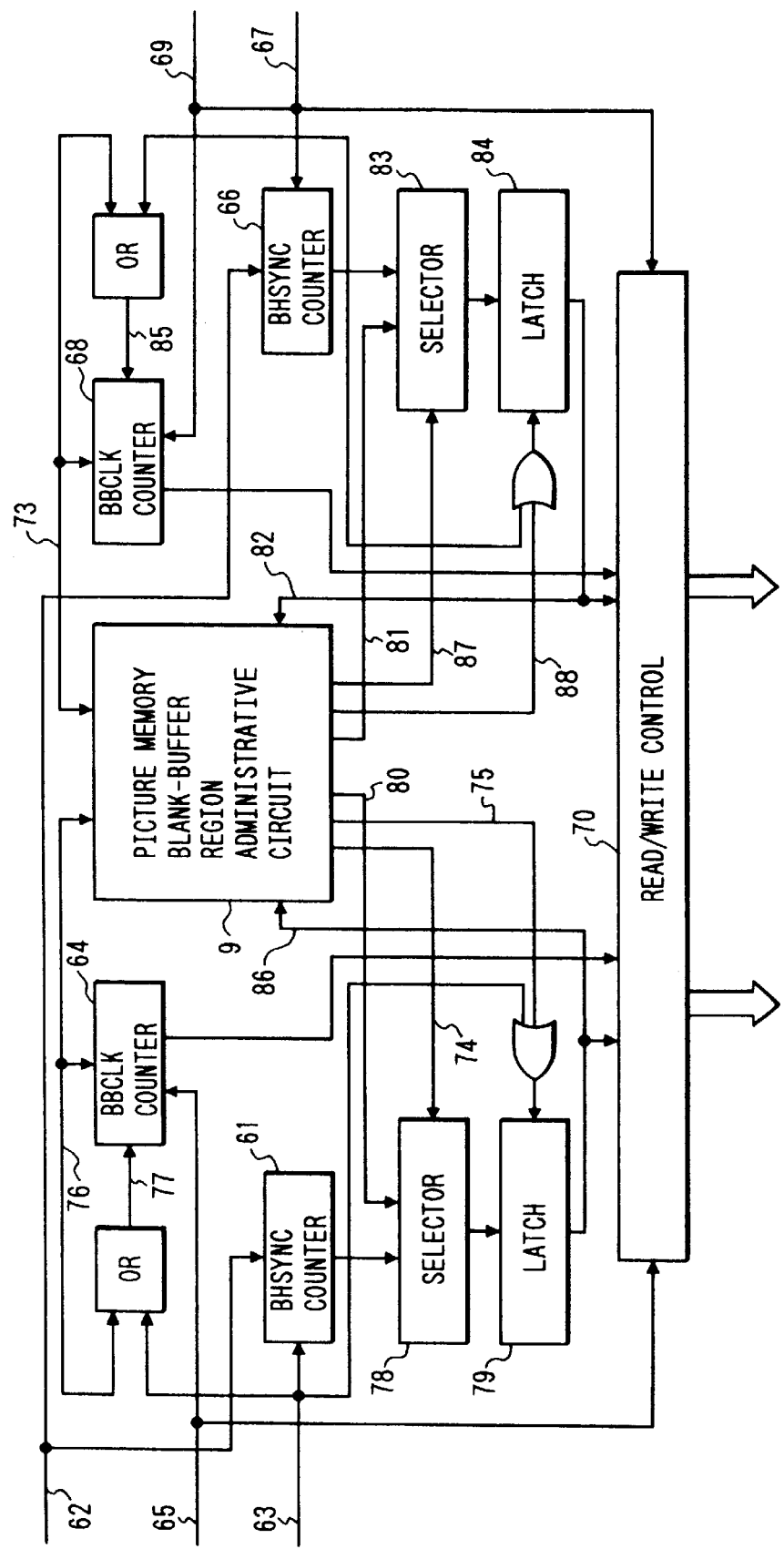
FIG. 11 is a structural view which illustrates the address controller for the compression memory.

FIG. 11 illustrates the structure of the address controller and the blank buffer region administrative circuit 9 of the address controller 8 shown in FIG. 8. Referring to FIG. 11, reference numeral 61 represents a counter for counting the synchronous signals of the block raster so that the block raster to be selected from the compression memory so as to be compressed is designated by the count value. A value corresponding to the block address to be written by the PDL interpreter 62 is set as the initial value of the counter 61 through a signal line 62. Furthermore, a block raster synchronous signal 63 supplied from the encoder 4 is counted. Reference numeral 64 represents a counter for counting the data transference clock 65 for the block data transmitted from the encoder 4 so as to designate the position in the block raster data at which it is stored by its count value. The counter 64 is reset in response to the block raster synchronous signal. The counter 64 generates a count up (carry signal) 76 in a case where data cannot be stored in the memory region in the compression memory for the subject block raster so as to reset it. In this case, the blank buffer region administrative circuit 9 shown in FIG. 8 is started in response to the count up signal 76 so that position in the block raster memory region in the compression memory in which the residual data must be subsequently stored is obtained. Reference numeral 66 represents a counter for counting the block raster synchronous signal similarly to the counter 61, in which the number of the first block raster in the block raster including the position of the pixel to be overwritten by the PDL interpreter 62 is set after the first counting has been made. Subsequently, the block raster synchronous signals 67 transmitted from the decoder are counted for the purpose of showing the region of the block raster in the compression memory to be accessed. Reference numeral 68 represents a counter for counting data transference clock similarly to the counter 64 in such a manner that it counts the transference clock transmitted from the decoder for each byte so as to show the position in the block raster data to be read with the count value. The counter 68 is reset in response to the raster synchronous signal transmitted from the decoder. The counter 68 generates the count up (carry) signal 73 so as to reset the counter 68 in a case where all of data items in the block raster cannot be read out even if data is read out in the memory region for the block raster in the compression memory. In this case, the bland buffer administrative circuit 9 shown in FIG. 81 is started in response to the count up signal 73. As a result, the position of the block raster memory on the compression memory from which data is subsequently read is obtained. When the blank buffer region administrative control circuit 9 is started in response to the count up (carry) signal 76 transmitted from the counter 64 for counting the transference clock of the block data, it transmits, to a signal line 80, the address of the extension block raster memory region in the block raster image memory which is being written. Simultaneously, a selection switch signal 74 of a selector 78 and a latch timing signal 75 of a latch 79 are transmitted. The position of the expansion region block raster memory portion transmitted to the signal line 80 is selectively transmitted by the selector 78 at the timing of the signal 74. It is then held by the latch 79 at the timing of the signal 75 so as to be used as the upper address of the address at which the ensuing image data items are stored. Similarly, the blank buffer administrative circuit 9 is started in response to the count up (carry) signal transmitted from the counter 68 for counting the clock data transference clock. As a result, the blank buffer administrative circuit 9 transmits the address of the expansion block raster memory region in the image memory of the block raster, which is being read, to a signal line 81. Simultaneously, it transmits a selection switch signal 87 of a selector 83 and a latch timing signal 88 of a latch 84. The position of the expansion region block raster memory transmitted to the signal line 81 is selectively transmitted by the selector 83 at the timing of the signal 87 so as to be held by the latch 84 at the timing of the signal line 88. As a result, it is used as the upper address for the address of reading the ensuing image data.

Figure 12:
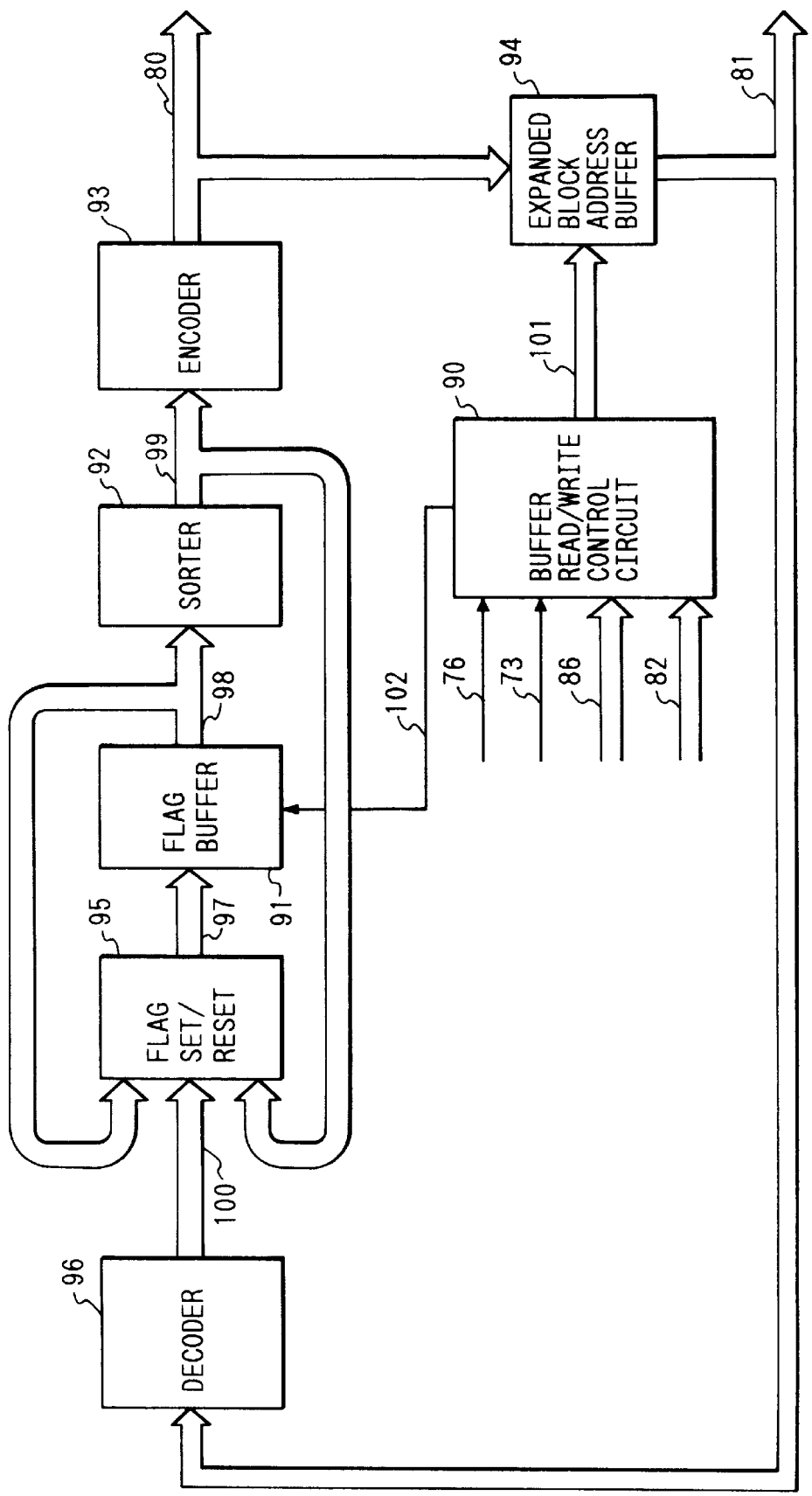
FIG. 12 is a structural view which illustrates a blank buffer region administrative circuit.
Figure 13:
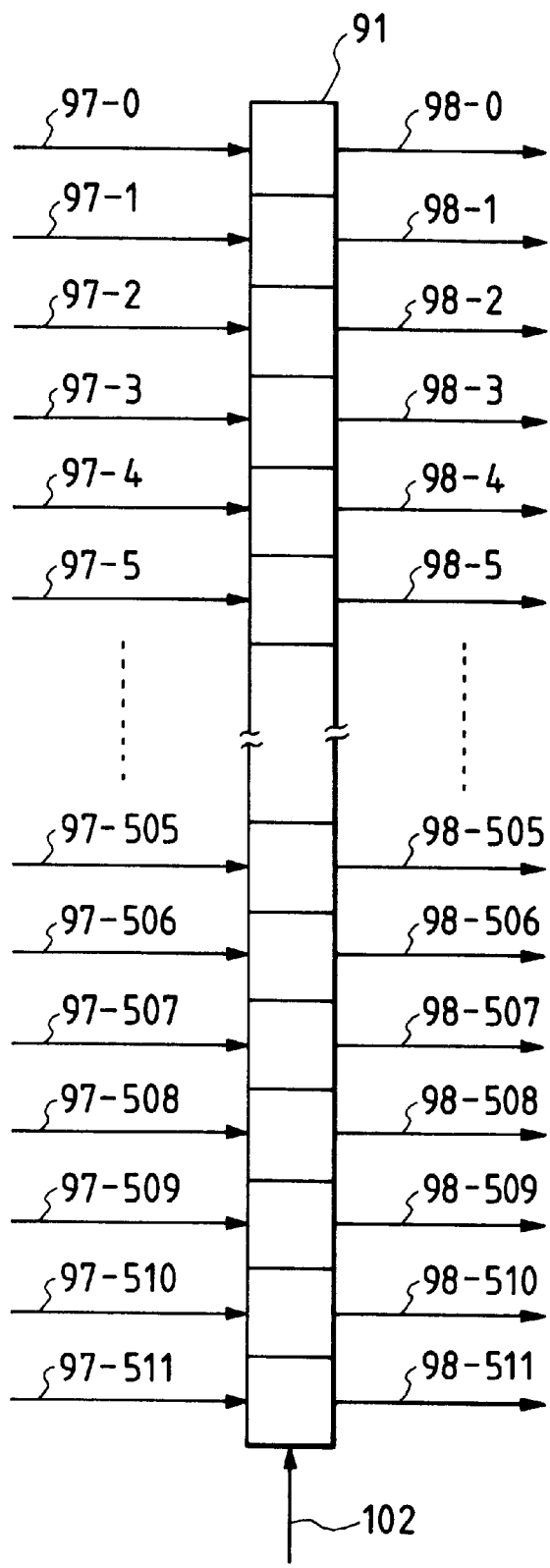
FIG. 13 is a structural view which illustrates a flag buffer.
Figure 14:
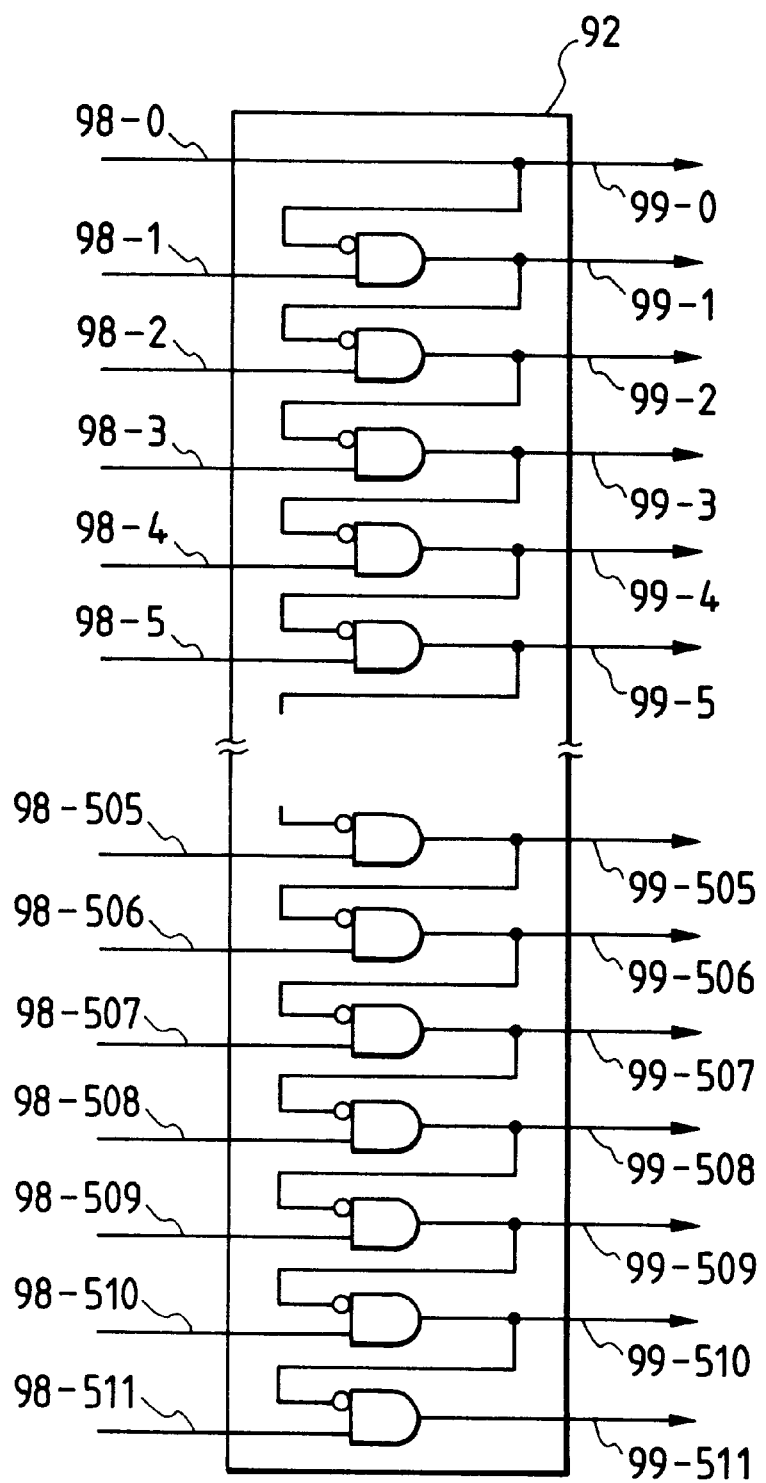
FIG. 14 is a structural view which illustrates a sorter.
Figure 16:
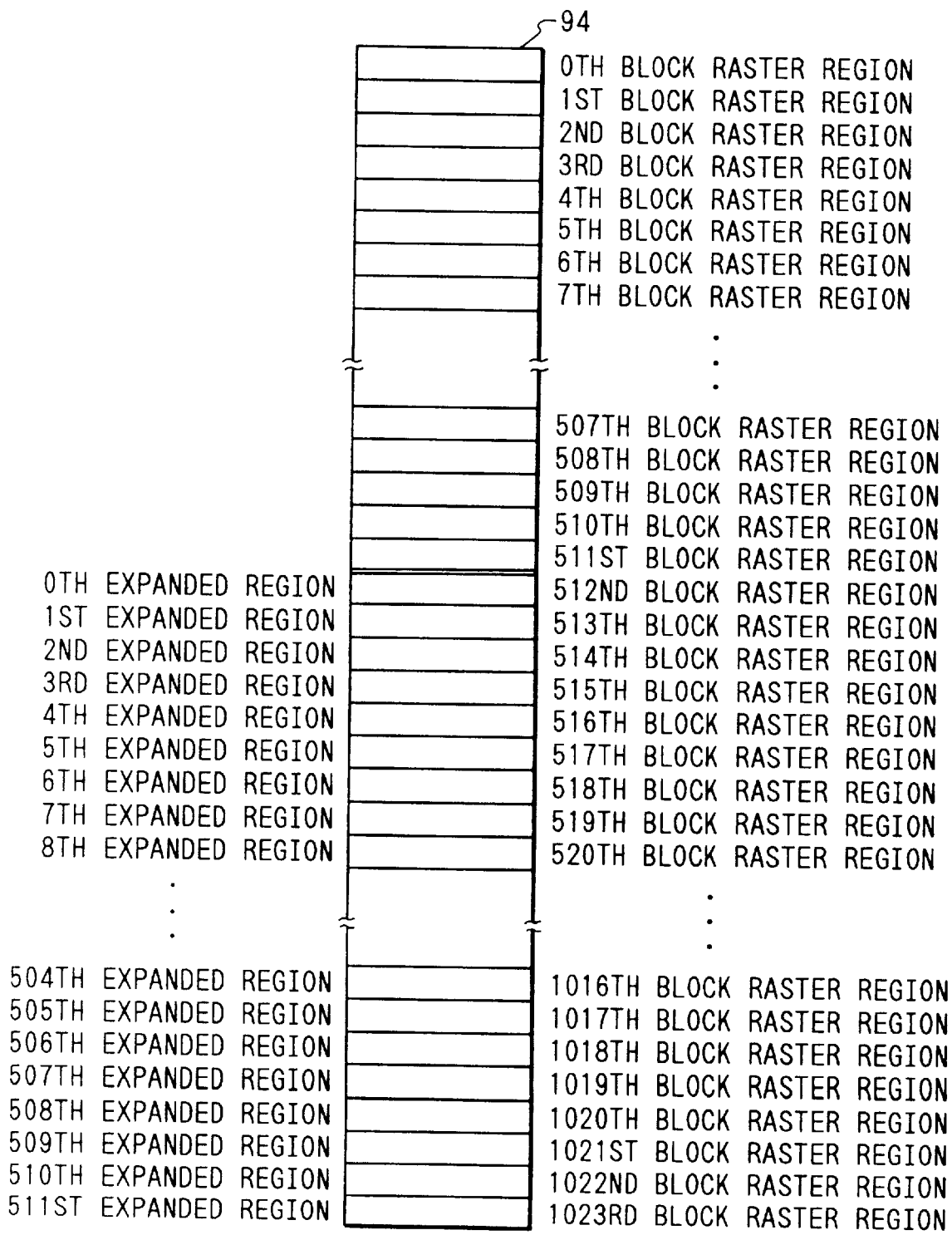
FIG. 16 is a structural view which illustrates an expansion block address buffer.

FIG. 12 illustrates the detailed structure of the image memory blanking buffer region administrative circuit 9. A buffer read/write control circuit 90 transmits a signal 102 to a flag buffer 91 when it receives the signal 76. As shown in FIG. 13, the flag buffer 91 is arranged to be a buffer corresponding to the number of the extension blanking region block rasters. Referring to FIG. 13, it is composed of 512 cells each of which is made by 1 bit. The above-described cells correspond to the 0-th expansion (block raster) region of the image memory shown in FIG. 9 to the 511-th expansion (block raster) region. "1" denotes the fact that the corresponding expansion region is blank, while "0" denotes the fact that the same is being used. The buffer 91 transmits held 512-bit information to a signal 98 composed of 98-0 to 98-511 when it receives the signal 102. A sorter 92 is a 512-input/512-output circuit arranged in such a manner that it receives the signal 98 so as to select a signal line which is the least number from 98-0 to 98-511 which is "1" and transmits the above-described signal as "1" and the others as "0". An example of the structure of the sorter 92 is shown in FIG. 14. An output signal 99 from the sorter 92 is subjected to a process by the encoder 93 in such a manner that the sequential order of the signal line, which is "1", is encoded to a 9-bit binary number so as to be transmitted as a signal 80 of 9 bits. The signal 80 transmitted from the encoder 93 denotes the position of the expansion region by a binary expression method, the signal 80 being fetched into an expansion block address buffer 94. The buffer table 94 is structured as shown in FIG. 16 so as to receive the block address before the expansion which has been received in the form of the signal 86 from 90 as the access position of the buffer table 94 from the signal 101. As a result, the contents of the signal 80 is fetched to the subject position.

Figure 15:
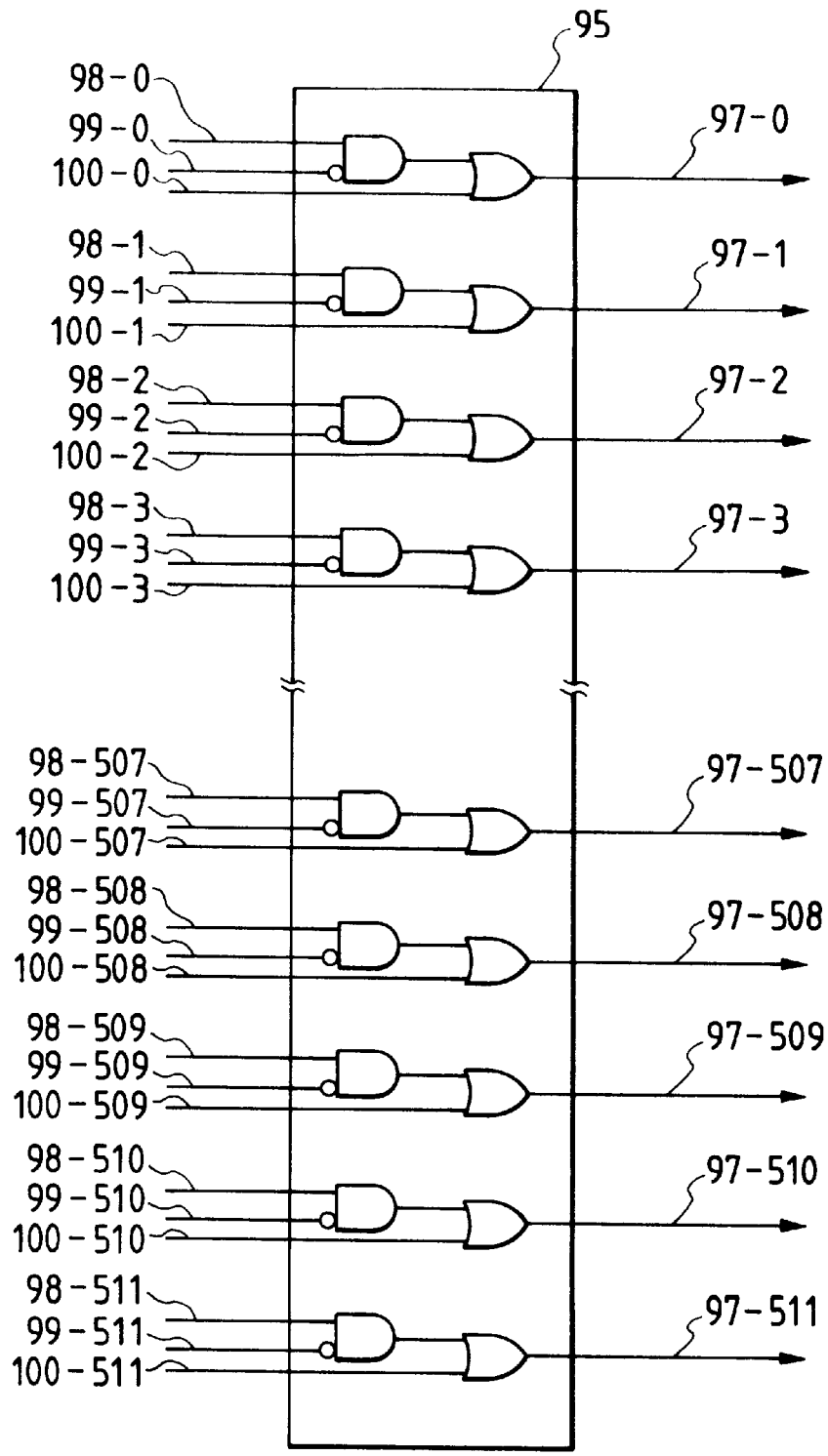
FIG. 15 is a structural view which illustrates a flag buffer updating circuit.

When the buffer read/write control circuit 90 receives the signal 73, the number of the block, which is being read at this time, is received by the signal 82 so as to transmits the block number as the signal 101 to the expansion block address buffer 94. The expansion block address buffer 98 transmits the contents of the position assigned by the signal 101 to the signal line 81. The signal line 81 transmits the number of the block raster buffer which stores the ensuing data of the block raster which is being read and received by the signal 82. The signal 81 is simultaneously also transmitted to a decoder 96. The decoder 96 transmits, as signals 100-0 to 100-511, the signal 81 expressed by a 9-bit binary number to 512 signal lines 100 in such a manner that only the signals of the number which denotes the 9-bit binary number are transmitted as "1" and the other signals are transmitted as "0". A flag buffer updating circuit 95 transmits signals 98, 99 and 100 so as to make the flag of the position of the expansion block to be used for writing to be "0" and the flag of the position of the expansion block to be read to be "1". As a result, the status where the blank buffer region of the image memory is updated as shown in FIG. 15.

The latch 79 and the counter 64 is used as a write data address for writing in the compression memory by combining in such a manner that the output from the latch 79 is made to be the upper address signal and the count value of the counter 64 is made to be the lower address signal. Similarly, the latch 84 and the counter 68 is used as a read data address for reading the compression memory by combining in such a manner that the output from the latch 84 is made to be the upper address signal and the count value of the counter 68 is made to be the lower address signal. The read/write control circuit 70 receives the above-described write data address, read data address, the data transference clock 65 transmitted from the encoder and the data transference clock 69 transmitted from the decoder so as to control the address and timing of reading/writing data to and from the compression memory.

The encoder and the decoder can easily be constituted by using, for example, an LSI such as CL550 manufactured by C-Cube, U.S.A. in such a manner that a circuit for adjusting the synchronous signal or the like is added if necessary.

The sectioning of the above-described block raster is controlled by using the marker code. By using the marker code, the block rasters are individually encoded/decoded. As for the marker code, there has been disclosed in detail in the above-described organ (published from the Image Electronic Society).

Embodiment 4

Figure 17:
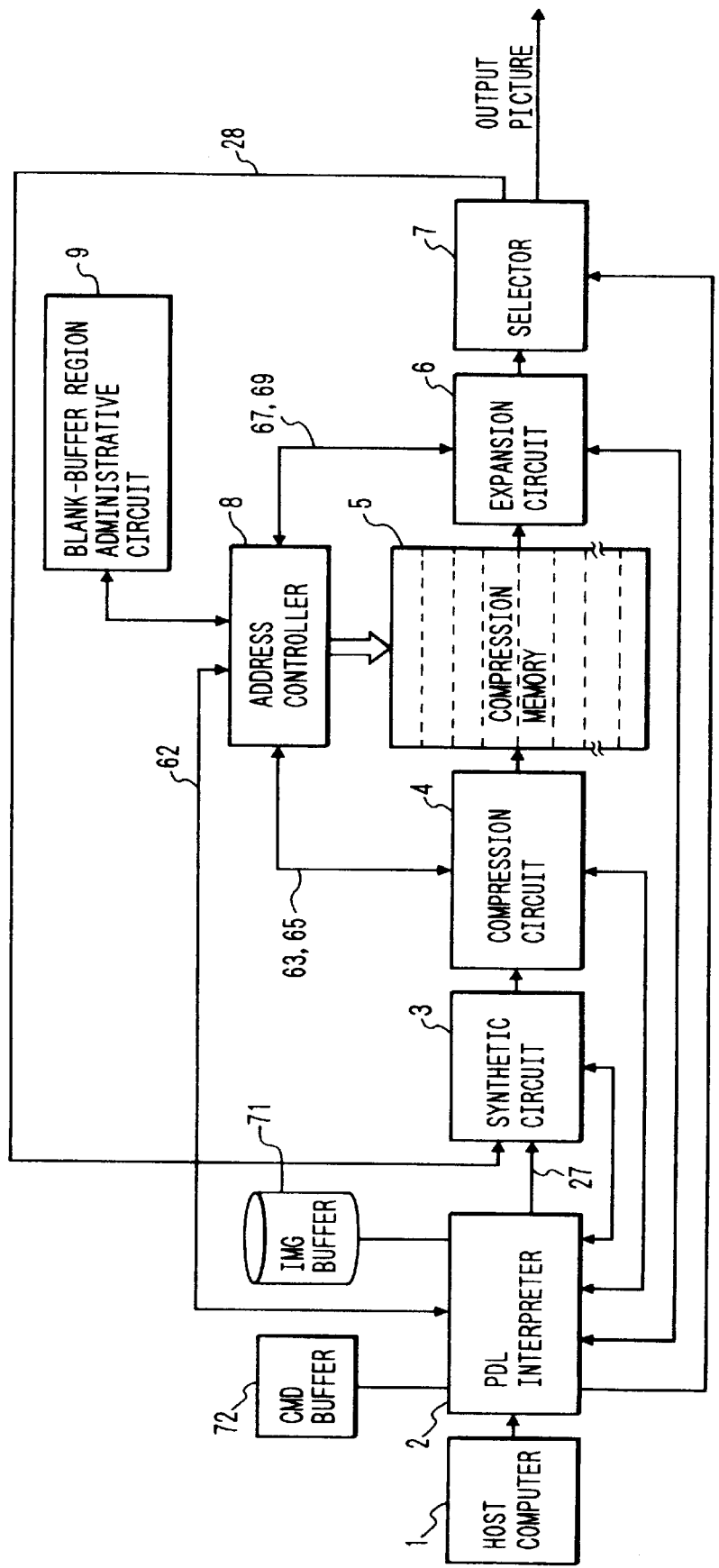
FIG. 17 is a block diagram which illustrates a fourth embodiment of the present invention.

According to the above-described embodiments, the PDL interpreter 2 discriminates the image positions to be sequentially changed in response to the corresponding commands when it receive the PDL command so that the subject position is decoded, rewritten and re-encoded. The present invention is not limited to this. For example, as shown in FIG. 17, the image buffer 71 and the command buffer 72 are employed so as to temporarily hold the PDL command and data supplied from the host computer 1 by a quantity of a plurality of commands. Furthermore, a certain number of commands are collected so as to collectively rewrite the portions in the same block raster after the portions to be changed have been determined in accordance with the corresponding commands. That is, a process of decoding→rewriting of the subject block raster may be performed in such a manner that execution→re-encoding.

As described above, by subjecting a certain number of commands to the process after they are temporarily held in the buffer, the required number of decoding and encoding processes can be reduced. Therefore, the degree of deterioration in the image quality due to the above-described processes can be prevented. Furthermore, another effect of shortening the required waiting time due to the execution of the commands made with respect to the host computer can be obtained.

As described above, according to the above-described embodiment, the inner portion of the compression memory is sectioned into the fixed length blocks each of which has a a capacity which is about the average code length of the block raster. The reproduction, changing and re-encoding processes are performed in units of the block raster. Furthermore, the structure according to this embodiment comprises means for detecting whether or not the code length exceeds the above-described fixed block length at the time of the encoding process and means for administrating the blank fixed block in the compression memory. Thus, data of the code of the block raster the code quantity of which exceeds the fixed block length is held over a plurality of fixed length blocks. As a result, the PDL can easily be used in the compression memory.

That is, by publishing and operating image data by using the compression memory, the overall cost can be significantly reduced in a case where a memory having a data capacity which is sufficiently large to hold actual data is used.

According to this embodiment, the inner portion of the compression memory is sectioned into the fixed length blocks each of which has a a capacity which is about the average code length of the block raster. The reproduction, changing and re-encoding processes are performed in units of the block raster. Furthermore, the structure according to this embodiment comprises means for detecting whether or not the code length exceeds the above-described fixed block length at the time of the encoding process and means for administrating the blank fixed block in the compression memory. Thus, data of the code of the block raster the code quantity of which exceeds the fixed block length is held over a plurality of fixed length blocks. As a result, an image can easily be published and operated by the compression method of the variable-length encoding system.

Although the PS (Post Script) is employed as the PDL, the other PDL may, of course, be employed.

The method of the compression is not limited to the ADCT. The other perpendicular transformation encoding method, predictive encoding method, a run length encoding method and the like may be employed.

The publishing method is not limited to the overwriting method. As an alternative to this, a calculation by using the previous data and posterior data (for example, a multiplication is performed or the AND or the OR is calculated). That is, a process such as overlaying or modulation may be performed.

The output signal decoded can be formed into a hard copy by a laser beam printer, an ink jet printer, a thermal printer or the like as well as displaying it by a display means.

As described above, according to the present invention, a variety of image processing can be performed by using the compressed data.

Embodiment 5

Figure 18:
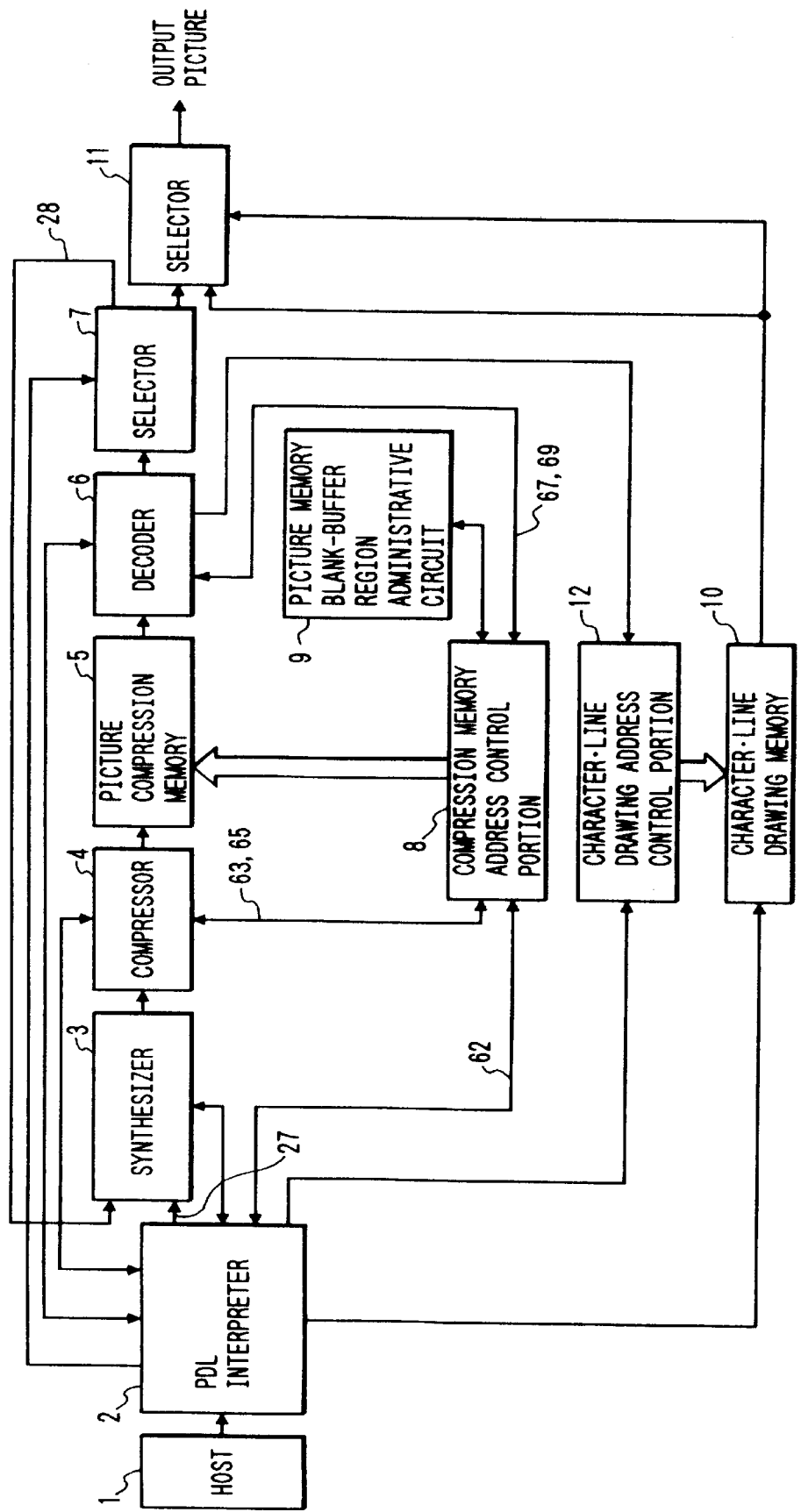
FIG. 18 is a block diagram which illustrates a fifth embodiment of the present invention.

FIG. 18 typically illustrates the characteristics of the present invention, where reference numeral 1 represents a host computer for outputting a command column described in the PDL. Reference numeral 2 represents an interpreter (hereinafter called a "PDL interpreter") for receiving the command column output from the host computer 1 so as to interpret and execute it. Reference numeral 3 represents a synthesizer for synthesizing the base data and image data novely generated by the PDL interpreter 2. Reference numeral 4 represents a compressor for compressing data in accordance with the ADCT method. Reference numeral 5 represents a compression data memory which is sectioned into blocks, each of which has a sufficient memory quantity, at the time of usage. Reference numeral 6 represents a decoder and 7 represents a multiplexer for switching over the output from the decoder 6 to the synthesizer 3 or a selector 11. Reference numeral 8 represents an address controller for a compression memory for controlling read/write of the compressed data. Reference numeral 9 represents a blank buffer region administrative circuit used when the address controller 8 administrates the blank region in the compression memory 5. Reference numeral 10 represents a memory for storing characters and line drawings. Reference numeral 11 represents a selector for switching over a picture output from the decoder 6 made via the selector 7 and a picture output from the character and line drawing memory 10 to be transmitted to an image formation unit of a recording apparatus (omitted from illustration). Reference numeral 12 represents an address controller for controlling read/write of the character and line drawing memory.

When the PDL interpreter 2 receives the postscript PDL command from the host computer 1, it discriminates the image portion to be changed in accordance with the above-described command and whether or not the image to be changed is the character and the line drawing. In a case of the character and the line drawing, the subject portion of the character and line drawing memory 10 is overwritten. In the other cases, when the PDL command is supplied from the computer 1, the PDL interpreter 2 controls the address controller 8 and the decoder 6 so as to discriminate the image portion to be changed in response to the above-described command so as to sequentially read out the block raster data including the above-described portion from the compression memory 5 so as to decode and output the result. Simultaneously, the PDL interpreter 2 controls the multiplexer 7 so as to cause data decoded by the decoder 6 to be transmitted to the synthesizer 3. Furthermore, the PDL interpreter 2 controls the synthesizer 3 in such a manner that the synthesizer 3 receives decoded data transmitted from the decoder 6 to store it in the buffer. The PDL interpreter 2 overwrites novel data, which has been generated in accordance with the above-described command, in the region which corresponds to the position of the pixel in the block raster which has fetched the decoded data. After data corresponding to the block raster region has been written, the PDL interpreter 2 controls the synthesizer 3, the compressor 4 and the address controller 8 so that the block raster region is again compressed by the compressor 4 and it is re-stored in the subject position in the compression memory 5. The above-described sequence is repeated for all of the black rasters.

FIG. 18 which illustrates the overall structure of the system including the interface is the same as FIG. 1B.

The character and line drawing memory 10 has a capacity capable of storing pixel data corresponding to the picture size to be processed. That is, according to this embodiment, it possesses a capacity of one bit for each of 4096×4096= 16,777,216 pixels. Therefore, a memory space having a data capacity of one bit for each address is created in an address space of 16M. The above-described memory space is a continuous address spaces arranged in such a manner that address spaces are continuously formed in the sequential order from the 0-th to the 4095-th pixels for each scanning line. Furthermore, address spaces for the scanning lines from the 0-th to the 4095-th scanning lines are continuously formed in units of the 4096 addresses. The PDL interpreter 2 accesses a desired address of the character and line drawing memory 10 along the map of the above-described address. In a case where data is black line drawing, "1" is written in the character and line drawing memory. In a case where the other picture is drawn, data is written in the compression memory in accordance with the above-described procedure and as well as "0" is written in the address of the character and line drawing memory at the position of the subject pixel. Data in the character and line drawing memory 10 is read out in synchronization with the timing of image data transmitted from the decoder 6 when the image output is made via the selector 11. The control of reading data from the character and line drawing memory is performed by the character and line drawing memory address control portion 12 in response to a scan synchronization signal and a pixel synchronization signal. Similarly to the counters 31 and 32 in the address controller in the synthesizer 3 shown in FIG. 3, the character and line drawing memory address control portion 12 can be constituted in such a manner that it counts the above-described synchronous signal to generate the memory address to be accessed. The picture signal transmitted from the character and line drawing memory is used as image data about the character and the line drawing. Furthermore, it is used as a selection signal of the selector 11 for selecting character and line drawing data or the image output from the decoder 6. The selector 11 selectively transmits character and line drawing data when character and line drawing data is "1", while the same transmits the output signal from the decoder 6 when it is "0". Since the other structures are same as those according to the third embodiment, their detailed descriptions are omitted here.

The encoder and the decoder can easily be constituted by using, for example, an LSI such as CL550 manufactured by C-Cube, U.S.A. in such a manner that a circuit for adjusting the synchronous signal or the like is added if necessary.

The sectioning of the above-described block raster is controlled by using the marker code. By using the marker code, the block rasters are individually encoded/decoded.

Embodiment 6

Figure 19:
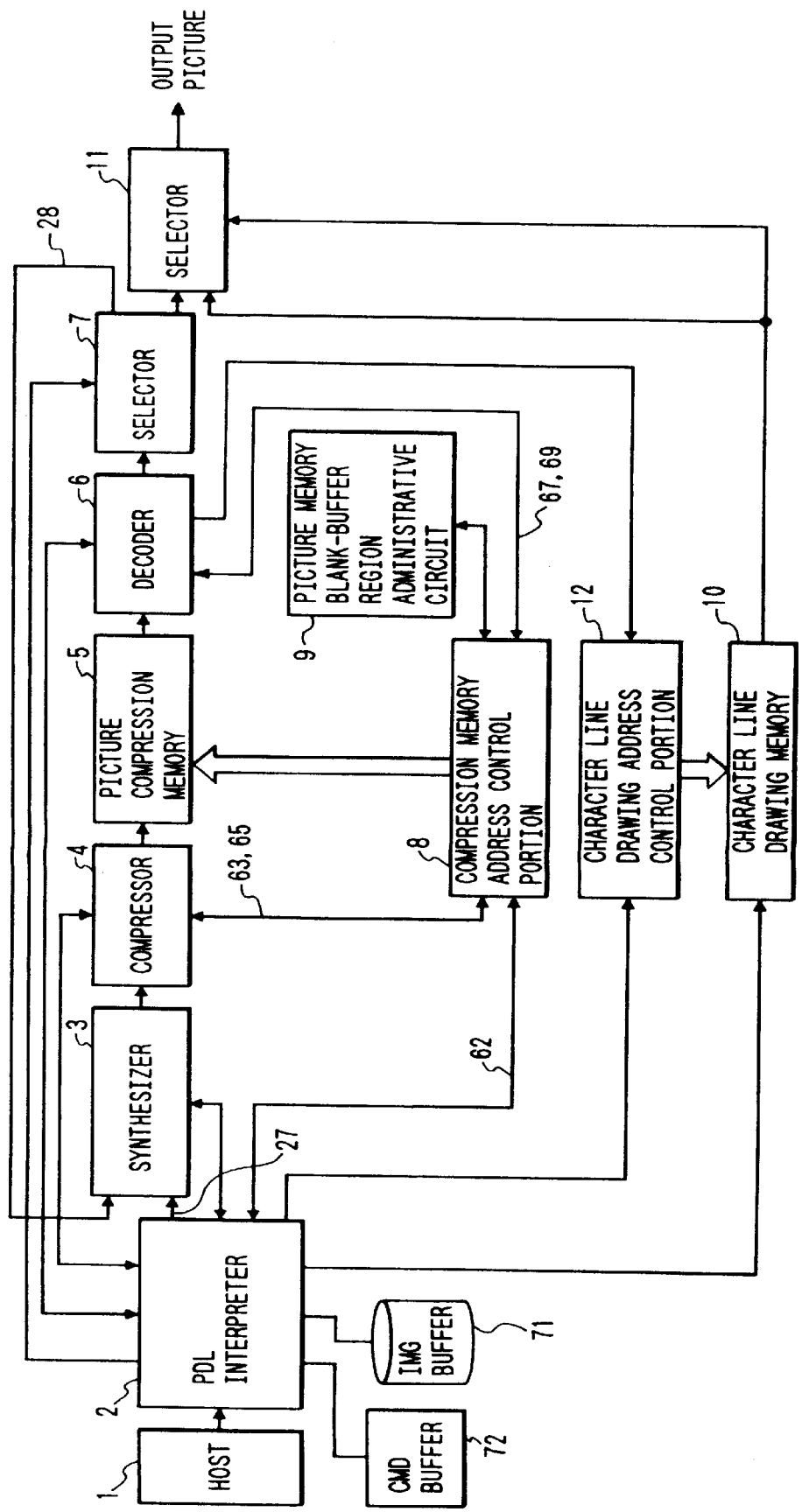
FIG. 19 is a block diagram which illustrates a sixth embodiment of the present invention.

According to the above-described embodiments, the PDL interpreter 2 discriminates the image positions to be sequen- tially changed in response to the corresponding commands when it receive the PDL command so that the subject position is decoded, rewritten and re-encoded. The present invention is not limited to this. For example, as shown in FIG. 19, the image buffer 71 and the command buffer 72 are employed so as to temporarily hold the PDL command and data supplied from the host computer 1 by a quantity of a plurality of commands. Furthermore, a certain number of commands are collected so as to collectively rewrite the portions in the same block raster after the portions to be changed have been determined in accordance with the corresponding commands. That is, a process of decoding→rewriting of the subject block raster may be performed in such a manner that execution→re-encoding.

Embodiment 7

Although the character and line drawing memory is formed into the bit map memory according to the above-described embodiments, the present invention is not limited to this. For example, a structure may be employed which is formed into several bits/pixel of, for example, 4 bits per pixel and which has a bit map for each color cyane, magenta, yellow and black. In this case, the selection signal 11 shown in FIG. 18 may be the logical sum of several bits for the same pixel.

Embodiment 8

Furthermore, the character and line drawing memory may, of course, comprise a compression type memory. In this case, the character and line drawing memory may be arranged similarly to the structure according to the above-described embodiments in which the process is performed by using the image compression memory in the sequential order as decoding→overwriting→re-compressing.

As described above, according to the present invention, the characters and line drawings which usually have relatively high spatial frequency component and the other images are individually stored in corresponding memory regions so as to be individually published and processed. As a result, the deterioration in the image quality of the characters and line drawings can be prevented. Furthermore, the undesirable rapid and great change of the quantity of the image data code due to the image quality can be prevented. As a result, the PDL can easily be used on the compression memory.

That is, the image data is published and processed by using the compression memory. As a result, the overall cost can be significantly reduced in a case where a memory having a data capacity which is sufficiently large to hold actual data is used.

As described above, the inner portion of the compression memory is sectioned into the fixed length blocks each of which has a a capacity which is about the average code length of the block raster. The reproduction, changing and re-encoding processes are performed in units of the block raster. Furthermore, the structure according to this embodiment comprises means for detecting whether or not the code length exceeds the above-described fixed block length at the time of the encoding process and means for administrating the blank fixed block in the compression memory. Thus, data of the code of the block raster the code quantity of which exceeds the fixed block length is held over a plurality of fixed length blocks. As a result, the publishing and operation of an image by a compression method in accordance with the variable length encoding method can easily performed.

Furthermore, the characters and line drawings which usually have relatively high spatial frequency component and the other images are individually stored in corresponding memory regions so as to be individually published and processed. As a result, the deterioration in the image quality of the characters and line drawings can be prevented. Furthermore, the undesirable rapid and great change of the quantity of the image data code due to the image quality can be prevented. As a result, the PDL can easily be used on the compression memory.

Although the PS (Post Script) is employed as the PDL, the other PDL may, of course, be employed.

The method of the compression is not limited to the ADCT. The other perpendicular transformation encoding method, predictive encoding method, a run length encoding method and the like may be employed.

The publishing method is not limited to the overwriting method. As an alternative to this, a calculation by using the previous data and posterior data (for example, a multiplication is performed or the AND or the OR is calculated). That is, a process such as overlaying or modulation may be performed.

The output signal decoded can be formed into a hard copy by a laser beam printer, an ink jet printer, a thermal printer or the like as well as displaying it by a display means.

As described above, according to the present invention, a variety of image processing can be performed by using the compressed data.

Embodiment 9

Figure 32:
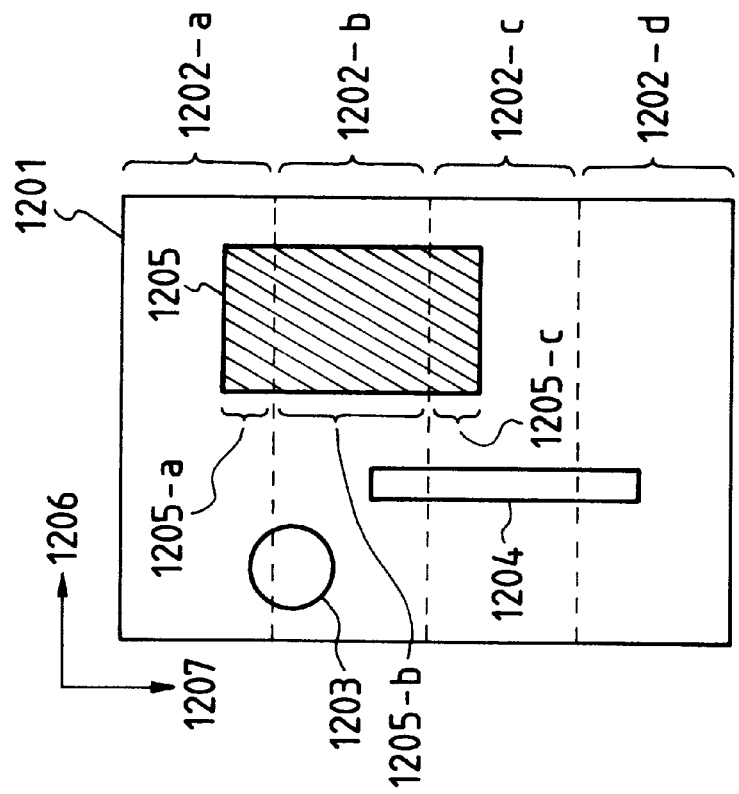

According to this embodiment, the capacity of the frame buffer for use when the interpreter develops the source code to image data for each pixel can be reduced to a quantity smaller than 1 page. For example, as shown in FIG. 32, a page 201 is sectioned into four sections 1202-a to d. Furthermore, the size of the frame buffer is arranged to have the sectioned regions (sub-frames), which are called "sub-frame buffers" hereinafter). The interpreter sequentially performs the development in each region so as to compress the contents of the sub-frame buffer in each region after the above-described development has been completed. The compressed contents are transferred to the compression frame buffer having a capacity of 1 page so as to be stored in the compression frame buffer. When data printing is executed in response to a command issued from the host computer, data in the compression frame buffer is expanded at a transference rate required by the printer engine before the data is transferred to the printer engine. By the actions of the sub-frame buffer and the compression frame buffer, the memory capacity of the system can be reduced.

In a case where each of the sectioned regions in the above-described page region is subjected to the development process, the interpreter must store the PDL code by a quantity of 1 page even if the region to be developed at a single process is 1/n of one page. The reason for this lies in that the code of the region to be developed can be described in any portion of the code for the page because the contents to be described within one page may be described in an arbitrary order according to the PDL. However, it is impossible (theorically code can be contained indefinetely) to previously estimate the total quantity of the code for the page. Therefore, the capacity of the PDL code buffer in the interpreter is always able to overflow. If the PDL code buffer is enlarged excessively, the merit obtainable in that the quantity of the memory in the division development process can be reduced will be countervailed. Therefore, the structure must be designed in such a manner that the capacity of the PDL code buffer for one page is predicted statistically.

On the other hand, another method may be employed in which all of the PDL codes are transferred from the host computer at each band. However, data of n times must be transferred from the host computer in a case where the one page is sectioned into n portions. The transference efficiency is unsatisfactory, causing the system performance to be deteriorated.

Therefore, according to this embodiment of the present invention, a portion of the object to be drawn for one page the overall or a portion of which is included in the divided region is fetched by sorting. Furthermore, the included object is transferred from the host computer to the interpreter at the time of the development.

As a result, the capacity of the PDL code buffer in the interpreter before the development can be reduced or eliminated in the above-described method in which the interpreter performs the development in each of the page division regions. Furthermore, the PDL code transference from the host computer to the interpreter can be reduced or made efficient. Then, it will now be described.

Figure 31:
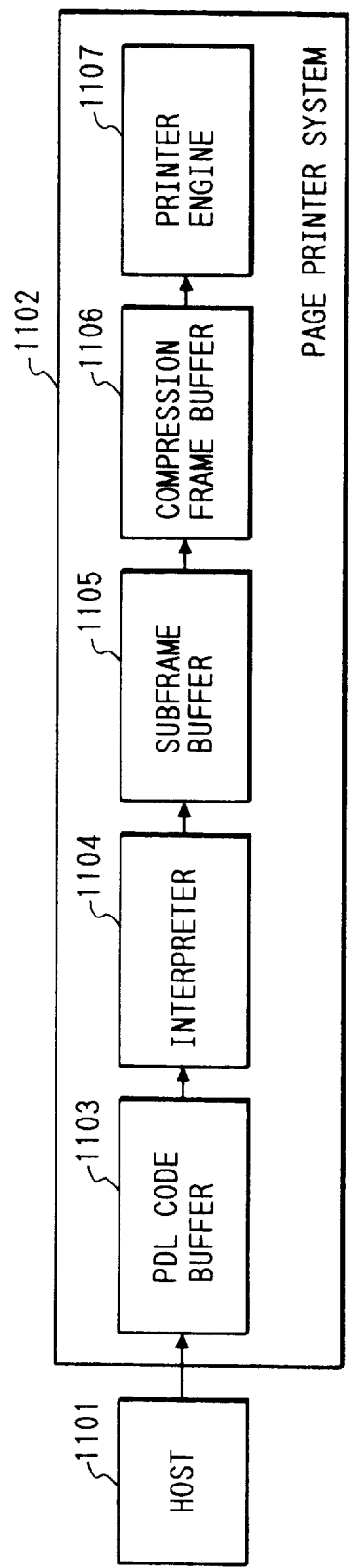
FIG. 31 illustrates a data transfer apparatus according to a ninth embodiment of the present invention.

A ninth embodiment of the present invention is shown in FIG. 31. Reference numeral 1101 represents a host computer for generating the PDL code and 1102 represents a page printer system such as a laser beam printer for forming a latent image on a photosensitive member by laser beams and forming a visible image on a recording medium. Reference numeral 1103 represents a PDL code buffer for storing the PDL code (source code) transferred from the host computer. An interpreter 1104 receives the PDL code from the PDL code buffer 1103 so as to develop it to image data for each pixel. The result of the development is stored in a sub-frame buffer 1105. When the development in the sub-frame has been completed, the contents are transference to a compression frame buffer 1106. The compression frame buffer 1106 compresses and stores the pixel developed data. After the PDL codes for one page has been developed so as to hold it in the compression frame buffer 1106, a printer engine 1107 expands data from the compression frame buffer 1106 so as to read it in a case where printing is executed.

The sub-frame buffer 1105 divides one page into a plurality of regions so as to hold the developed data in the above-described regions. FIG. 32 illustrates an example of the above-described process. Reference numeral 1201 represents an example of a picture for one page and 1202-a to d represent divided regions (bands) in one page. The sub-frame buffer 1105 holds developed data for a certain portion of the regions 1202-a to d. Although the frame is divided into four sections according to this embodiment, the present invention is not limited to the number of the sections. Reference numerals 1203 to 1205 represent object to be drawn. The above-described objects may be described in the PDL code in one page regardless of the describing order. Reference numeral 1206 represents a main scanning direction (X) of the printer engine and 1207 represents a sub-scanning direction (Y).

In a case where data is developed in the region 1202-a, the PDL code of each of the object 1203 and 1205 is transferred from the host computer. In this case, the host computer determines whether or not a portion or the overall portion of 1203 and 1205 is included in the region 1202-a. The above-described determination is made in such a manner that the Y-direction maximum and minimum values of each of the objects are detected so as to be subjected to a comparison with the value Y in the boundary portion. It can be performed as shown in table 1 of FIG. 34 in such a manner that a Y-table for recording the maximum and minimum values of Y of each of the objects described in PDL is provided so as to perform sorting made for the purpose of discriminating whether or not the contents of the Y-table are included in the divided region. For example, assumptions are made that the maximum and minimum values of Y of the object 1203 respectively are $Y_{max1203}$ and $Y_{min1203}$ and the maximum and minimum values of Y of the region 1202-*a* respectively are $Y_{max1202\text{-}a}$ and $Y_{min1202\text{-}a}$. In this case, a discrimination must be performed that ($Y_{max1202a} > Y_{min1203}$) and ($Y_{min1202a} < Y_{max1203}$). The other objects and divided regions may be processed similarly. The host computer transfers an object code included in a region developed by the interpreter 1104 from the thus-obtained result. The interpreter 1104 sequentially develops, for example, the regions 1202-*a* to *d*. Although a portion of the objects can be drawn over a plurality of regions depending upon the shape and the size of the object, the PDL code is transferred from the host computer to the interpreter whenever each of the regions is developed. For example, the code of the object 1203 is transferred when both of the regions 1202*a* and 1200*b* are developed. The transferring order coincides with the sequential order of the original PDL code list. For example, in the case of Table 1, Codes 1203, 1205 and 1204 are transferred in this sequential order, while Codes 1203 and 1205 are transferred when the region 1202*a* is developed. The sequential order must be 1203 and 1205 in this sequential order. The reason for this lies in that the image becomes different in case where the objects superposed on each other if the sequential order is reversed in the PDL specification in which the posterior image becomes the top image.

In order to discriminate whether or not the object is included in the divided region, $Y_{max}$ and $Y_{min}$ must be detected. They may be calculated from the reference point for determining the position of the object denoted by the PDL code (source code) and the Y-directional size of the object.

As an alternative to the arrangement in which the discrimination is directly made from the PDL code (source code), it may be made from the intermediate code which further approximates the image data and which has been obtained by conversion.

Figure 33:
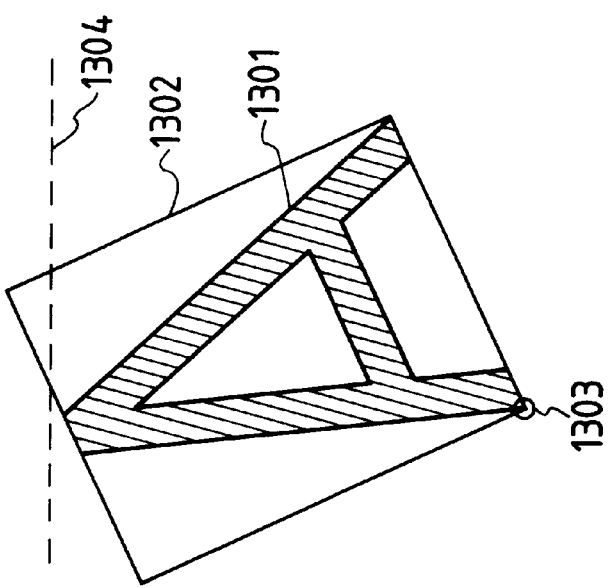
FIGS. 32 and 33 illustrate a print image.

If a strict determination is made that a certain object is included in a divided region, data development for each pixel must be temporarily performed. Therefore, a critical disadvantage will occur in terms of time saving. In a case as shown in FIG. 33 in which character "A" of the object is positioned below a boundary 1304 and its reference point is 303, "A" is not included in a region upper than 304. However, a boundary box 1302 for defining the size of "A" can upward deviate from 1304. In this case, it is difficult to discriminate whether or not "A" is included in the region upper than 1304 if an actual development is not performed. However, large quantity of calculations must be performed for the purpose of performing the development. In this case, an assumption is made that "A" is included in the region in the vertical direction of 1304 before the PDL codes are transferred at the time of the development of each of the regions. That is, in a case where an actual development is performed in accordance with region information (for example, the position at which drawing is started, size and the like) defined by the PDL code, it is transferred if there is a possibility that the object is included in the divided region. As a result, lacking of information taken place in each of the divided regions can be prevented.

In a case where the object is a natural image and the pixel is multivalue data, the quantity of data is becomes excessively large. Therefore, when a plurality of number of transferring operation from the host computer are performed, an excessively long time takes to complete the operation, causing the performance (transference efficiency) to be deteriorated. An arrangement may be employed to overcome the above-described problem, in which the included portion in each of the regions is sectioned before it is transferred. For example, in a case where the object 1205 shown in FIG. 32 is a natural image, the portion of the object 1205-*a* is transferred when 1202-*a* is developed. The portion of the object 1205-*b* is transferred when 1202-*b* is developed. The fact that the object is natural image=pixel development data may be detected by a PDL operator of the object. The divided region may be detected by counting the number of data items.

According to this embodiment, by transferring the PDL code of the next object from the host computer after the development of each of the objects has been performed in the interpreter, the PDL code buffer can be minimized or eliminated. The quantity of the PDL code to be transferred can be reduced to a value smaller than the number which is n times the sections of the divided page. Therefore, the transferring operation can be performed efficiently.

The compression frame buffer 1106 can be eliminated from the structure if the development speed of the interpreter is higher than a required level of the printer engine 1107.

Figure 35:
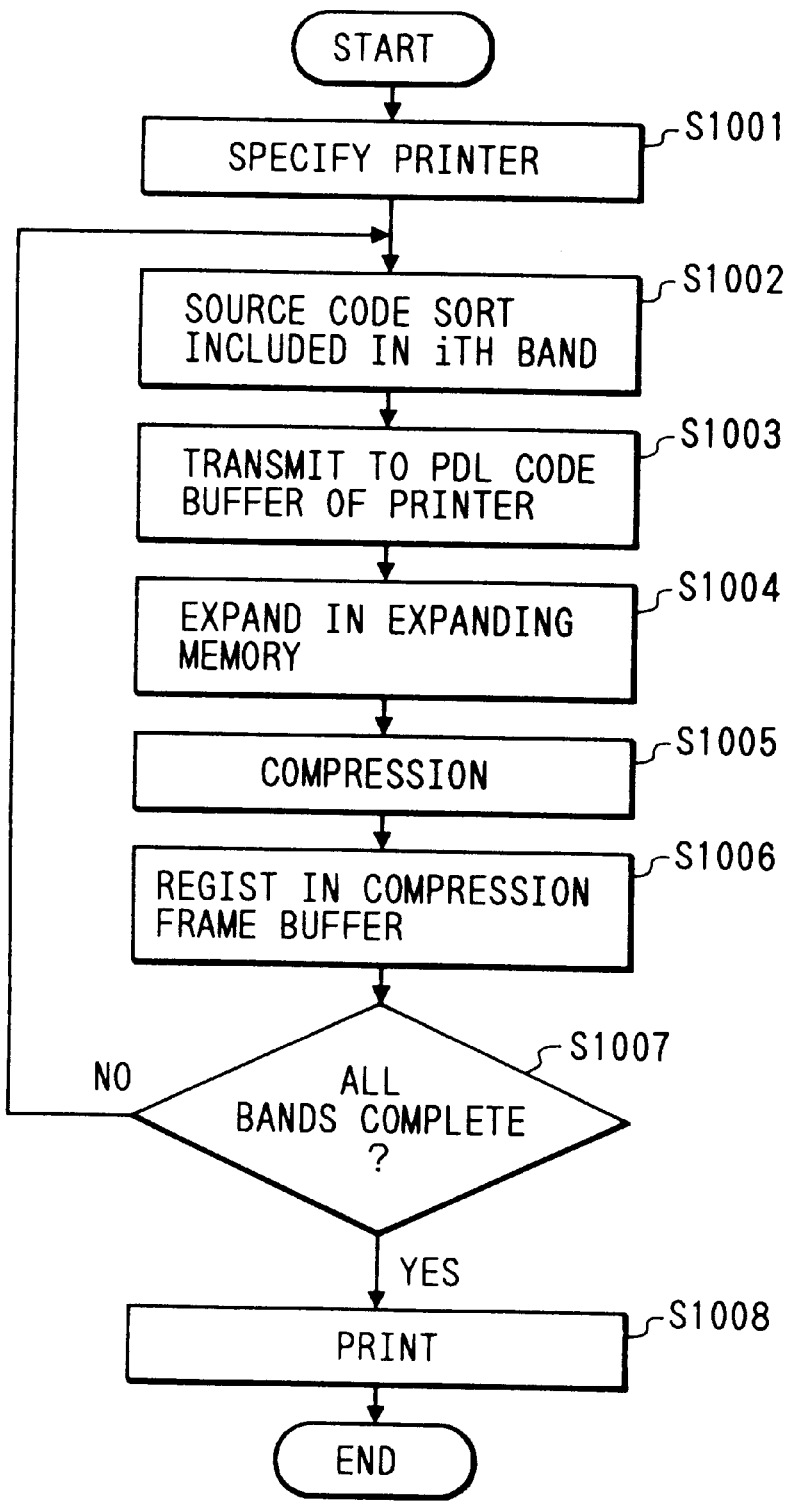
FIG. 35 is a flow chart which illustrates a flow of the image processing operation.

The flow of processes including the process of discriminating whether or not the above-described PDL code is included in the divided region is shown in FIG. 35.

First, an application software device is set to the host computer and a page printer system capable of performing banding process is assigned as a printer to be connected to the host computer (S1001). Then, the PDL code (source code) included in the first band (divided region) is sorted by using the table 1 shown in FIG. 34 (S1002). The sorted PDL code is transferred to the PDL code buffer 1103 adjacent to the printer (S1003). The transferred PDL code is developed in a sub-frame buffer 1105 by the interpreter 1104 in the transference order (S1004). In this case, "posterior priority" principle, that is, a priority is given to data transferred lately in the superposed portion of the developed image. When all of the PDL codes included in the subject band have been developed, the image data of the subject band is compressed (S1005). The compression is performed in accordance with, for example, ADCT (Adaptive Descrete Cosine Transform) in which a DCT (Descrete Cosine Transform) is performed in each block so as to Huffman-encoding each of the coefficients. However, the compression method is not limited to this. For example, a vector quantization run length encoding method, MH, MH or MMR may be employed. Compressed image data is, in each block, sequentially stored in the compression frame buffer 1106 (S1006). When all of block data about the subject band have been stored, the second band is subjected to the development, compression and storage processes similarly to the first band (S1007). When all of the bands have been subject to the process, printing of one page is performed.

The above-described operation is controlled by a printer controlling driver disposed adjacent to the host computer. The driver may be disposed in the page printer system 1102. In this case, commands relating to the system control, for example, the assignment of the printer and a print command and the like are transmitted or received between the driver and the host computer.

As described above, according to this embodiment of the present invention, an effect can be obtained in a method arranged in such a manner that the interpreter of a page printer system performs the development process for each of the divided regions of the page, the effect being an effect obtainable in that the capacity of the PDL code buffer before the development process can be reduced or the PDL code buffer can be eliminated from the structure.

Furthermore, in a case where the PDL code of the next object is transferred after the development of the object has been completed by the interpreter, the efficiency of transferring the PDL code from the host computer can be improved.

As described above, according to this embodiment, the memory capacity of an image processing apparatus can be reduced. Furthermore, the data can be efficiently transferred. In addition, image can be processed efficiently.

Embodiment 10

Figure 36:
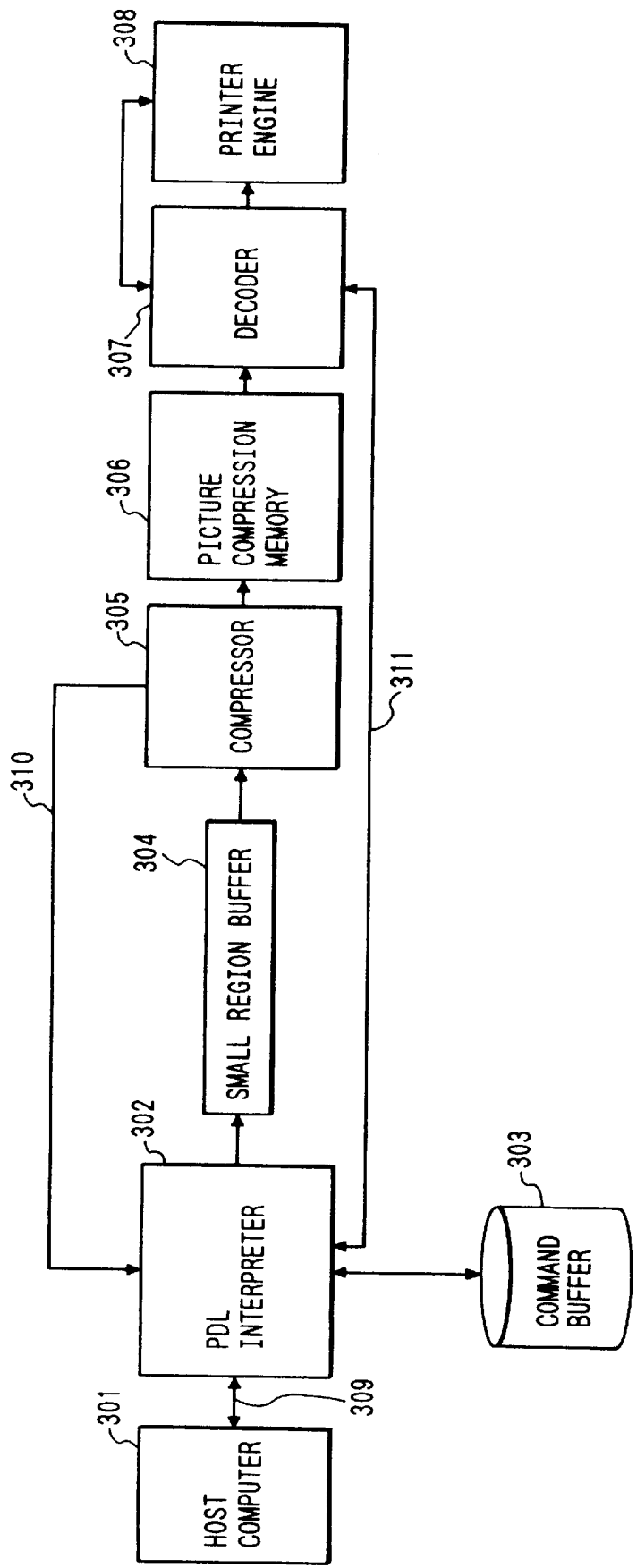
FIG. 36 is a block diagram which illustrates the structure of a circuit according to a tenth embodiment of the present invention.

FIG. 36 illustrates the structure of a circuit for use in a tenth embodiment of the present invention. Referring to FIG. 36, reference numeral 1 represents a host computer for transmitting Page Description Language (hereinafter called a "PDL"). Reference numeral 302 represents a PDL interpreter for receiving data described in the PDL and developing received data to image data for recording. Reference numeral 303 represents a disk device which is used by the PDL interpreter 302 as a command buffer. Reference numeral 304 represents a small region buffer for holding image data developed into small regions created after the image for one page has been sectioned into a plurality of small regions.

Reference numeral 305 represents a compressor (encoder) for transforming image data into compressed image data formed into a code. Reference numeral 306 represents an image compression memory for holding an image for one page in the form of a compressed image data. Reference numeral 307 represents an expander (decoder) for expanding compressed image data to an image data. Reference numeral 308 represents a printer engine for recording expanded and developed image.

Figure 37:
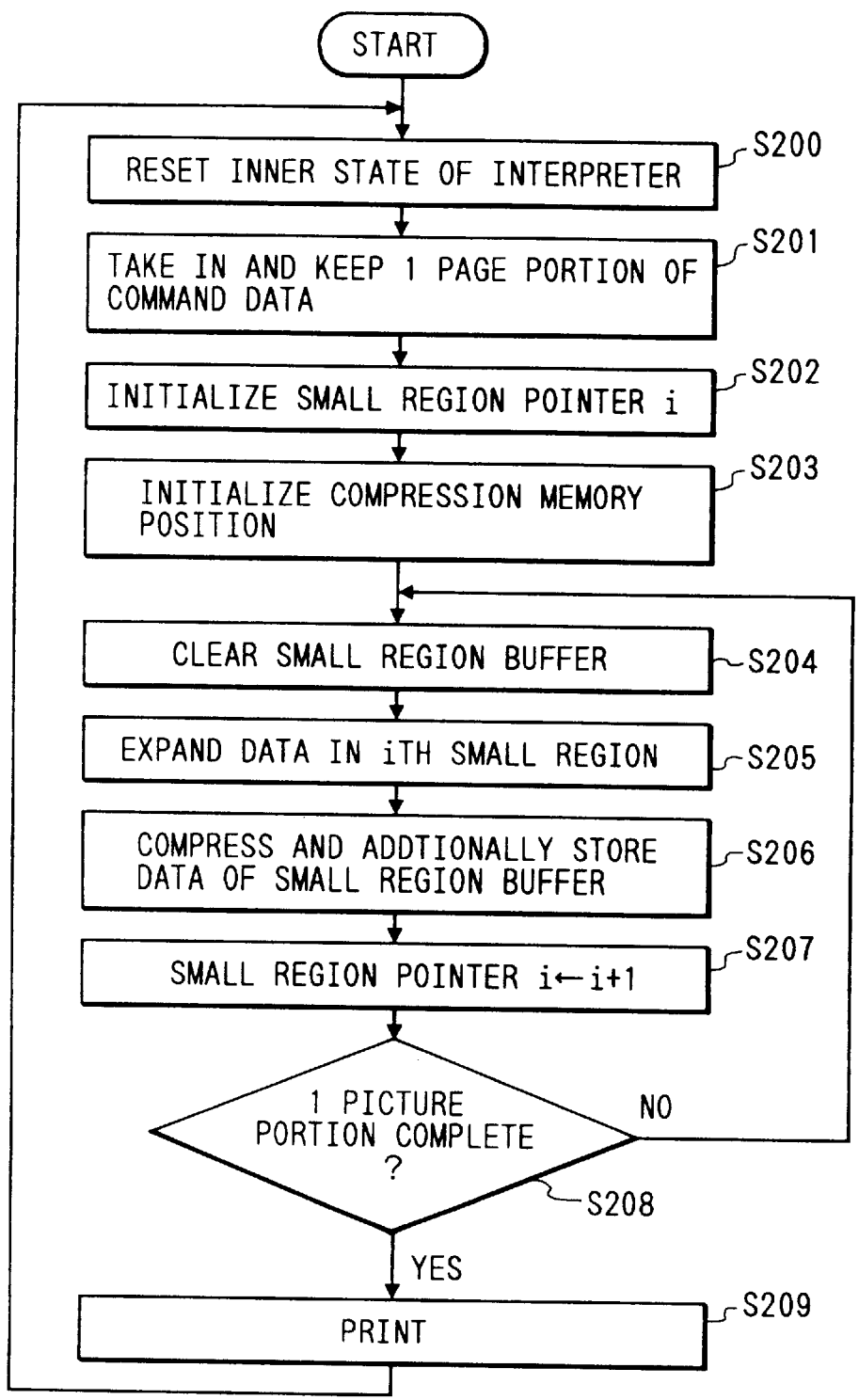
FIG. 37 is a flow chart of a processing sequence of the PDL interpreter shown in FIG. 36.

The host computer 301 transmits page data described in the PDL to the PDL interpreter 302 via the interface 309. Then, the operation of the circuit shown in FIG. 36 will now be described with reference to FIG. 37.

When power is supplied to the interpreter 302, it is automatically started. In step S200 shown in FIG. 37, the internal status of the PDL interpreter 302, that is, the counter, the flag and the like required for the operation of the PDL interpreter 302 are reset. Furthermore, the operational mode and the like are initialized to a predetermined default state.

The PDL is exemplified by the above-described Post Script (hereinafter called the "PS"). The description will now be made hereinafter that the PDL is PS. In addition, the initialization of the internal state includes the initialization of the graphs.

In S201, PS command data for 1 page is fetched by the PDL interpreter 302 via the interface 309 so as to be held in the command buffer 303. The process in step S201 is realized by the PDL interpreter 302 in accordance with detailed sequence shown in FIG. 38.

Figure 38:
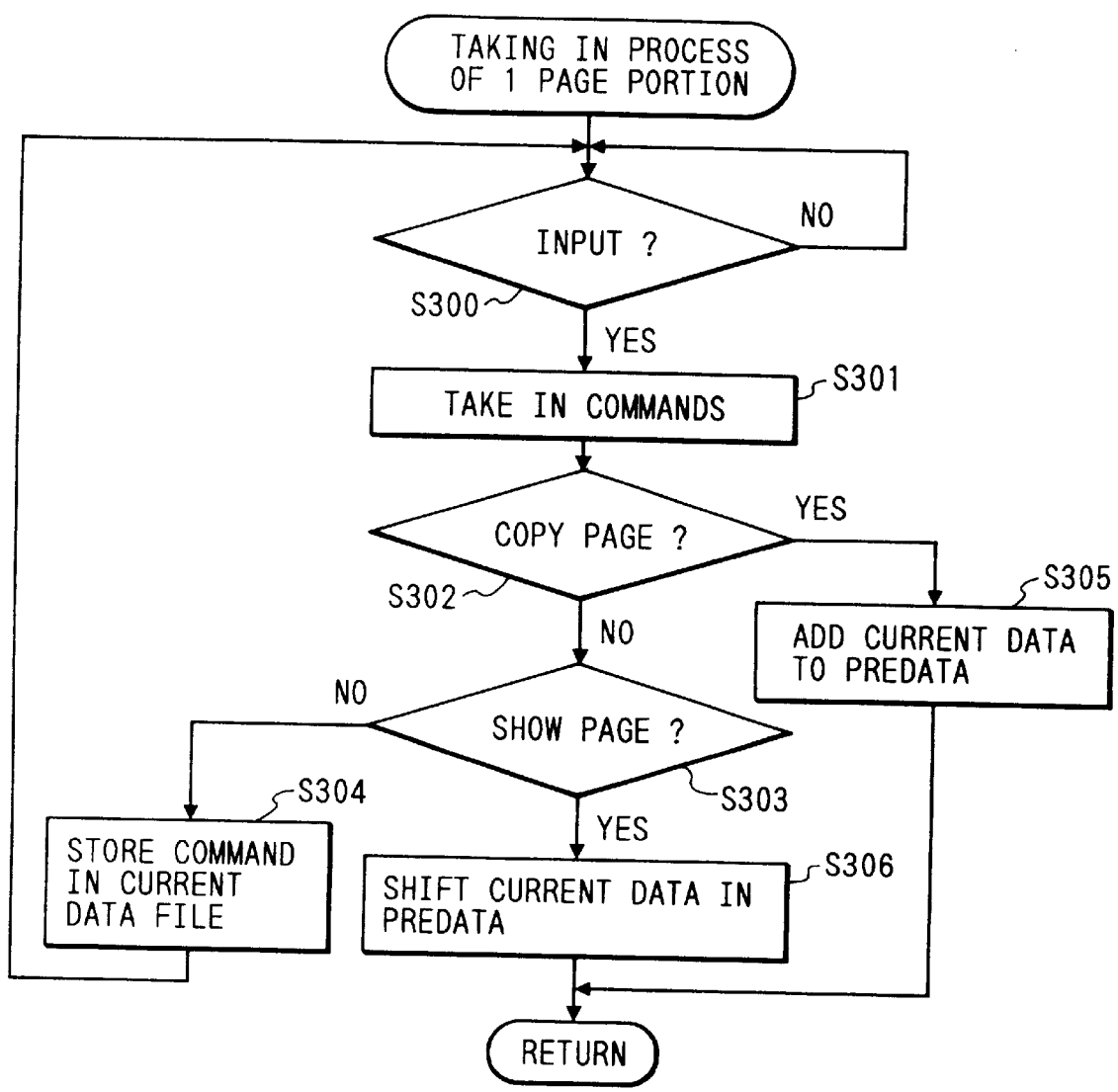
FIG. 38 is a flow chart of a processing sequence of the PDL interpreter shown in FIG. 1.

That is, input of a command from the host computer 301 is waited for in step S300 shown in FIG. 38. If the input has been made, the process proceeds to step S301 in which the input command is fetched before the process proceeds to step S302. In step S302, it is determined whether or not the command fetched in step S301 is a copy page command. If it is the copy page command, the process proceeds to step S305. If it is not the copypage command, the process proceeds to step S303.

In step S303, it is determined whether or not the command fetched in step S301 is a showpage command. If it is the showpage command, the process proceeds to step S306. If it is not the showpage command, the process proceeds to step S304.

As shown in FIG. 5, the PDL interpreter 302 processes and holds two types of files, that is, a current command file 31 and a pre-command file 32 on a command buffer 303. In step S304, a process is performed which is arranged to be performed in a case where the command fetched in step S301 is neither the copypage command nor the showpage command.

In step S304, the command fetched in step S301 is added to the current command file 331 before the process returns to step S300. The current command file 331 has been cleared in step S200. In step S305, a process is performed which is arranged to be performed in a case where the command fetched in step S301 is the copypage command. In step S305, the current command file 331 is added to the precommand file 32, the result of this addition being made to be a novel precommand 332. Thus, a determination is made that the sequential processes in step S201 have been completed. Therefore, the process returns from the sequence shown in FIG. 38 to that shown in FIG. 37 before the process proceeds to step S202.

In step S306 shown in FIG. 38, a process is performed which is arranged to be performed in a case where the command fetched in step S301 is the showpage command. In step S306, the current command file 331 is copied to the precommand file 332 as it is so that a novel precommand file 332 is created. Thus, a determination is made that the sequential processes in step S201 have been completed. Therefore, the process returns from the sequence shown in FIG. 38 to that shown in FIG. 37 before the process proceeds to step S202.

Figure 39:
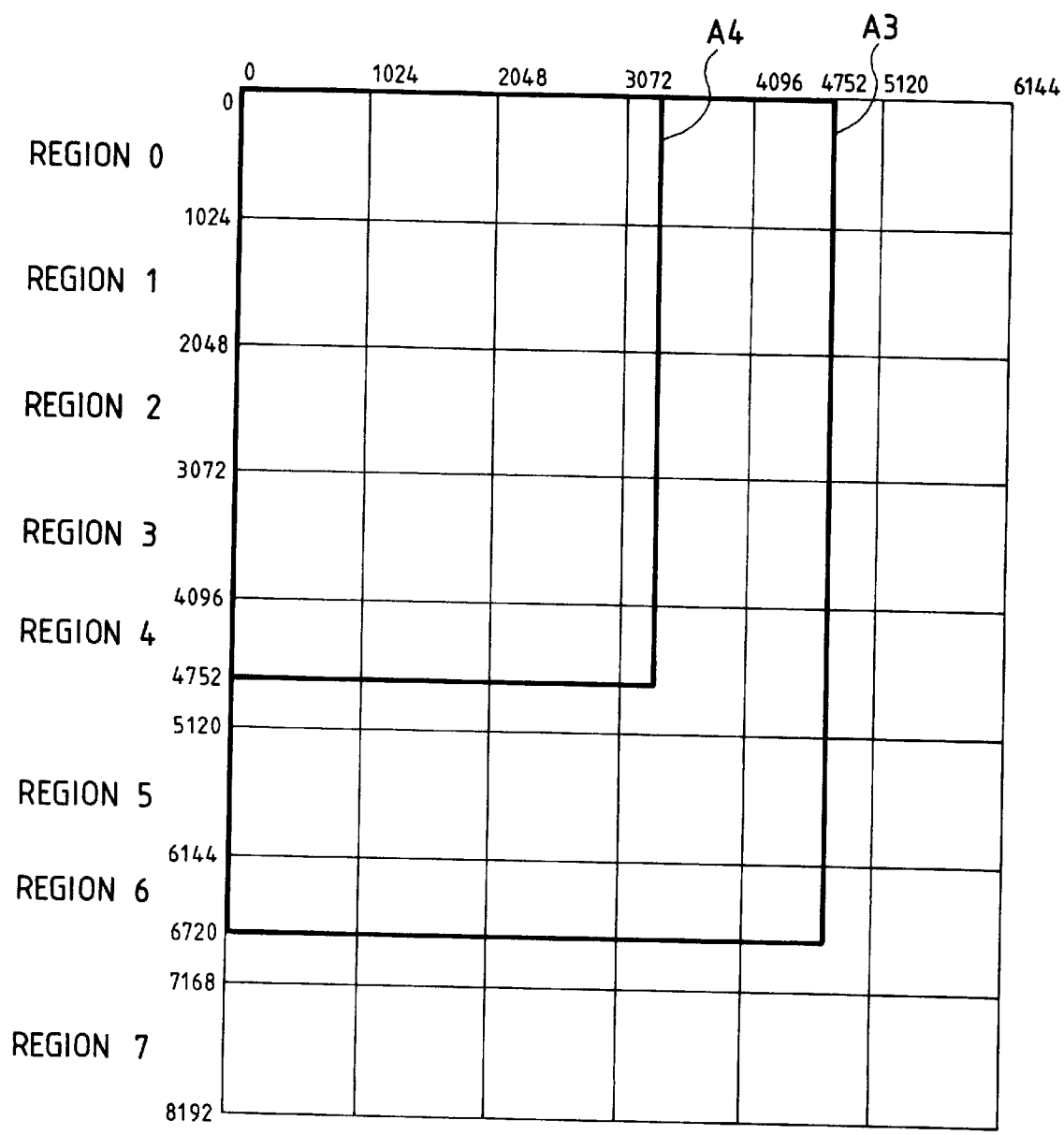
FIG. 39 illustrates a state where an image region for one page is sectioned into a plurality of small regions according to the present invention.

Thus, the sequence in step S201 is completed and the process proceeds to step S202. In step S202, small region pointer i is initialized to 0 before the process proceeds to step S203, the small region pointer i showing the small region which is being processed in a case where the PDL interpreter 302 has divided the image region for one page into a plurality of small regions. FIG. 39 illustrates a stat where the image region for one page is divided into a plurality of small regions.

An assumption is made that the image processed by the printer portion is an image composed of less than 6144pixels in the main scanning direction x less than 8192pixels in the sub-scanning direction. The image size is able to sufficiently cover an image size (4752×6720 pixels) which forms A3-size (297 mm×420 mm) when a print is made with a pixel density of 400 pixels/(1 inch=25.4 mm) in both the main scanning direction and the sub-scanning direction.

The above-described image size is divided into small regions in each 1024 rasters in the sub-scanning direction. That is, it is considered that the image is divided into small regions composed of 6144 pixels×1024 rasters. That is, in a case where the orientation of the above-described A3 size image is processed in the lengthwise direction, the image is divided into 7 small regions starting from region 0 to region 6. Similarly, in a case of the A4 lengthwise directional image (3360×4752 pixels), the image is divided into 5 small regions starting from region 0 to region 4.

The small region buffer is a memory for holding data for pixels in the small region composed of 6144 pixels×1024 rasters. The above-described buffer has a total memory capacity of 24 bits composed of 8 bits for each of red, green and blue per pixel.

In step S203, the corresponding address on the image compression memory 306 is initialized. That is, a compression memory address pointer (omitted from illustration) is initialized to the leading address for storing the encoding data which corresponds to region 0. Then, the process proceeds to step S204.

In step S204, the small region buffer 304 is cleared by the PDL interpreter 302. In step S205, only image data in the small region in the PDL interpreter 302 pointed by the small region pointer is developed and generated in response to a command so as to be stored on the small region buffer 304. The generation of small region i has been completed, the process proceeds to step S206.

In step S206, in response to a command supplied from the PDL interpreter 302, data in the small region buffer is compressed via a signal line 310 with respect to the compressor 305. The compressor 305 reads, compresses and encodes data in the small region buffer 304 in response to a command supplied from the PDL interpreter 302. The compressed code data is, by the compressor 305, stored in a portion on the compression memory 306 pointed by the above-described compression memory address pointer. In accordance with this, the compression address pointer is sequentially updated.

The compressor 305 transmits a signal denoting the completion (encoding) of all of data items in the small region buffer 304 to the PDL interpreter 302 via the signal line 310. Then, its operation is stopped. The PDL interpreter 302 detects the transmission of the signal, which denotes the completion of the compression operation of the small region buffer 304, from the compressor 305, the detection being made by supervising the signal line 310. Then, the process proceeds to step S207.

In step S207, the value of small region point i is increased by one before the process proceeds to step S208. In step S208, it is determined whether or not small region pointer i exceeds 7. If it has exceeded 7, a determination is made that the image development for one page has been completed before the process proceeds to step S209. If it has not exceeded 7, the process returns to step S204 before the similar process is performed for the next small region.

In step S209, the decode 307 is started via the signal line 311. The decoder 307 sequentially reads out compression encoded data stored on the image compression memory 306 so as to decode them. Furthermore, the printer engine 308 is started and data decoded are sequentially transmitted in synchronization with the operation of the printer engine 308.

The decoder 307 decodes all of data in the image compression memory 306 before it transmits a signal denoting the completion of decoding of data. Then, its operation is stopped. The PDL interpreter 302 detects the completion of decoding by supervising the signal line 311 before the process returns to step S200 in which the process for the next page is commenced. The above-described process is repeated so as to sequentially print the ensuing pages.

Figures 46, 47:
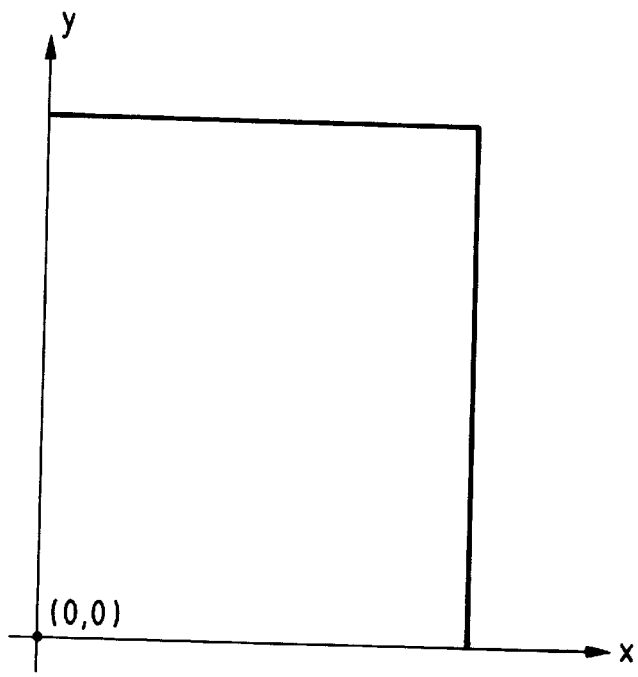
FIG. 46 illustrates the origin of the coordinate of the image region according to the present invention.
FIG. 47 illustrates the contents of the process to be performed according to an eleventh embodiment of the present invention.

Then, a process of developing data in i-th small region in step S205 will now be described with reference to FIGS. 41 to 45. FIGS. 44 and 45 illustrate an example of the page description made in accordance with the PS. FIGS. 44 and 45 illustrate the result of the output made in a case where the PDL interpreter 2 is subject to the page description shown in FIG. 44 before the same is subjected to a page description shown in FIG. 45. FIG. 47 illustrates the result of the output made in a case where the PDL interpreter 302 is subjected to the page description shown in FIG. 44. FIG. 43 illustrates the result of the output made in a case where the PDL interpreter 302 is subjected to the page description shown in FIG. 45.

As described with reference to FIG. 38, in a case where the sequential page descriptions shown in FIG. 44 have been transmitted from the host computer 301, sequential commands to copypage denoted by W16 shown in FIG. 44 are accommodated in the precommand file 332, the precommand file 332 being used to generate an image for one page.

Then, in a case where sequential page descriptions shown in FIG. 45 has been supplied from the host computer 301 subsequently to the sequential page descriptions shown in FIG. 44, page descriptions from W1 to W15 shown in FIG. 44 are added before the sequential page descriptions shown in FIG. 45 are added so that a novel precommand file is processed, the precommand file being used to generate an image for one page.

Figure 42:
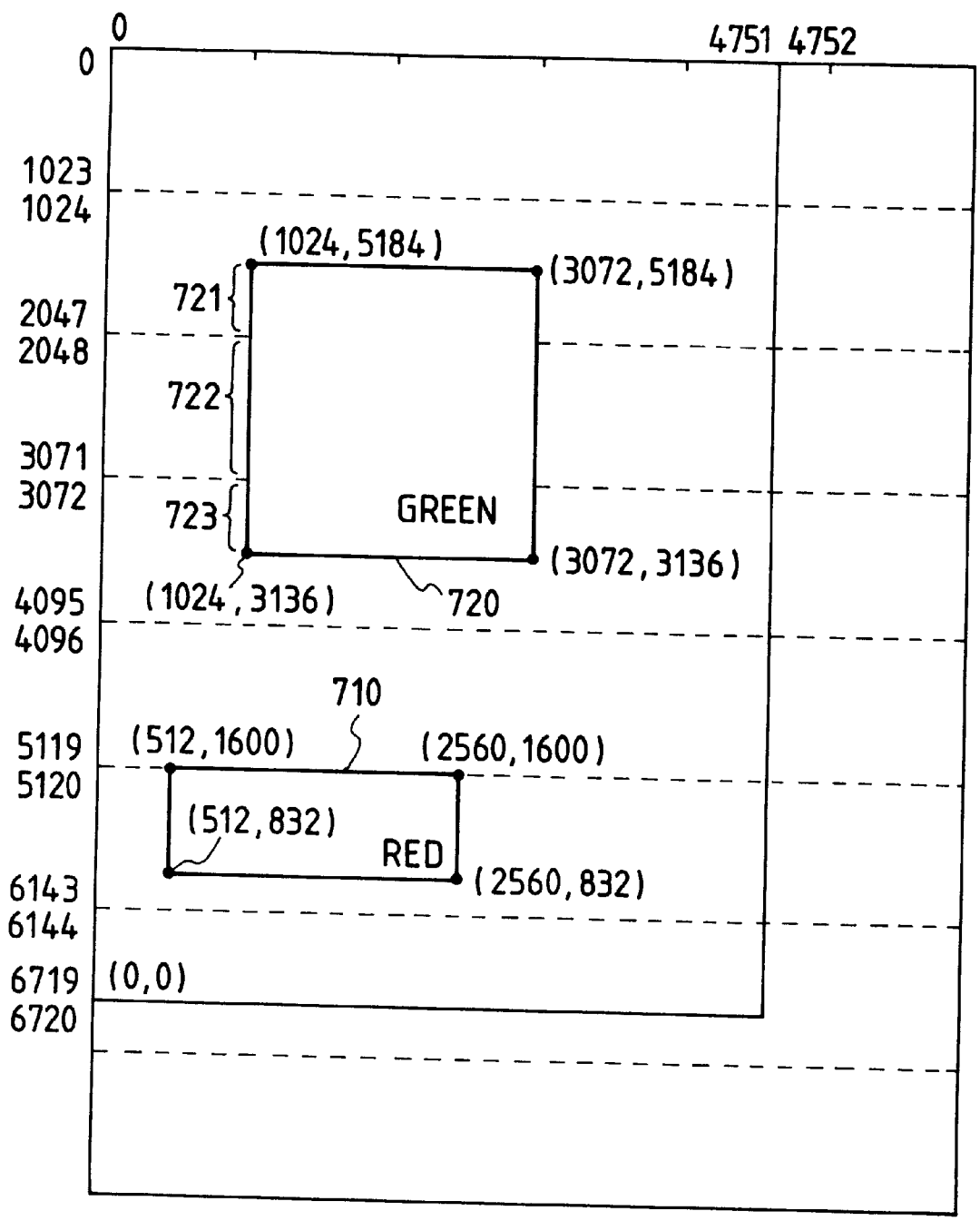
FIG. 42 illustrates a developed image page-described according to the present invention.
Figure 43:
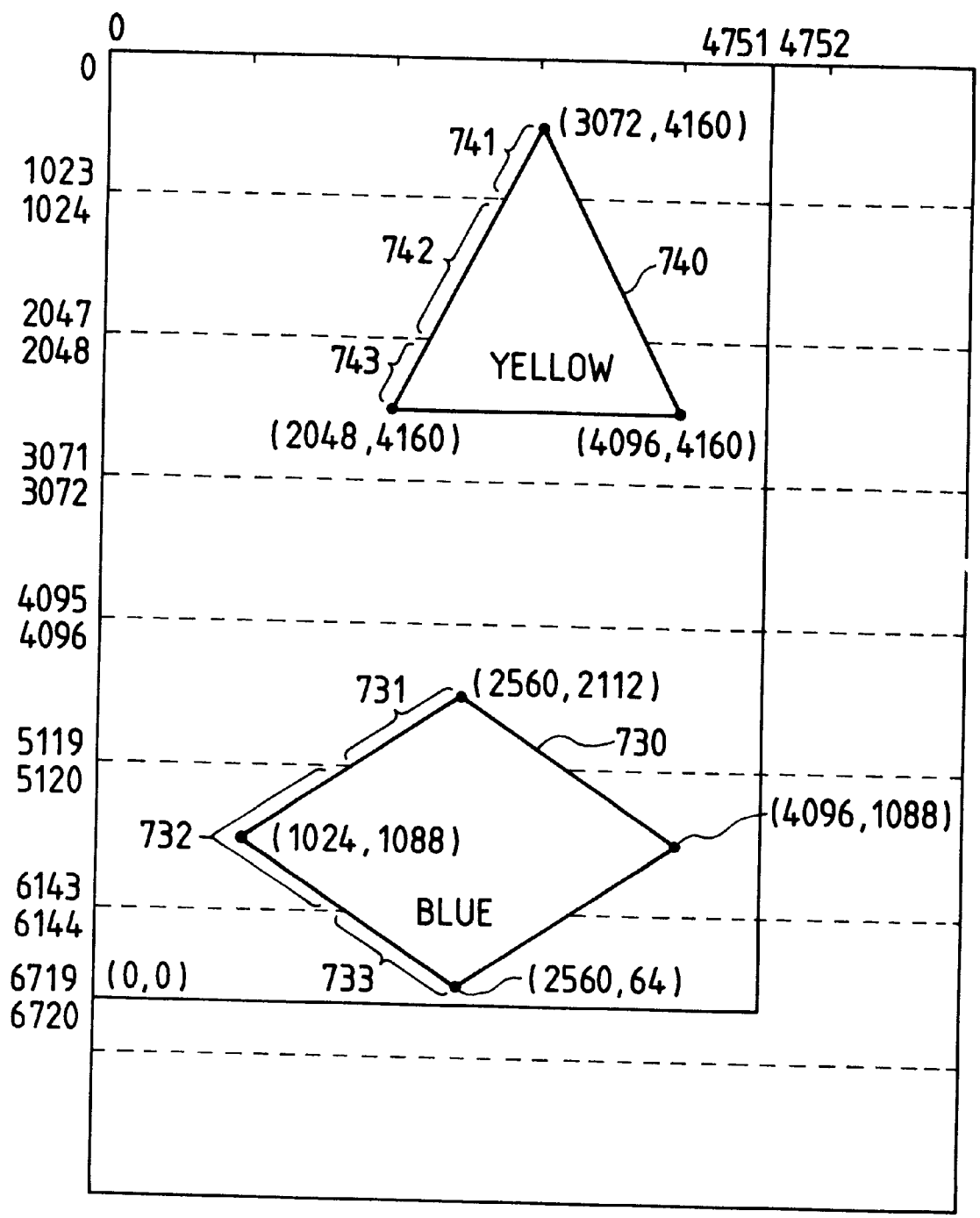
FIG. 43 illustrates a developed image page-described according to the present invention.

The image shown in FIG. 42 is generated from the description shown in FIG. 44 in the following sequence: referring to FIG. 45, the commands for actually developing image data on the memory are W9 and W15 only. The other commands are used to only change the internal state of the PDL interpreter 302. In response to command W9, an image 710 shown in FIG. 42 is drawn on the memory before an image 720 shown in FIG. 42 is drawn on the memory in response to command W15.

Therefore, in the process in step S205, when the commands such as W9 and W15 for actually developing data on the memory is executed by the PDL interpreter 302, the internal state of the PDL interpreter 302 is checked at this time. As a result, only the image portion corresponding to the i-th region may be processed.

That is, by checking the graphic state immediately before the execution of command W9 (immediately after command W8 has been executed), the area on the memory in which a graph to be developed on the memory in response to command W9 is drawn is checked. As a result, in response to command W9, only the subject portion is drawn on the small region buffer while checking whether or not the Y-address of each pixel at the time of development of only the portion overlapping the i-th region, is in the i-th region, that is, whether or not it is in (1024×i to 1024×(i+1)−1) raster.

Also command W15 is executed in such a manner that image data is developed while checking the region. Commands except for commands W9 and W15 are not commands for developing data on the memory but respectively are commands for changing the graphic state of the interpreter or defining the operational procedure or the like. All of the above-described operations are the operations for only changing the internal state of the interpreter, the operations being executed whenever the small regions are developed.

In the case of the page description shown in FIG. 45, only commands W27 and W33 are commands to be executed while checking the developed pixel positions. The other commands are commands for only changing the internal state. In a case where an image is drawn in response to only the commands shown in FIG. 45, an image can be drawn as shown in FIG. 42.

According to the above-described examples, only fill command W27 is the command to be executed while checking the developed region. Furthermore, there are provided various commands, that is, image, imagemask, show, ashow, widthshow, awidthshow, kshow and stroke. Also the above-described commands are executed by performing the development on the memory.

The compressor (encoder) 305 and the decoder 307 can easily be realized by using, for example, an LSI CL550 manufactured by C-Cube, U.S.A. in such a manner that a circuit for adjusting the synchronous signal or the like is added if necessary. As a result, the compression can be performed in accordance with the above-described ADCT method suggested by JPEG.

Figure 41:
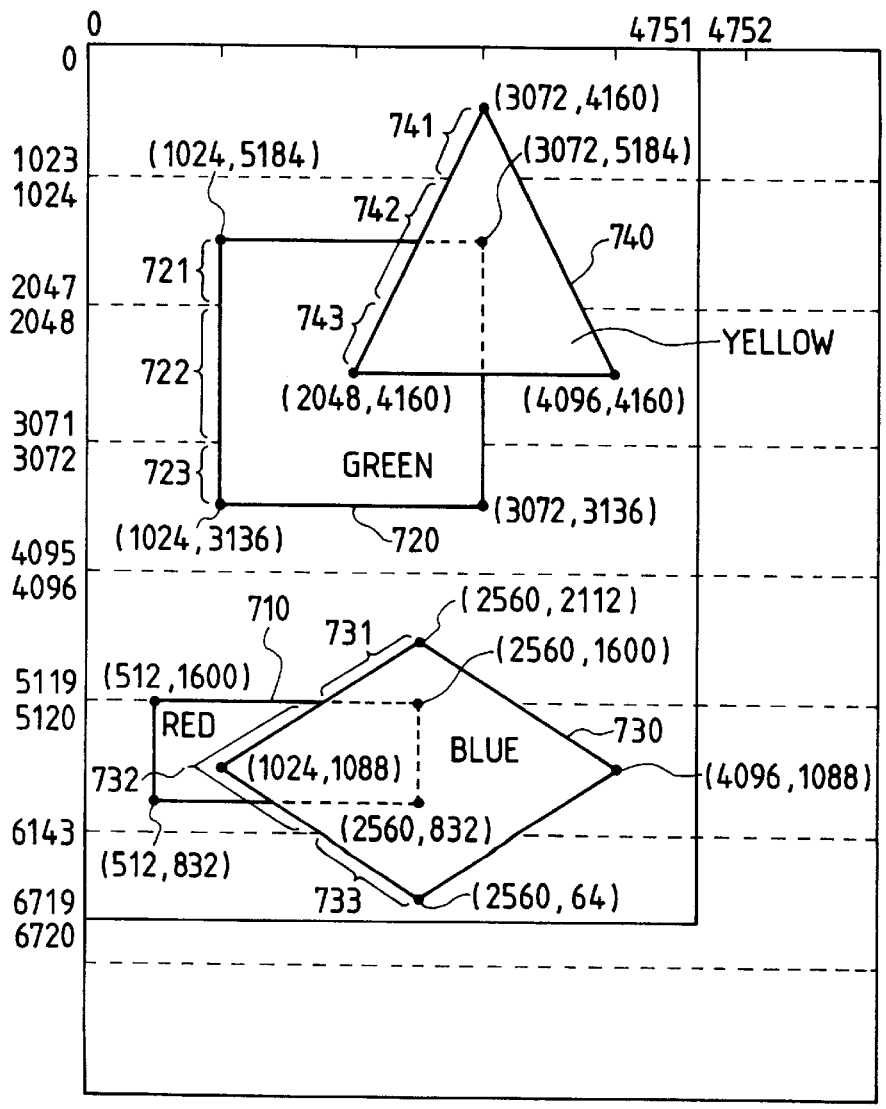
FIG. 41 illustrates a developed image page-described according to the present invention.

Referring to FIGS. 41 to 43, the coordinates of each of the apexes of each of the graphs 710, 720, 730 and 740 are expressed by (x, y). According to the PS method, the lower left corner of the image region assumed as shown in FIG. 46 is defined to be (0, 0). Therefore, the position of the graphic image is expressed according to the above-described coordinate system. On the other hand, the raster position on the memory is scanned while making the upper left corner to be the start point. Therefore, in a case of an image of A3 of 400 dpi is processed, it corresponds to (x, y), while it corresponds to the position of the x-th pixel on the (6720–y)-th scanning line. The address transformation can automatically be executed by the PDL interpreter.

In a case where the quantity of page description command data becomes larger than the capacity of the command buffer 303 to be processed and thereby it cannot be processed, the PDL interpreter 302 transmits this fact via the interface 309. The host computer 301 is able to recognize the state of the PDL interpreter by supervising the above-described signal.

Embodiment 11

Figure 40:
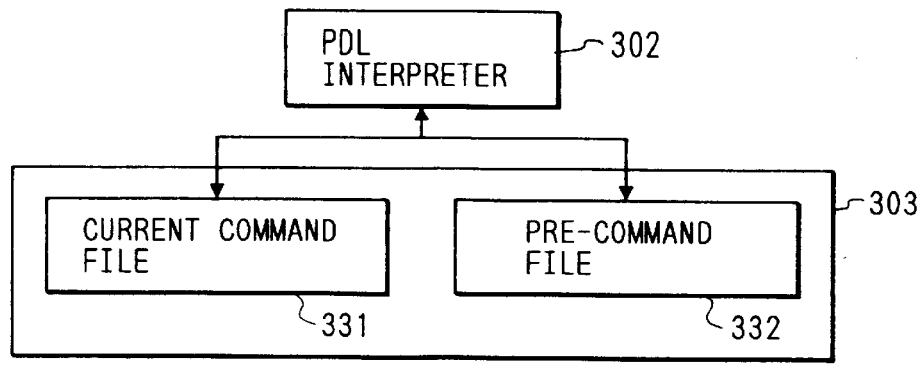
FIG. 40 illustrates the contents of a file in the command buffer shown in FIG. 36.

According to the above-described embodiments, the current command file 331 and the precommand file 332 shown in FIG. 40 file the command received by the PDL interpreter 302. The above-described information may be held as a temporarily encoded intermediate language. Furthermore, by holding, as shown column 2 of FIG. 47, the maximum value and the minimum value of the Y-directional coordinate value of the area which is the subject of the drawing by the commands such as codes W9, W15, W27 and W33 which develop data on the memory in such a manner that the maximum value and the minimum value are added to the intermediate code, a discrimination whether or not the drawing in each of the small regions generates by the execution of the command can easily be made. As a result, the execution speed can be raised.

Furthermore, as shown in column 3 of FIG. 47, by adding the fact whether or not each of the data development commands has a drawing region in each of the small regions at the time of the intermediate-coding, the execution speed can further be raised.

Embodiment 12

Figure 48:
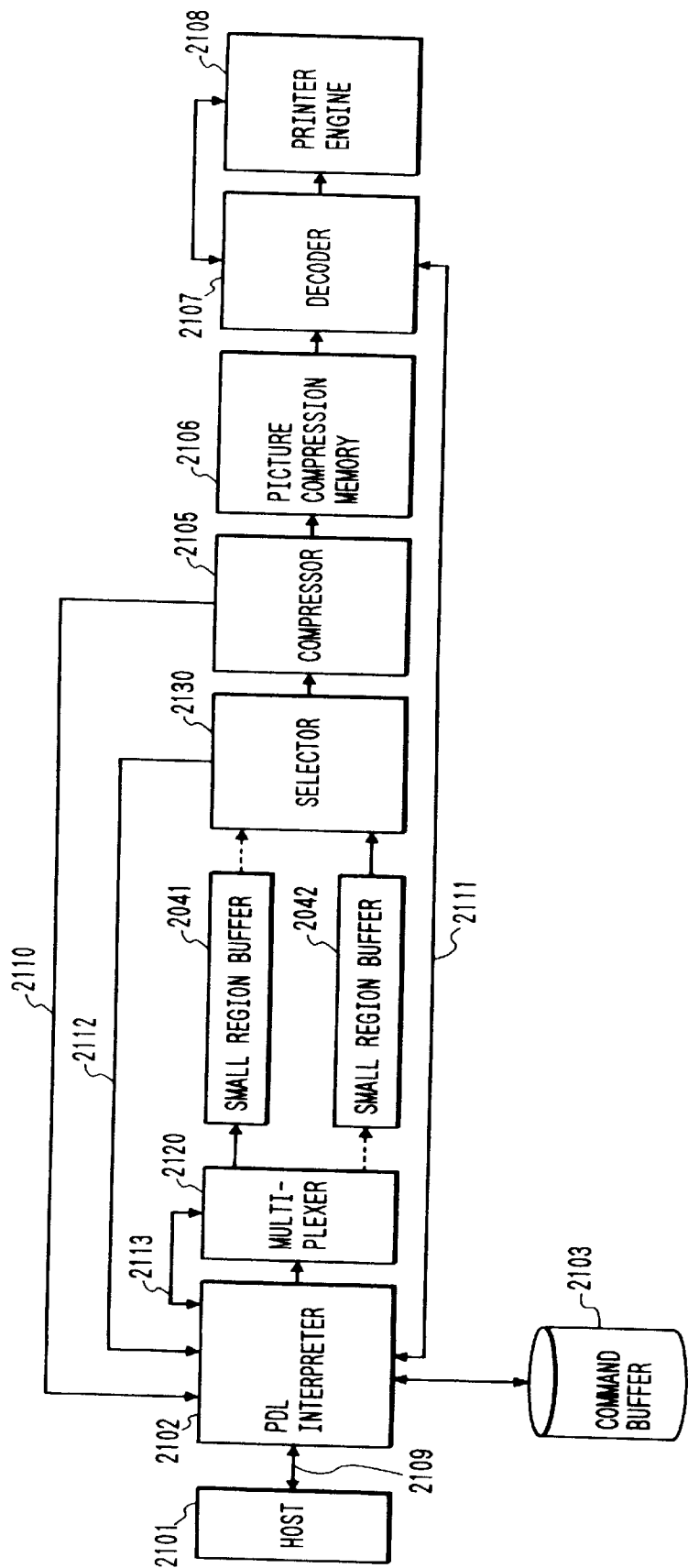
FIG. 48 is a block diagram which illustrates the structure of a circuit for use according to a twelfth embodiment of the present invention.

According to the above-described embodiments, a plurality of small region buffers may be used. FIG. 48 illustrates an example of the structure in which two small region buffers are used. In this case, a PDL interpreter 2102 operates a small region buffer 2041 and another small region 2042 by controlling a multiplexer 2120 and a selector 2130.

That is, the multiplexer 2120, through a signal line 2113, switches over the output from the PDL interpreter 2102 to be connected to the small region buffer 2041 or the small region buffer 2042. The selector 2130 switches over, via a signal line 2112, the PDL interpreter 2102 to connect the original data buffer, through which a compressor 2105 fetches data, to the small region buffer 2041 or the small region buffer 2042.

The PDL interpreter 2102 acts to read data from the small region buffer 2042 to the compressor 2105 when data is being developed to the small region buffer 2041. Furthermore, it acts to read data from the small region 2041 to the compressor 2105 when data is being developed to the small region buffer 2042. The above-described actions are performed via the signal line 2110 while supervising the state of the compressor. The other portions are the same as those according to the above-described embodiments.

The compression method (encoding method) is not limited to the ADCT method. It may be any of the vector quantizing, the MH, the MR methods. The number of the rasters in the small region is not limited to 1024. For example, the other number of rasters may, of course, be employed for example, 8 rasters, 256 rasters or the like.

As described above, according to this embodiment, image data, which is the result of the processing, modifying and publishing operations performed in accordance with the image position instructed from outside, is generated in units of the small regions before it is compressed. As a result, the number of compression processes required for each of the regions can be reduced. In addition, the development memory can be reduced to correspond to the small region. Therefore, the cost can be significantly reduced in comparison to a case where a memory having a data capacity which is sufficiently large to hold actual data is used.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An image processing apparatus, comprising:

supply means for selecting from a plurality of code data representing images comprising a plurality of bands respectively, code data necessary respectively for said plurality of bands and for supplying the selected code data on a band unit basis, wherein object images each represented by each of said plurality of code data can exist over said plurality of bands;

development means for sequentially developing on the band unit basis, the code data supplied from said supply means; and output means for sequentially outputting on the band unit basis, image data developed by said development means, wherein said supply means determines an order and times of supplying of the respective code data to said development means, according to size and shape of the respective object images represented by said plurality of code data.

2. An apparatus according to claim 1, wherein said output means is a buffer for storing the image data developed by said development means, a size of said buffer being smaller than a size required to store non-compressed image data of one page.

3. An apparatus according to claim 1, wherein the object image represented by the code data includes a natural image.

4. An apparatus according to claim 1, wherein said output means includes compression means for compressing the image data developed by said development means.

5. An apparatus according to claim 4, wherein said compression means compresses the developed image data on the band unit basis.

6. An apparatus according to claim 5, wherein said compression means performs variable-length encoding.

7. An apparatus according to claim 5, wherein said compression means performs an orthogonal transform on the image data.

8. An apparatus according to claim 1, further comprising image forming means for forming the image on a medium on the band unit basis based on the image data output from said output means.

9. An apparatus according to claim 8, wherein said image forming means is a laser printer.

10. An apparatus according to claim 1, wherein said plurality of code data is described by a page description language (PDL).

11. An apparatus according to claim 1, wherein said supply means is a host computer.

12. An image processing method comprising:

a supply step of selecting from a plurality of code data representing images comprising a plurality of bands respectively, code data necessary for said plurality of bands and of supplying the selected code data on a band unit basis, wherein object images each represented by each of said plurality of code data can exist over said plurality of bands;

a development step of sequentially developing on a band unit basis, the code data supplied from said supply means; and an output step of sequentially outputting on a band unit basis, image data developed by said development means, wherein said supply step includes a step of determining an order and times of supplying of the respective code data to said development means, according to size and shape of the respective object images represented by said plurality of code data.

\* \* \* \* \*

UNITED STATES PATENT AND TRADEMARK OFFICE
CERTIFICATE OF CORRECTION

PATENT NO. : 5,917,947
DATED : June 29, 1999
INVENTOR(S) : YOSHIHIRO ISHIDA ET AL.

It is certified that error appears in the above-identified patent and that said Letters Patent is hereby corrected as shown below:

SHEET 21

FIG. 20, "REPRESENTES" should read --REPRESENTS--.

COLUMN 1

Line 15, "printer" should read --printers--; and
    Line 48, "arises" should read --arise--.

COLUMN 3

Line 30, "be" should be deleted.

COLUMN 4

Line 61, "raster" (second occurrence) should read --rasters--.

COLUMN 5

Line 53, "the area" should read --an output area-- and "to which the output" should be deleted.

UNITED STATES PATENT AND TRADEMARK OFFICE
CERTIFICATE OF CORRECTION

PATENT NO. : 5,917,947
DATED : June 29, 1999
INVENTOR(S) : YOSHIHIRO ISHIDA ET AL.

It is certified that error appears in the above-identified patent and that said Letters Patent is hereby corrected as shown below:

COLUMN 6

Line 15, "23→21→22→3..." --23→21→22→23...--;
    Line 16, "o as to" should read --so as to--; and
    Line 45, "upper it," should read --upper bit--.

COLUMN 7

Line 6, "Then, the" should read --The--;
    Line 37, "arbitrary" should read --arbitrarily--; and
    Line 50, "term" should read --terms--.

COLUMN 9

Line 8, "fact that" should read --completion of--; and
    Line 64, "counter" should read --counted--.

COLUMN 11

Line 37, "novely" should read --novelly--.

COLUMN 14

Line 23, "transmits" should read --transmit--; and
    Line 65, "there" should read --it--.

UNITED STATES PATENT AND TRADEMARK OFFICE
CERTIFICATE OF CORRECTION

PATENT NO. : 5,917,947
DATED : June 29, 1999
INVENTOR(S) : YOSHIHIRO ISHIDA ET AL.

It is certified that error appears in the above-identified patent and that said Letters Patent is hereby corrected as shown below:

COLUMN 15

Line 5, "receive should read --receives--;
    Line 29, "a a capacity" should read --a capacity--; and
    Line 49, "a a capacity" should read --a capacity--.

COLUMN 17

Line 19, "continuous" should read --sequence of--.

COLUMN 18

Line 2, "it receive" should read --it receives--;
    Line 21, "cyane," should read --cyan,--; and
    Line 67, "component" should read --components--.

COLUMN 19

Line 36, "which" should read --(which--; and
    Line 59, "indefinetely)" should read --indefinitely)--.

COLUMN 20

Line 20, "Then, it" should read --It--; and
    Line 51, "object" should read --objects--.

UNITED STATES PATENT AND TRADEMARK OFFICE
CERTIFICATE OF CORRECTION

PATENT NO. : 5,917,947
DATED : June 29, 1999
INVENTOR(S) : YOSHIHIRO ISHIDA ET AL.

It is certified that error appears in the above-identified patent and that said Letters Patent is hereby corrected as shown below:

COLUMN 21

Line 6, "$Y_{min1203}$" should read --$Y_{min1203}$--;
Line 7, "$Y_{min1202-a}$." should read --$Y_{min1202-a}$.--; and
"$Y_{min120-a}$." should read --$Y_{min120-a}$--;
Line 54, "large" should read --a large--; and
Line 67, "is becomes" should read --becomes--.

COLUMN 22

Line 1, "number of" should be deleted;
Line 2, "operation" should read --operations--;
Line 3, "takes" should read --is required--; and
Line 47, "Huffman-encoding" should read --Huffman-encode--.

COLUMN 23

Line 67, "copy page" should read --copypage--.

COLUMN 24

Line 1, "copy page" should read --copypage--;
Line 48, "6144pixels" should read --6144 pixels--; and
Line 49, "8192pixels" should read --8192 pixels--.

UNITED STATES PATENT AND TRADEMARK OFFICE
CERTIFICATE OF CORRECTION

PATENT NO. : 5,917,947
DATED : June 29, 1999
INVENTOR(S) : YOSHIHIRO ISHIDA ET AL.

It is certified that error appears in the above-identified patent and that said Letters Patent is hereby corrected as shown below:

COLUMN 26

Line 13, "has been" should read --have been--.

COLUMN 27

Line 36, "shown" should read --shown in--; and
    Line 43, "generates" should read --generated--.

Signed and Sealed this

First Day of August, 2000

Attest:

Q. TODD DICKINSON

*Attesting Officer*      *Director of Patents and Trademarks*